(12) United States Patent
Matsumoto et al.

(10) Patent No.: US 12,264,988 B2
(45) Date of Patent: Apr. 1, 2025

(54) COLLISION SIMULATION TEST APPARATUS AND IMPACT TEST APPARATUS

(71) Applicant: KOKUSAI KEISOKUKI KABUSHIKI KAISHA, Tama (JP)

(72) Inventors: Sigeru Matsumoto, Tokyo (JP); Hiroshi Miyashita, Tokyo (JP); Kazuhiro Murauchi, Tokyo (JP); Kiyoaki Haneishi, Tokyo (JP)

(73) Assignee: KOKUSAI KEISOKUKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/545,462

(22) Filed: Dec. 19, 2023

(65) Prior Publication Data

US 2024/0118173 A1    Apr. 11, 2024

Related U.S. Application Data

(63) Continuation of application No. 18/105,567, filed on Feb. 3, 2023, now Pat. No. 11,892,371, which is a
(Continued)

(30) Foreign Application Priority Data

Feb. 28, 2017 (JP) .................. 2017-036059
Aug. 21, 2017 (JP) .................. 2017-158412
Nov. 15, 2017 (JP) .................. 2017-219701

(51) Int. Cl.
*G01M 17/007* (2006.01)
*B66F 9/06* (2006.01)
(Continued)

(52) U.S. Cl.
CPC .......... *G01M 17/0078* (2013.01); *G01N 3/30* (2013.01); *B66F 9/063* (2013.01); *B66F 9/07* (2013.01); *G01M 7/08* (2013.01); *G01N 3/31* (2013.01)

(58) Field of Classification Search
CPC ....... G01N 3/30; G01N 3/31; G01M 17/0078; G01M 7/08; B66F 9/063; B66F 9/07
See application file for complete search history.

(56) References Cited

U.S. PATENT DOCUMENTS 5,485,758 A    1/1996   Brown et al.
6,609,409 B1   8/2003   Bock et al.
(Continued)

FOREIGN PATENT DOCUMENTS

CN    102147324 A    8/2011
CN    202974614 U    6/2013
(Continued)

OTHER PUBLICATIONS

Jun. 18, 2024 Office Action issued in Japanese Patent Application No. 2023-080622.
(Continued)

*Primary Examiner* — Jonathan M Dunlap
(74) *Attorney, Agent, or Firm* — Oliff PLC

(57) ABSTRACT

A collision simulation test apparatus including a table to which a test piece is to be attached, the table being movable in a predetermined direction, a toothed belt for transmitting power to drive the table, a drive module capable of driving the toothed belt, and a control part capable of controlling the drive module. The control part is capable of controlling the drive module to generate an impact to be applied to the test piece, and the impact generated by the drive module is transmitted to the table by the toothed belt.

17 Claims, 33 Drawing Sheets

Related U.S. Application Data continuation of application No. 17/523,378, filed on Nov. 10, 2021, now Pat. No. 11,609,152, which is a continuation of application No. 16/551,339, filed on Aug. 26, 2019, now Pat. No. 11,199,475, which is a continuation-in-part of application No. PCT/JP2018/003113, filed on Jan. 31, 2018.

(51) Int. Cl.
*B66F 9/07* (2006.01)
*G01M 7/08* (2006.01)
*G01N 3/30* (2006.01)
*G01N 3/31* (2006.01)

(56) References Cited

U.S. PATENT DOCUMENTS

| | | |
|---|---|---|
| 2004/0086209 A1 | 5/2004 | Ueno |
| 2004/0223670 A1 | 11/2004 | Ramonat et al. |
| 2007/0140817 A1 | 6/2007 | Hansl |
| 2014/0257781 A1 | 9/2014 | Matsumoto et al. |
| 2014/0262696 A1 | 9/2014 | Gibson |
| 2016/0054199 A1 | 2/2016 | Fritz et al. |

FOREIGN PATENT DOCUMENTS

| | | |
|---|---|---|
| CN | 106370379 A | 2/2017 |
| CN | 106 989 886 A | 7/2017 |
| JP | S46-709 B1 | 1/1971 |
| JP | H01-165925 A | 6/1989 |
| JP | H07-215246 A | 8/1995 |
| JP | 2001-046728 A | 2/2001 |
| JP | 2003-102188 A | 4/2003 |
| JP | 2003-139648 A | 5/2003 |
| JP | 2004-162884 A | 6/2004 |
| JP | 2008-185144 A | 8/2008 |
| JP | 2009-236729 A | 10/2009 |
| JP | 2012-2699 A | 1/2012 |
| JP | 2012-083133 A | 4/2012 |
| JP | 2012-189533 A | 10/2012 |
| JP | 2016-519295 A | 6/2016 |
| JP | 2017-022988 A | 1/2017 |
| KR | 101456191 B1 | 10/2014 |
| WO | 2013/069500 A1 | 5/2013 |
| WO | 2014/058051 A1 | 4/2014 |
| WO | 2016/185512 A1 | 11/2016 |

OTHER PUBLICATIONS

"Method of drop test for packaged freights;" JIS Z 0202; 1994.
"Packaged freights—Method of horizontal impact tests;" JIS Z 0205; 1998.
"Packaging—Complete, filled transport packages—Vertical impact test by dropping;" International Standard ISO 2248; 2nd Edition; 1985; International Organization for Standardization.
"Mechanical shock—Testing machines—Characteristics and performance;" International Standard ISO 8568; 1st Edition; 1989; International Organization for Standardization.
"Packaging—Complete, filled transport packages—Horizontal impact tests (horizontal or inclined plane test; pendulum test);" International Standard ISO 2244; Second Edition; 1985; International Organization for Standardization.
Apr. 17, 2018 Search Report issued in International Patent Application No. PCT/JP2018/003113.
Jun. 17, 2019 International Preliminary Report on Patentability issued in International Patent Application No. PCT/JP2018/003113.
Oct. 27, 2020 Office Action issued in Chinese Patent Application No. 201880014593.3.
Dec. 4, 2020 Extended Search Report issued in European Patent Application No. 18761975.4.
May 13, 2021 Office Action issued in U.S. Appl. No. 16/551,339.
Jul. 5, 2021 Office Action issued in Japanese Patent Application No. 2017-219701.
Jan. 6, 2022 Office Action issued in Indian Patent Application No. 201917036978.
Sep. 20, 2022 Office Action issued in Japanese Patent Application No. 2017-219701.
Apr. 19, 2023 Office Action issued in Korean Patent Application No. 10-2019-7028305.
Catalog: Siemens, "Simodrive & masterdrives, Simodrive 611/Masterdrives MC 1FK7 Synchronous Motors," Configuration Manual Oct. 2005 Edition, 2005.
Catalog: Siemens, "Motion control servo motors, Synchronous and Asynchronous Servo Motors for Simovert Masterdrives," Catalog DA 65.3, 2004.
Catalog: Siemens, "Asynchronous motors," 2005.
Catalog: Siemens, "Asynchronous motors," 2006.
Catalog: Siemens, "Sinamics S110, The Basic Positioning Drive," Catalog PM 22, 2009.
Catalog: Siemens, "Simotion, Sinamics S120 and Motors for Production Machines," Catalog PM 21, 2011.
Catalog: Siemens, "Simotion, Sinamics S120 and Motors for Production Machines," Catalog PM 21, 2008.

COLLISION SIMULATION TEST APPARATUS AND IMPACT TEST APPARATUS

CROSS-REFERENCE TO RELATED APPLICATION

This is a Continuation of application Ser. No. 18/105,567 filed Feb. 3, 2023, which in turn is a Continuation of application Ser. No. 17/523,378 filed Nov. 10, 2021, now U.S. Pat. No. 11,609,152, which is a Continuation of application Ser. No. 16/551,339 filed Aug. 26, 2019, now U.S. Pat. No. 11,199,475, which is a Continuation-in-Part of International Application No. PCT/JP2018/003113 filed on Jan. 31, 2018, which claims priority from Japanese Patent Application No. 2017-036059 filed on Feb. 28, 2017, Japanese Patent Application No. 2017-158412 filed on Aug. 21, 2017, and Japanese Patent Application No. 2017-219701 filed on Nov. 15, 2017. The entire disclosure of the prior applications is incorporated herein by reference.

TECHNICAL FIELD

The present disclosure relates to collision simulation test apparatuses and impact test apparatuses.

BACKGROUND

Collision tests are performed to assess safety of occupants in an automobile at the time of collision. The collision tests include an actual vehicle collision test (destruction test) in which an actual vehicle is made to collide to a barrier at a predetermined speed, and a collision simulation test (thread test) in which an impact (acceleration pulse) that is comparable with an impact at the time of collision of an actual vehicle is applied to a thread (dolly) to which a test piece is attached.

An apparatus which performs the collision simulation test is conventionally known. The conventionally known apparatus non-destructively re-creates an impact that acts on a test piece attached to a thread which is supported to be freely movable in a horizontal direction by launching a piston of a launching device with hydraulic pressure accumulated in an accumulator of the launching device in a state where a front end of the piston is in contact with a forward end of the thread.

SUMMARY

The conventionally known apparatus can adjust a degree of the impact to a degree that is comparable with an impact of an actual vehicle by a setting of a launching stroke of the piston but cannot control an acceleration waveform. Accordingly, the conventionally known apparatus cannot perform tests with high precision.

Furthermore, since the thread pushed by the piston travels for a long distance due to its inertia, an overall length of the apparatus becomes exceedingly long and thus the apparatus needs a large installation space.

Aspects of the present disclosure are advantageous to provide one or more improved techniques to realize a small-sized and high-precision collision simulation test apparatus.

According to aspects of the present disclosure, there is provided a collision simulation test apparatus including a table to which a test piece is to be attached, the table being movable in a predetermined direction, a toothed belt for transmitting power to drive the table, a drive module capable of driving the toothed belt, and a control part capable of controlling the drive module. The control part is capable of controlling the drive module to generate an impact to be applied to the test piece, and the impact generated by the drive module is transmitted to the table by the toothed belt.

According to aspects of the present disclosure, further provided is an impact test apparatus including a traveling part onto which a test piece is to be mounted, a winding transmission mechanism capable of transmitting power for driving the traveling part, a drive module capable of driving the winding transmission mechanism, and a control part capable of controlling the drive module. The control part is capable of controlling the drive module to generate an impact to be applied to the test piece, and the impact generated by the drive module is transmitted to the traveling part by the winding transmission mechanism. The winding transmission mechanism includes a first winding intermediate node being a toothed belt.

DETAILED DESCRIPTION OF EMBODIMENTS

Hereinafter, embodiments of the present disclosure will be described with reference to the accompanying drawings. In the following description, the same or corresponding numerals are assigned to the same or corresponding components, and redundant descriptions will be herein omitted.

First Embodiment

Figure 1:
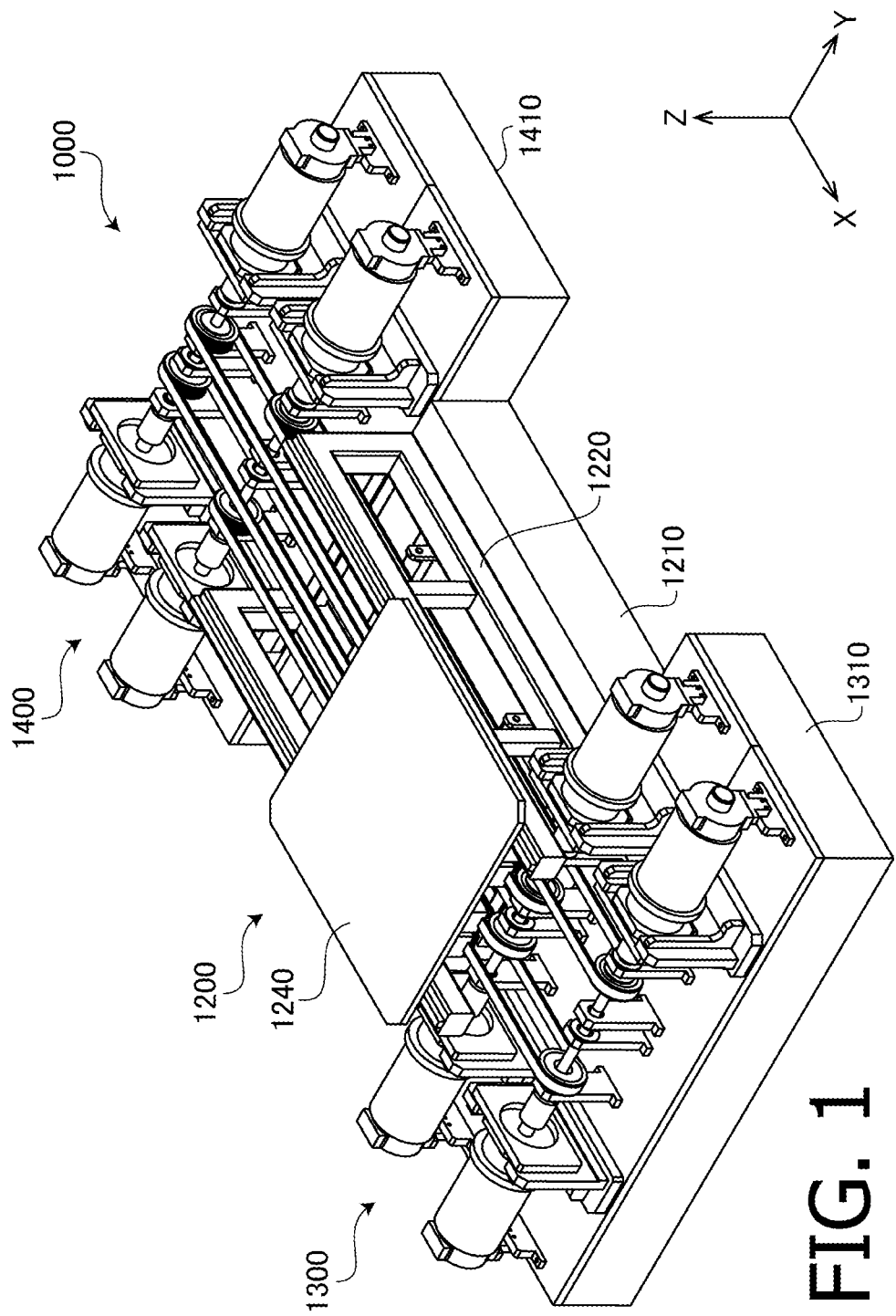
FIG. 1 is a perspective view of a collision simulation test apparatus according to a first embodiment of the present disclosure.
Figure 2:
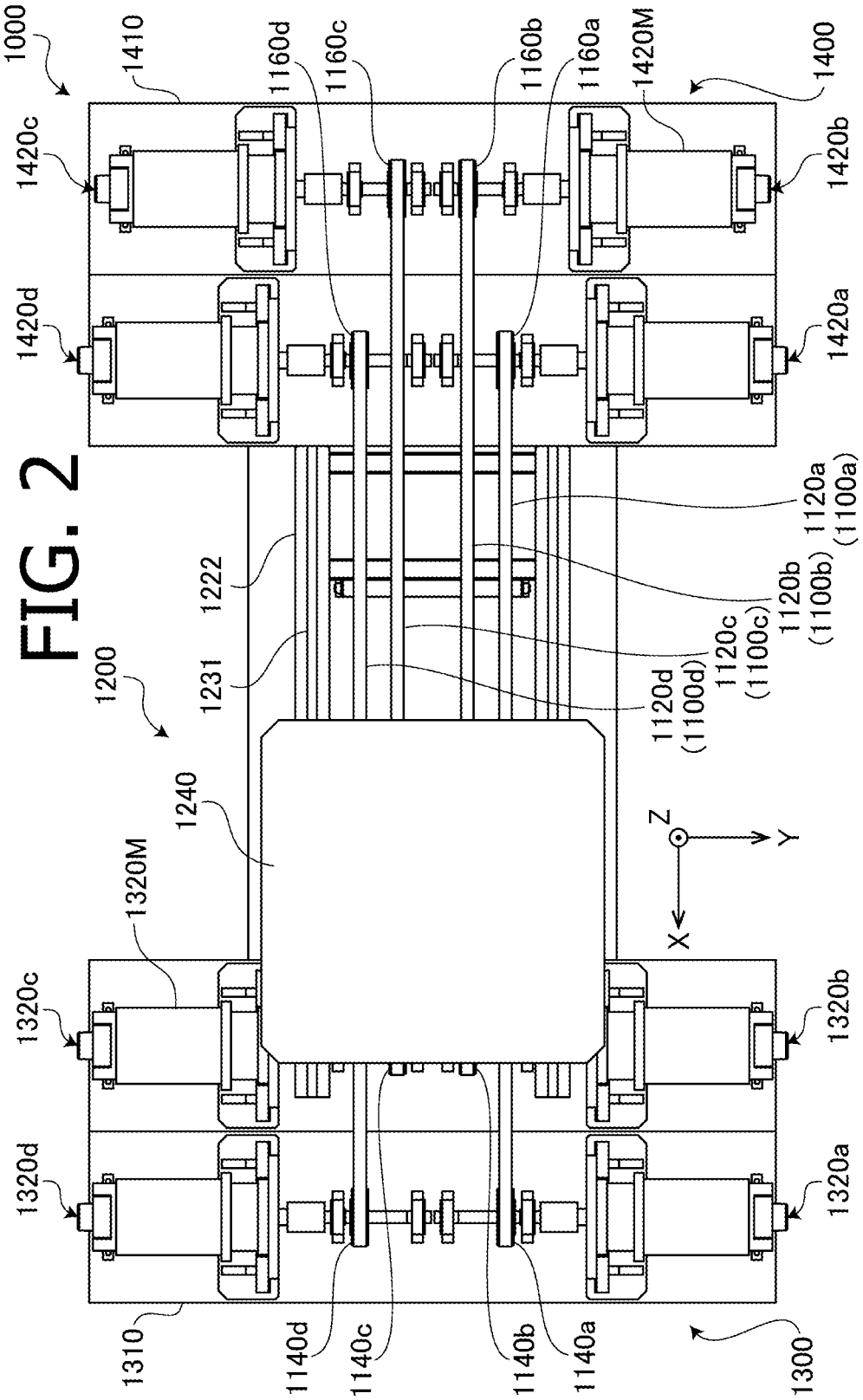
FIG. 2 is a plan view of the collision simulation test apparatus according to the first embodiment of the present disclosure.
Figure 3:
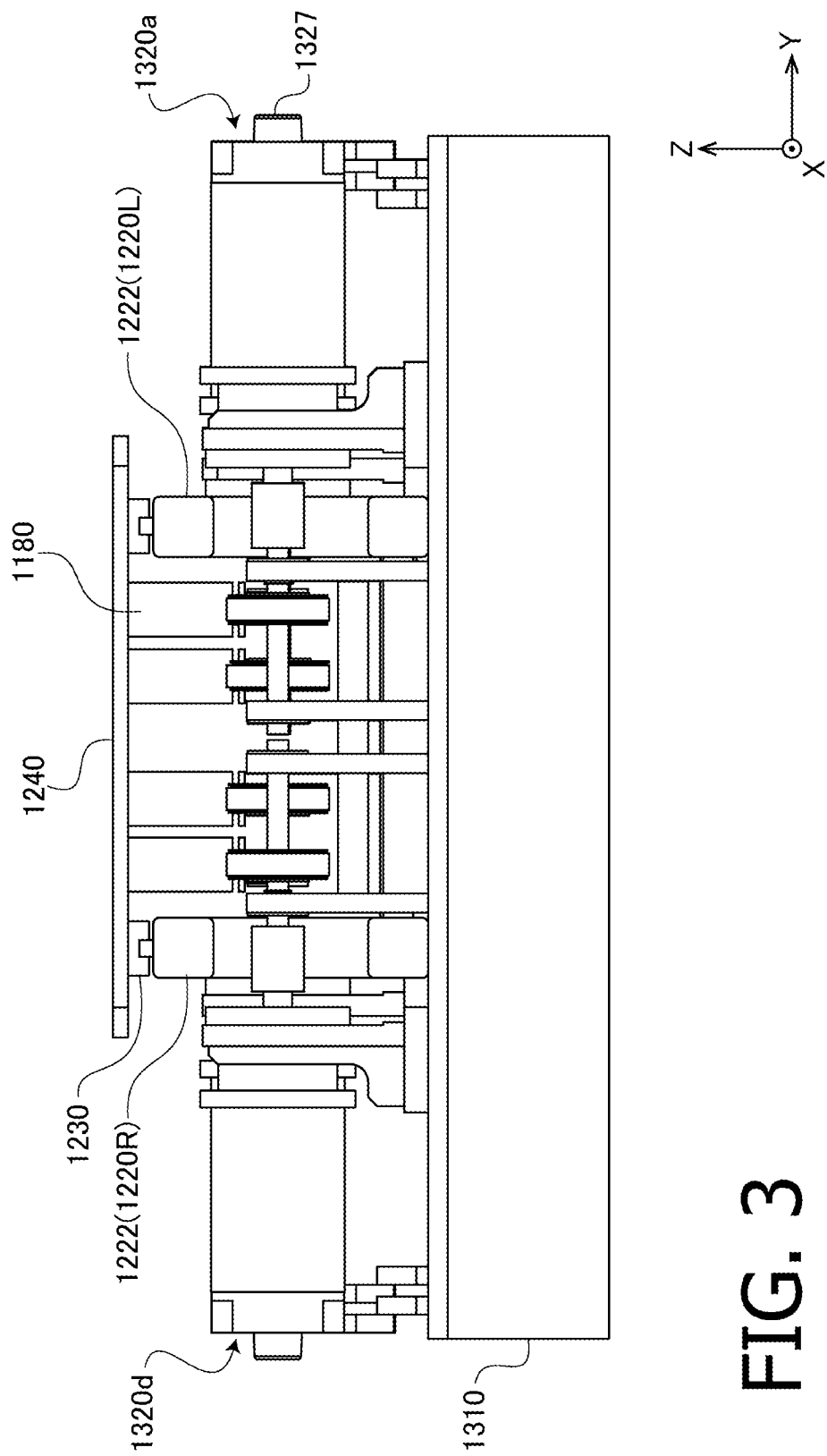
FIG. 3 is a front view of the collision simulation test apparatus according to the first embodiment of the present disclosure.
Figure 4:
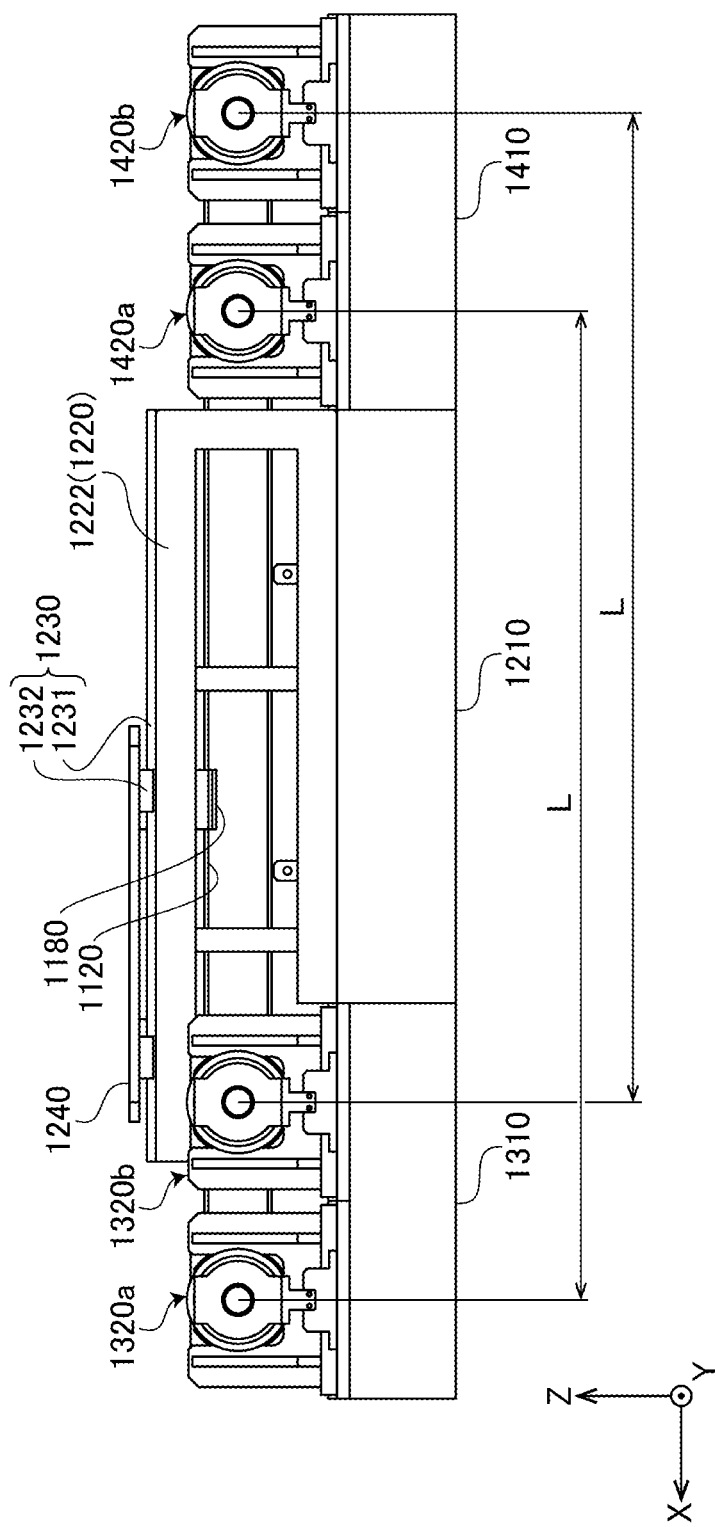
FIG. 4 is a side view of the collision simulation test apparatus according to the first embodiment of the present disclosure.

FIG. 1 is a perspective view of a collision simulation test apparatus 1000 according to a first embodiment of the present disclosure. FIG. 2, FIG. 3 and FIG. 4 are a plan view, a front view and a side view of the collision simulation test apparatus 1000, respectively.

The collision simulation test apparatus 1000 is an apparatus for re-creating impacts that act on automobiles and the like (including railroad vehicles, airplanes and ships), occupants and accessories of the automobiles and the like at the time of collision of the automobiles and the like.

The collision simulation test apparatus 1000 includes a table 1240 imitating a frame of a vehicle of an automobile. To the table 1240, for instance, a test piece such as a seat on which a dummy of an occupant is mounted or a high-voltage battery for electric car can be attached. When the table 1240 is driven with a set acceleration (e.g., an acceleration equivalent to an impact that acts on a frame of a vehicle at the time of collision), an impact similar to that at the time of actual collision acts on the test piece attached to the table 1240. Safety of occupants is assessed based on damages on the test piece (or damages that are predicted from measurement results by acceleration sensors or the like mounted on the test piece) by the impact.

The collision simulation test apparatus 1000 of the present embodiment is configured such that the table 1240 is drivable only in one horizontal direction. As shown in FIG. 1 with coordinate axes, a movable direction of the table 1240 is defined as X axis direction, a horizontal direction perpendicular to the X-axis direction is defined as Y axis direction, and a vertical direction is defined as Z axis direction. With reference to a traveling direction of a simulated vehicle, a leftward direction in FIG. 2 (X axis positive direction) will be referred to as front, a rightward direction in FIG. 2 (X axis negative direction) will be referred to as rear, an upward direction in FIG. 2 (Y axis negative direction) will be referred to as right, and a downward direction in FIG. 2 (Y axis positive direction) will be referred to as left. The X axis direction in which the table 1240 is driven will be referred to as a "driving direction." It is noted that, in the collision simulation test, a high acceleration in a direction opposite to the traveling direction of the vehicle (i.e., rearward direction) is applied to the table 1240.

Figure 9:
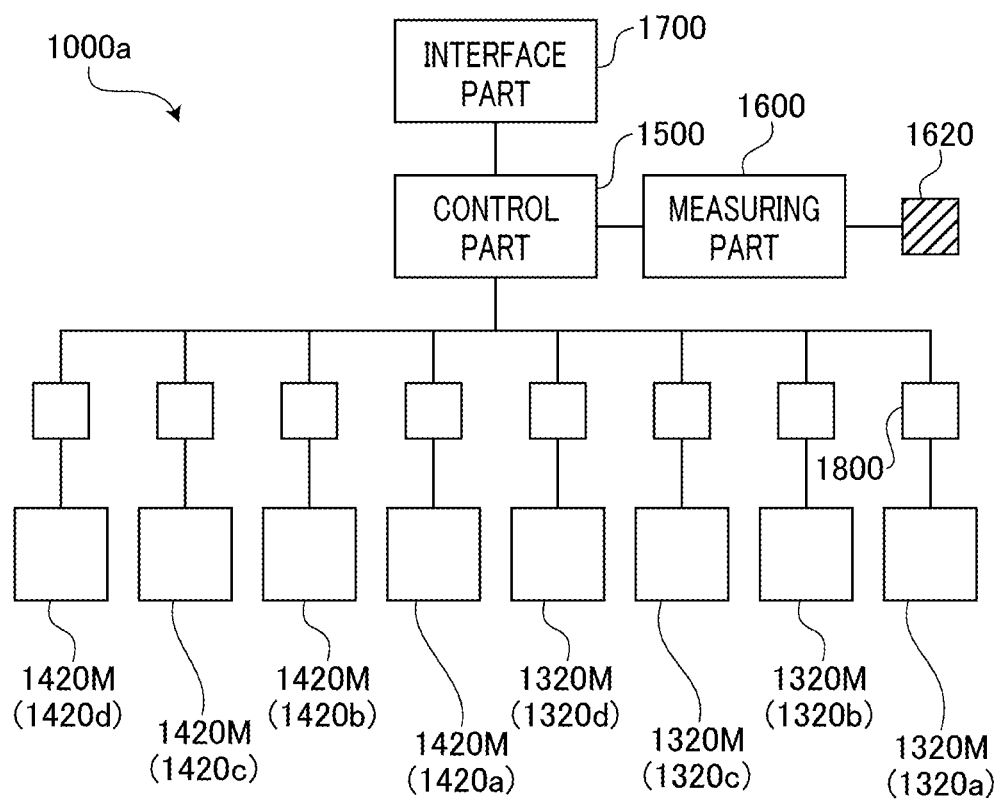
FIG. 9 is a block diagram showing an outline of a control system.

The collision simulation test apparatus 1000 includes a testing section 1200 including the table 1240, a front driving section 1300 and a rear driving section 1400 that drive the table 1240, four belt mechanisms 1100 (belt mechanisms 1100a, 1100b, 1100c and 1100d) that convert rotating motions generated by the driving sections 1300 and 1400 to translational motions in the X axis direction and that transmit the translational motions to the table 1240, and a control system 1000a (FIG. 9).

The testing section 1200 is disposed at a central part in the X axis direction of the collision simulation test apparatus 1000, and the front driving section 1300 and the rear driving section 1400 are disposed adjacent to the front and the rear of the testing section 1200, respectively.

Figure 5:
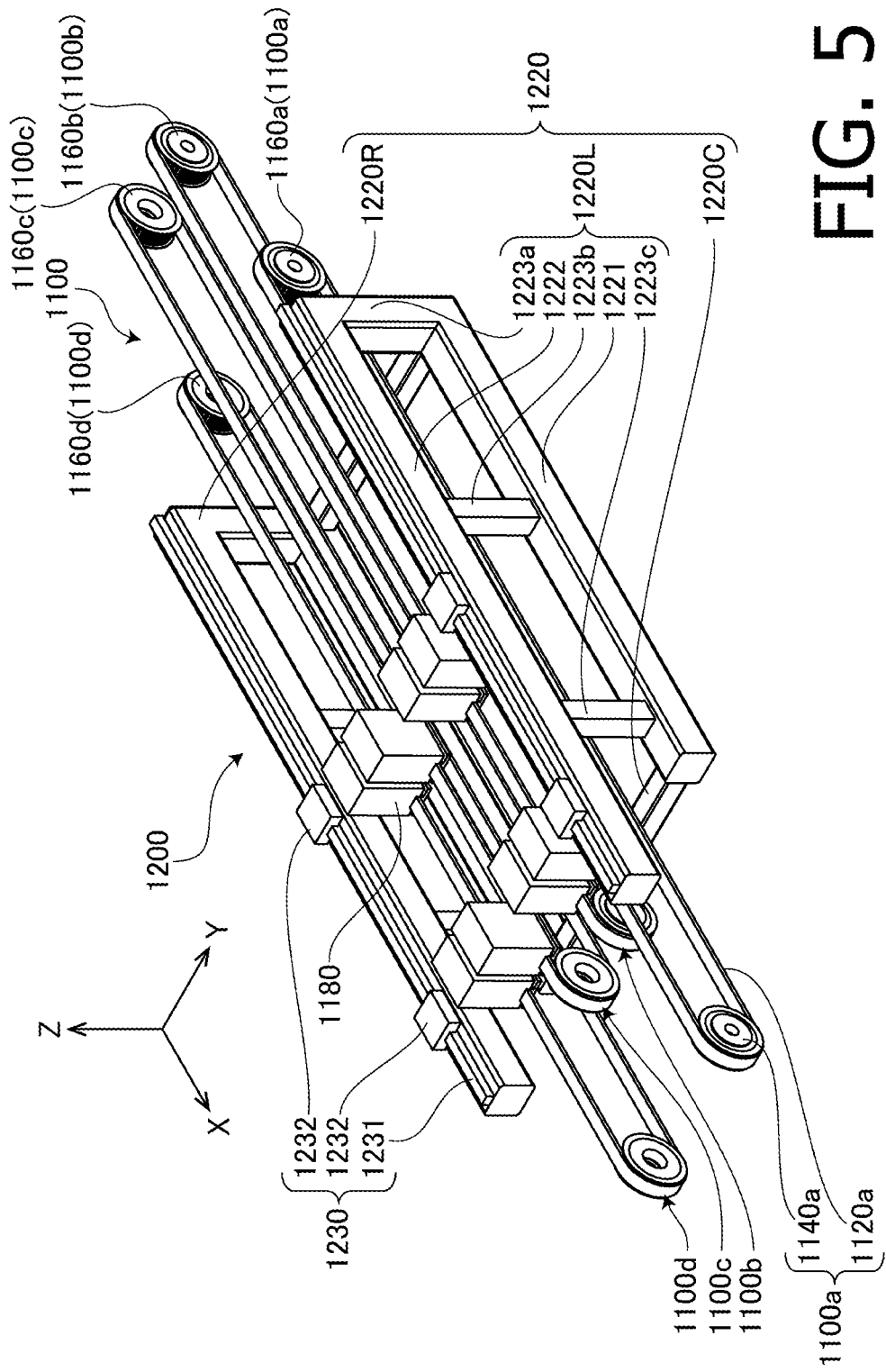
FIG. 5 is a perspective view showing an internal structure of a testing section of the first embodiment of the present disclosure.

FIG. 5 is a perspective view showing structures of the testing section 1200 and the belt mechanisms 1100. For convenience of description, the table 1240 and a base block 1210 (described later) which are components of the testing section 1200 are not shown in FIG. 5.

The testing section 1200 includes, apart from the table 1240, a base block 1210 (FIG. 1), a frame 1220 attached on top of the base block 1210, and a pair of linear guideways 1230 (hereinafter abbreviated to "linear guides 1230") attached on top of the frame 1220. The table 1240 is supported by the pair of linear guides 1230 to be movable only in the X axis direction (driving direction).

As shown in FIG. 5, the frame 1220 has a pair of half frames (a right frame 1220R and a left frame 1220L) coupled together by a plurality of coupling bars 1220C extending in the Y axis direction. Since the right frame 1220R and the left frame 1220L have the same structure (to be exact, they are in a mirror image relation), only details of the left frame 1220L will be described.

The left frame 1220L has an attaching part 1221 and a rail support part 1222 each extending in the X-axis direction, and three coupling parts 1223a, 1223b and 1223c extending in the Z axis direction and coupling the attaching part 1221 and the rail support part 1222 together. As shown in FIG. 1, the attaching part 1221 has a length that is substantially equal to a length of the base block 1210 in the X axis direction, and the entire length of the attaching part 1221 is supported by the base block 1210. Furthermore, rear end portions of the attaching part 1221 and the rail support part 1222 are coupled together by the coupling part 1223a.

The rail support part 1222 is longer than the attaching part 1222 (i.e., longer than the base block 1210), and a front end portion of the rail support part 1222 protrudes forward from the base block 1210 and is disposed above the front driving section 1300.

The linear guide 1230 includes a rail 1231 extending in the X axis direction and two carriages 1232 that travels on the rail 1231 via rolling bodies. The rails 1231 of the pair of linear guides 1230 are respectively fixed on upper surfaces of the rail support parts 1222 of the right frame 1220R and the left frame 1220L. A length of the rail 1231 is substantially equal to a length of the rail support part 1222, and the entire length of the rail 1231 is supported by the rail support part 1222. A plurality of attachment holes (screw holes) are provided on an upper surface of the carriage 1232, and a plurality of through holes corresponding to the attachment holes of the carriage 1232 are provided to the table 1240. The carriage 1232 is fastened to the table 1240 by fitting bolts (not shown) inserted in respective through holes of the table 1240 into respective attachment holes of the carriage 1232. It is noted that a dolly (thread) is configured by the table 1240 and four carriages 1232. Since unnecessary motion of the table 1240 in directions other than the driving direction is suppressed, it becomes possible to drive the table 1240 with higher precision. Furthermore, since, by the adoption of the low-loss rolling guide, it becomes possible to drive the table 1240 with smaller power and burning of guiding means becomes less likely to occur, it becomes possible to drive the table 1240 with a higher acceleration.

Furthermore, attachment structures such as screw holes for attaching a test piece (not shown) such as a seat are formed on the table 1240 and thus the test piece can be directly attached on the table 1240. Since the need for members such as an attachment plate for attaching the test piece is thereby eliminated, a weight of a movable part to which the impact is to be applied can be made lighter and thus it is made possible to apply an impact to the test piece with a high degree of fidelity up to components of high frequencies.

As shown in FIG. 4 and FIG. 5, each belt mechanism 1100 includes a toothed belt 1120, a pair of toothed pulleys (a first pulley 1140 and a second pulley 1160) around which the toothed belt 1120 is wound, and a pair of belt clamps 1180 for fixing the toothed belt 1120 to the table 1240.

Four toothed belts 1120 (1120a, 1120b, 1120c and 1120d) are disposed in parallel with each other between the right frame 1220R and the left frame 1220L. Each of the toothed belts 1120a-d is fixed to the table 1240 at two places in its lengthwise direction by the belt clamps 1180. Specific configurations for fixing the toothed belt 1120 to the table 1240 will be described later. Since the toothed belts 1120a-d are fixed to the table via the belt clamps, occurrence of tooth skipping due to swaying of the toothed belts 1120a-d caused by loads of the belt clamps is suppressed and thus driving control accuracy of the table improves.

As shown in FIG. 2, the front driving section 1300 includes a base block 1310 and four drive modules 1320a, 1320b, 1320c and 1320d (hereinafter occasionally collectively referred to as the drive module(s) 1320) installed on the base block 1310. The rear driving section 1400 includes a base block 1410 and four drive modules 1420a, 1420b, 1420c and 1420d (hereinafter occasionally collectively referred to as the drive module(s) 1420) installed on the base block 1410. The drive modules 1320a-d and 1420a-d slightly differ from each other in their installed positions and/or orientations and lengths and/or arrangement intervals of their components, but their basic configurations are in common.

Furthermore, basic configurations of the front driving section 1300 and the rear driving section 1400 are also in common. Therefore, detailed configuration of the drive module 1320 of the front driving section 1300 will be described, and redundant description regarding the rear driving section 1400 (drive module 1420) will be herein omitted. It is noted that, in the following description regarding the front driving section 1300 (drive module 1320) and in FIG. 6, numerals (and names) within brackets [ ] indicate numerals (and names) of corresponding components in the rear driving section 1400 (drive module 1420).

Figure 6:
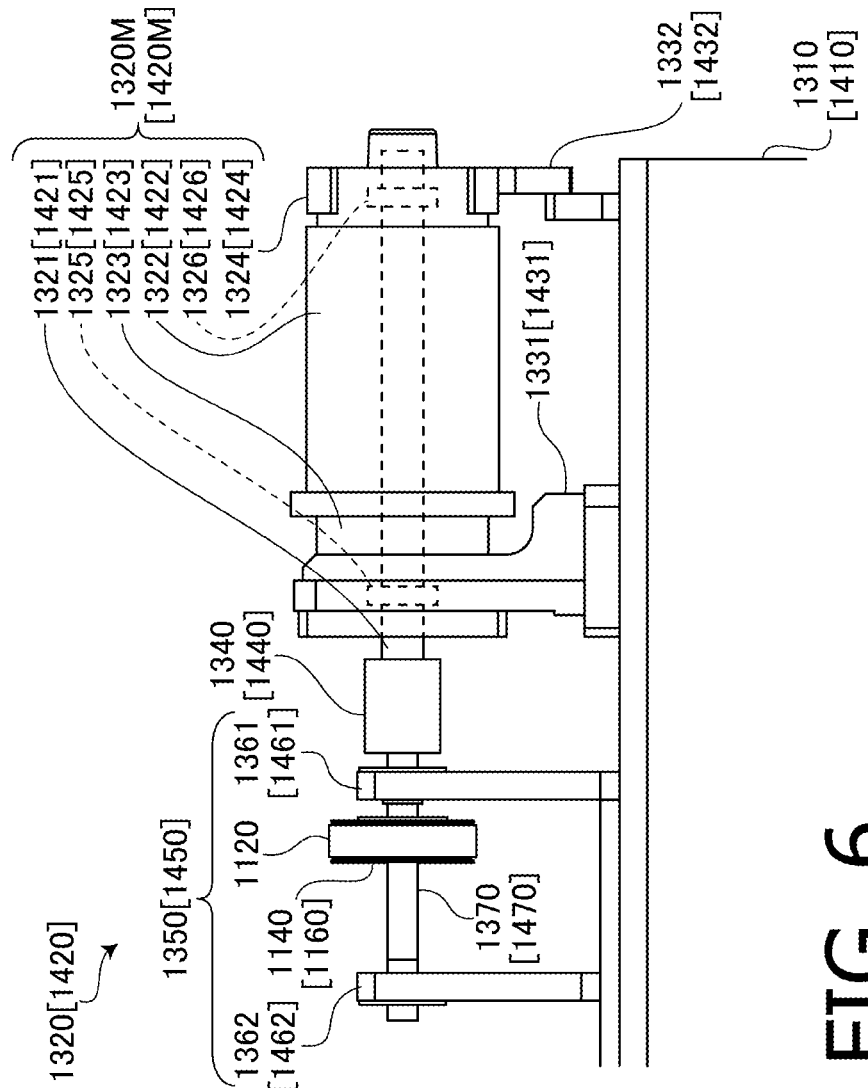
FIG. 6 is a side view of a drive module of the first embodiment of the present disclosure.

FIG. 6 is a front view of the drive module 1320 [1420]. The drive module 1320 [1420] includes a servo motor 1320M [1420M], a first motor support part 1331 [1431], a second motor support part 1332 [1432], a shaft coupling 1340 [1440] and a pulley support part 1350 [1450]. The pulley support part 1350 [1450] includes a pair of bearings 1361 [1461] and 1362 [1462] and a shaft 1370 [1470] rotatably supported by the bearings 1361 [1461] and 1362 [1462].

The servo motor 1320M [1420M] is a super-low inertia and high-power type AC servo motor with an inertia moment being suppressed to equal to or less than 0.01 kg·m² (about 0.008 kg·m²) and with a rated power of 37 kW. It should be noted that inertia moments of standard AC servo motors of the same power are about 0.16 kg·m² and thus the inertia moment of the servo motor 1320M [1420M] of the present embodiment is less than 1/20 of those of standard AC servo motors. By using the motor having the very low inertia moment as described above, it is made possible to drive the table 1240 with a high acceleration of over 20G (196 m/s²). It is noted that the collision simulation test apparatus 1000 of the present embodiment is capable of applying to the table 1240 an impact of a maximum acceleration of 50G (490 m/s²). For use with collision test apparatuses, an inertia moment of a servo motor needs to be equal to or less than about 0.05 kg·m² (preferably equal to or less than 0.02 kg·m², and further preferably equal to or less than 0.01 kg·m²). Even in a case where a small-capacity motor of about 7 kW is to be used, it is preferable to meet this inertia moment value condition. For collision simulation test apparatuses, a low-inertia servomotor of which a ratio between a maximum torque N max and an inertia moment I (i.e., N/I) is at least equal to or more than 1000 (preferably equal to or more than 2500, and further preferably equal to or more than 5000) is suitable.

The servo motor 1320M [1420M] includes a shaft 1321 [1421], a first bearing 1325 [1425] and a second bearing 1326 [1426] that rotatably support the shaft 1321 [1421], a first bracket 1323 [1423] (a load side bracket) that supports the first bearing 1325 [1425], a second bracket 1324 [1424] (an anti-load side bracket) that supports the second bearing 1326 [1426], and a cylindrical stator 1322 [1422] through which the shaft 1321 [1421] penetrates. The first bracket 1323 [1423] and the second bracket 1324 [1424] are fixed to the stator 1322 [1422].

The first bracket 1323 [1423] is fixed to the base block 1310 [1410] via the first motor support part 1331 [1431]. The second bracket 1324 [1424] is fixed to the base block 1310 [14210] via the second motor support part 1332 [1432].

As described above, in the servo motor 1320M [1420M] of the present embodiment, the first bracket 1323 [1423] and the second bracket 1324 [1424] respectively supporting the first bearing 1325 [1425] and the second bearing 1326 [1426] are respectively supported by the first motor support part 1331 [1431] and the second motor support part 1332 [1432]. As a result, the first bearing 1325 [1425] and the second bearing 1326 [1426] are held with high rigidity. Therefore, even if strong torques or bending stresses act on the shaft 1321 [1421], swinging motions (precessional motions) of the shaft 1321 [1421] are suppressed and thus the high driving precision is maintained even in high load conditions. This effect is noticeable especially in high load conditions of equal to or more than 10 kW.

The shaft coupling 1340 [1440] couples the shaft 1321 [1421] of the servo motor 1320M [1420M] and the shaft 1370 [1470] of the pulley support part 1350 [1450] together. The shaft 1370 [1470] is rotatably supported by the pair of bearings 1361 [1461] and 1362 [1462]. The bearings 1361 [1461] and 1362 [1462] are rolling bearings having rolling bodies (balls or rollers). As a material of the rolling bodies, apart from typical steel materials such as stainless steel, ceramic materials such as silicon nitride, silicon carbide or zirconia may be used. Burning of bearings during high-speed driving can be suppressed by using rolling bodies made from ceramics such as silicon nitride. The rolling bodies formed from ceramic material are characterized in that they are lighter, have high heat resistance and have higher precision as compared to common rolling bodies formed from steel.

The first pulley 1140 [second pulley 1160] that drives the toothed belt 1120 is attached to the shaft 1370 [1470]. It is noted that a position where the first pulley 1140 [second pulley 1160] is attached differs for each drive module 1320 [1420]. As shown in FIG. 6, in the drive modules 1320a and 1320d [1420a and 1420d] disposed at a front side of the front driving section 1300 [rear driving section 1400], the first pulley 1140 [second pulley 1160] is attached at the bearing 1361 [1461] side nearer to the servomotor 1320M [1420M], and in the drive modules 1320b and 1320c [1420b and 1420c] disposed at a rear side of the front driving section 1300 [rear driving section 1400], the first pulley 1140 [second pulley 1160] is attached at the bearing 1362 [1462] side farther from the servomotor 1320M [1420M]. With this configuration, adjacent toothed belts 1120 are made drivable with the drive modules 1320a and 1320b [1420a and 1420b] disposed one behind the other and the drive modules 1320d and 1320c [1420d and 1420c] disposed one behind the other.

As shown in FIGS. 1-4, in the front driving section 1300 [rear driving section 1400], four drive modules 1320a-d [1420a-d] are installed at four corners of the top of the base block 1310 [1410] while orienting their rotation axes in the Y axis direction. Furthermore, the drive modules 1320a and 1320d [1420a and 1420d] disposed at the front side and the drive modules 1320b and 1320c [1420b and 1420c] disposed at the rear side are respectively disposed face to face.

The toothed belt 1120a is wound around the first pulley 1140a attached to the drive module 1320a and the second pulley 1160a attached to the drive module 1420a. The toothed belt 1120b is wound around the first pulley 1140b attached to the drive module 1320b and the second pulley 1160b attached to the drive module 1420b. The toothed belt 1120c is wound around the first pulley 1140c attached to the drive module 1320c and the second pulley 1160c attached to the drive module 1420c. The toothed belt 1120d is wound around the first pulley 1140d attached to the drive module 1320d and the second pulley 1160d attached to the drive module 1420d. That is, in the present embodiment, the toothed belts 1120a-d are configured to be respectively driven by a pair of the drive modules 1320a-d and 1420a-d. Since the table 1240 is driven by four toothed belts 1120a-d and, furthermore, the toothed belts 1120a-d are configured to be respectively driven by a pair of the drive modules 1320a-d and 1420a-d, it becomes possible to apply necessary impact to a test piece being large in mass.

The eight toothed pulleys (the first pulleys 1140a-d and the second pulleys 1160a-d) are identical and thus their outer diameters and numbers of teeth are identical. The four toothed belts 1120a-d are identical as well. Furthermore, disposing intervals (inter-axial distances) L between the first pulleys 1140a-d and the second pulleys 1160a-d around which the toothed belts 1120a-d are respectively wound are also identical, and effective lengths of the toothed belts 1120a-d are made the same as well. Accordingly, responses (expansions and contractions) of the toothed belts 1120a-d when driven by respective drive modules 1320a-d and 1420a-d are substantially the same, and thus there is no need to set driving conditions for every toothed belts 1120a-d.

Figure 7:
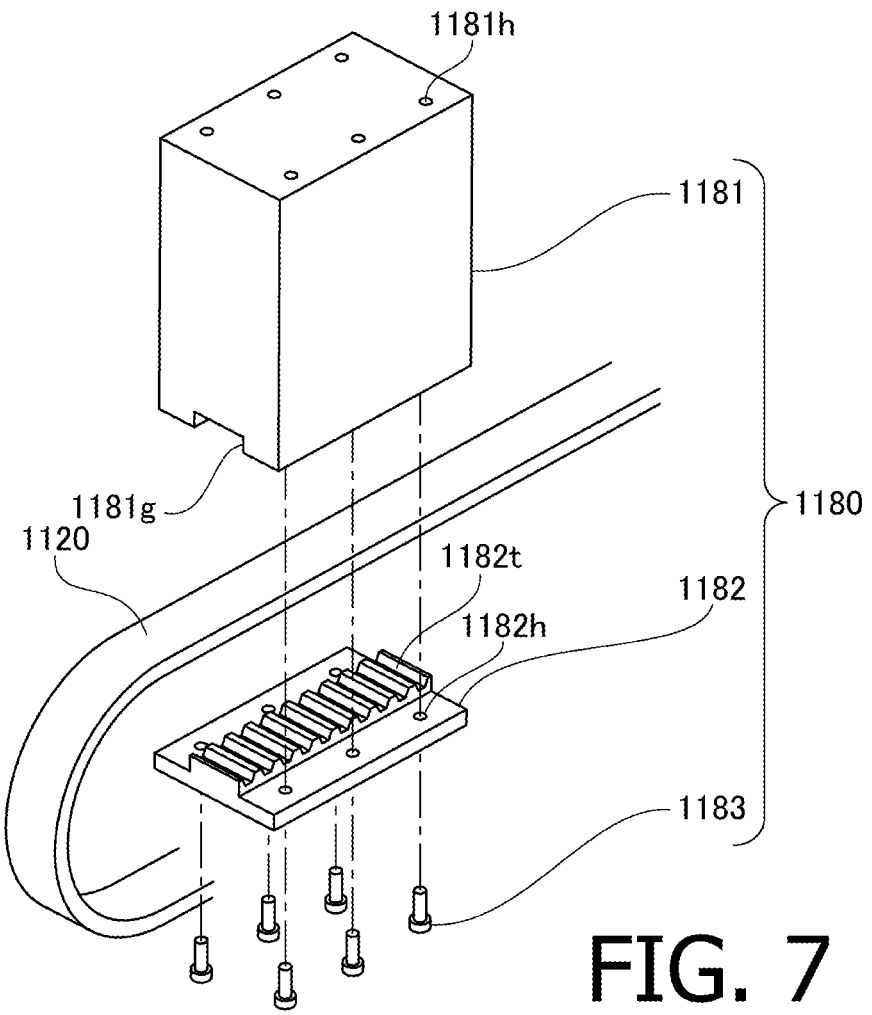
FIG. 7 is an exploded perspective view of a belt clamp of the first embodiment of the present disclosure.

FIG. 7 is an exploded view of the belt clamp 1180. The belt clamp 1180 includes a table attaching part 1181 (an intermediate node fixture) that is to be detachably attached to the table 1240, and a clamp plate 1182 for fixing the toothed belt 1120 by clamping the toothed belt 1120 between the table attaching part 1181 and the clamp plate 1182.

A protruding tooth part 1182t that engages with a tooth profile 1121t (FIG. 8) formed on an inner peripheral surface of the toothed belt 1120 is formed at a center in a width direction of the clamp plate 1182. Furthermore, a groove 1181g into which the toothed belt 1120 and the tooth part 1182t of the clamp plate 1182 are to be fitted is formed on a lower surface of the table attaching part 1181.

The clamp plate 1182A is provided with a plurality of through holes 1182h for fixing the clamp plate 1182 to the table attaching part 1181 with bolts on both sides of the tooth part 1182t in the width direction. Furthermore, screw holes (not shown) are formed on the lower surface of the table attaching part 1181 at positions facing the through holes 1182h. The clamp plate 1182 is attachable to the table attaching part 1181 by fitting bolts 1183 inserted in respective through holes 1182h in the screw holes formed on the lower surface of the table attaching part 1181.

When the toothed belt 1120 is fitted in the groove 1181g of the table attaching part 1181 and the clamp plate 1182 is attached to the table attaching part 1181, the toothed belt 1120 is compressed between the table attaching part 1181 and the clamp plate 1182 and is thereby fixed to the belt clamp 1180. In this state, since the teeth of the toothed belt 1120 are engaged with the tooth part 1182t of the clamp plate 1182, even if a strong impact in a lengthwise direction (X axis direction) is applied to the toothed belt 1120, the toothed belt 1120 does not slide with respect to the belt clamp 1180 and the belt clamp 1180 is driven integrally with the toothed belt 1120.

A plurality of screw holes 1181h for attaching the table attaching part 1181 to the table 1240 are provided on a top surface of the table attaching part 1181. Furthermore, a plurality of through holes (not shown) corresponding to the screw holes 1181*h* are provided to the table 1240. The table 1240 is made to be easily replaceable only by detaching and attaching bolts to these through holes and screw holes 1181*h*. For example, it is possible to prepare dedicated tables 1240 for respective types of test pieces and use the collision simulation test apparatus 1000 while exchanging the table 1240 in accordance with a type of a test piece to be tested. Although the table 1240 of the present embodiment is a flat plate, the table 1240 may have other shapes (e.g., boat shape or box shape). Furthermore, a portion of a vehicle (e.g., a frame) may be used as the table 1240. Test pieces can also be directly attached to the belt clamps 1180 and the carriages 1232.

Figure 8:
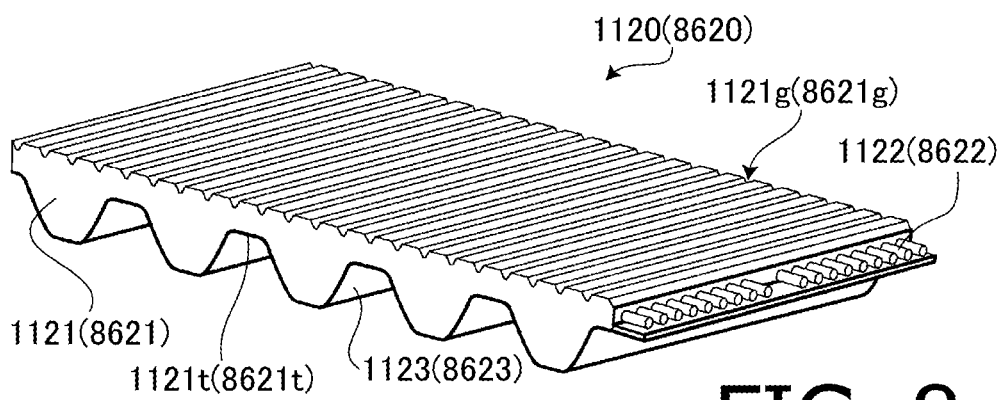
FIG. 8 is a structural drawing of a toothed belt.

FIG. 8 is a diagram showing a structure of the toothed belt 1120. The toothed belt 1120 has a body part 1121 formed from a high-strength and high-modulus base resin, and a plurality of core wires 1122 which are bundles of high-strength and high-modulus fibers. The plurality of core wires 1122 are arranged in a width direction of the toothed belt 1120 at substantially constant intervals. Furthermore, each core wire 1122 is embedded in the body part 1121 while being stretched in a lengthwise direction of the toothed belt 1120 without looseness.

A tooth profile 1121*t* for meshing transmission is formed on the inner peripheral surface of the toothed belt 1120 (a lower surface in FIG. 8). A surface of the tooth profile 1121*t* is covered with a tooth cloth 1123 formed from such as a high-strength polyamide-based fiber having excellent wear resistance. Furthermore, a plurality of grooves 1121*g* extending in the width direction for enhancing flexibility are formed on an outer surface of the toothed belt 1120 at constant intervals in the lengthwise direction.

In the toothed belt 1120 of the present embodiment, carbon core wires formed from light-weight, high-strength and high-modulus carbon fibers are used as the core wire 1122. By the use of the carbon core wires, even when driven with a high acceleration and a high tension acts on the toothed belt 1120, since the toothed belt 1120 hardly expands and contracts, driving powers of the drive modules 1320 and 1420 can be accurately transmitted to the table 1240 and thus it becomes possible to control driving of the table 1240 with high precision. Furthermore, by the use of the light-weight carbon core wires, inertia of the toothed belt 1120 can be reduced significantly as compared to a case where, for instance, metal core wires such as steel wires or steel cords are used. Therefore, driving with a higher acceleration becomes possible while using motors of the same capacity. Furthermore, it becomes possible to use motors of smaller capacities to drive with the same acceleration and thus reduction in size, weight and cost of the apparatus becomes possible.

Also, in the toothed belt 1120 of the present embodiment, high-strength and high-hardness elastomer such as high-strength polyurethane or hydrogenated acrylonitrile butadiene rubber (H—NBR) is used as a base material for forming the body part 1121. By the use of the high-strength and high-hardness base material as described above, since deformation amount of the tooth profile during driving is reduced, occurrence of tooth skipping due to deformation of the tooth profile is suppressed, and thus it becomes possible to control driving of the table 1240 with high precision. Furthermore, since strength of the toothed belt 1120 improves, expansion and contraction of the toothed belt 1120 during driving is reduced, and thus it becomes possible to control driving of the table 1240 with further higher precision.

Collision simulation test apparatuses to be used for assessment of collision safety performances of automobiles and the like need to generate high power that enables to apply, to a test piece, a high acceleration of as high as 20G ($196$ m/s$^2$) and to accurately transmit this acceleration to the table 1240 and the test piece. Members having high rigidity needs to be used for power transmission systems in order to accurately transmit the high acceleration. Power transmission systems having high rigidity include, for instance, a ball screw mechanism, a gear transmission mechanism, a chain transmission mechanism and a wire transmission mechanism.

During the collision simulation test, a maximum speed of the thread reaches 25 m/s (90 km/h). To realize this speed with a ball screw mechanism, a lead with a length exceeding 100 mm is necessary, but manufacturing of a precise ball screw having such a long lead is extremely difficult.

If a gear transmission mechanism or chain transmission mechanism is used, the gear or chain needs to be made to have strength that can withstand the high acceleration. However, improving the strength increases inertia and thus necessitates a motor having higher power. Also, an increase in motor output is accompanied by an increase in inertia moment of the motor itself and thus necessitates a further increase in the power, and thereby causes a large deterioration in energy efficiency and an increase in size of the apparatus. Furthermore, if inertia of the entire apparatus becomes too high, generation and transmission of the high acceleration becomes difficult. A limit of an acceleration using a gear transmission mechanism or chain transmission mechanism is about 3G (29 m/s$^2$) and thus it is not possible to drive the apparatus with the acceleration necessary for the collision simulation test (i.e., at least 20G (196 m/s$^2$)). Furthermore, a gear mechanism or chain mechanism may burn when it is driven with high circumferential speed necessary for the collision simulation test (i.e., ~25 m/s).

A wire transmission mechanism (a winding transmission mechanism in which a wire and a pulley is used) has relatively low inertia but, since power is transmitted by friction only, sliding occurs between the wire and the pulley when driven with the high acceleration and thus it is not possible to transmit motion accurately.

In typical toothed belts such as a timing belt for automobile, core wires formed by stranding glass fiber or aramid fiber are used. Therefore, when driven with a high acceleration exceeding 10G (98 m/s$^2$), expansion and contraction of the toothed belt increases due to poor stiffness and strength of the core wires and thus it is not possible to transmit motion accurately. Furthermore, since low hardness synthetic rubbers such as nitrile rubber or chloroprene rubber are used as a base material in typical toothed belts, tooth skipping apt to occur and thus it is not possible to transmit motion accurately.

There are apparatuses which use a servo valve and a hydraulic cylinder as a driving source, but such apparatuses do not have sufficient response speed and thus cannot accurately re-create impact waveforms that fluctuate at high frequencies of over 200 Hz. Also, a hydraulic pressure system requires a large hydraulic pressure supply facility in addition to a hydraulic pressure device and thus requires a large installation site. Furthermore, the hydraulic pressure systems has problems such as high maintenance and management cost of the hydraulic pressure supply facility and environmental pollution by oil leakage.

The inventors of the present disclosure carried out a huge number of test productions and experiments regarding various types of transmission mechanisms such as the above-mentioned ball screw mechanism, gear transmission mechanism, chain transmission mechanism, wire transmission mechanism and belt transmission mechanism and achieved to develop, as the sole configuration that makes it possible to realize the high acceleration of as high as 20G (196 m/s$^2$), the drive system of the present embodiment that uses, in combination, the super-low inertia electric servo motor and the special light and high-strength toothed belt being a composite of the carbon core wire and the high-modulus elastomer base.

FIG. 9 is a block diagram showing an outline of a control system 1000a of the collision simulation test apparatus 1000. The control system 1000a includes a control part 1500 for controlling operations of the whole apparatus, a measuring part 1600 for measuring an accelerations of the table 1240, and an interface part 1700 for performing input from and output to the outside.

The interface part 1700 includes, for instance, one or more of user interfaces for performing input from and output to a user, network interfaces for connecting to various networks such as a LAN (Local Area Network), and various communication interfaces for connecting to external devices such as USB (Universal Serial Bus) or GPIB (General Purpose Interface Bus). The user interface also includes one or more of various input/output devices such as, for instance, various operation switches, indicators, various display devices such as an LCD (Liquid Crystal Display), various pointing devices such as a mouse or touch pad, a touch screen, a video camera, a printer, a scanner, a buzzer, a speaker, a microphone and a memory card reader/writer.

The measuring part 1600 includes an acceleration sensor 1620 attached to the table 1240, and generates measurement data by subjecting signals from the acceleration sensor 1620 to amplification and digital conversion and sends the measurement data to the control part 1500.

eight servo motors 1320M and 1420M are connected to the control part 1500 via servo amplifiers 1800. The control part 1500 and each servo amplifier 1800 are communicably connected with an optical fiber and thus it is made possible to execute high speed feedback control between the control part 1500 and each servo amplifier 1800. With this configuration, synchronous control with higher precision (with high resolution and high accuracy along the time axis) is made possible.

The control part 1500 is capable of applying an acceleration to the table 1240 in accordance with an acceleration waveform by synchronously controlling driving of the servomotors 1320M and 1420M of the drive modules 1320a-d and 1420a-d based on an acceleration waveform input through the interface part 1700 and/or measurement data input through the measuring part 1600. It is noted that, in the present embodiment, all of the eight servomotors 1320M and 1420M are driven in the same phase (To be exact, the drive modules 1320a, 1320b, 1420a and 1420b on the left side are driven in opposite phase (in opposite rotating direction) with respect to the drive modules 1320c, 1320d, 1420c and 1420d on the right side).

As acceleration waveforms, apart from basic waveforms such as sine waves, sine half waves, saw-tooth waves, triangular waves and trapezoidal waves, acceleration waveforms measured in actual vehicle collision tests, acceleration waveforms obtained by collision simulation calculations, or other arbitrarily synthesized waveforms (e.g., waveforms generated using function generators or the like) may be used.

Figure 10:
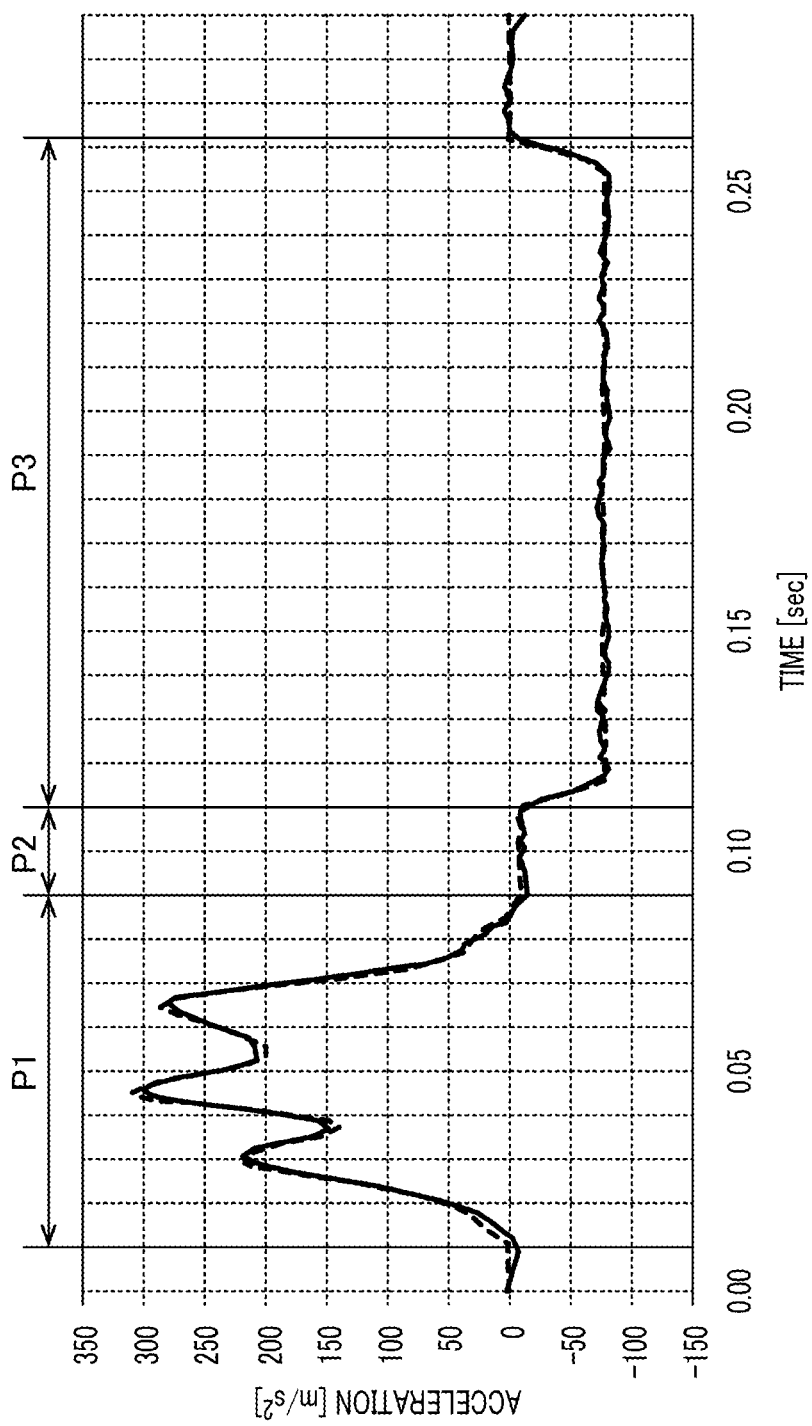
FIG. 10 is a graph showing an exemplary acceleration waveform.
Figure 11:
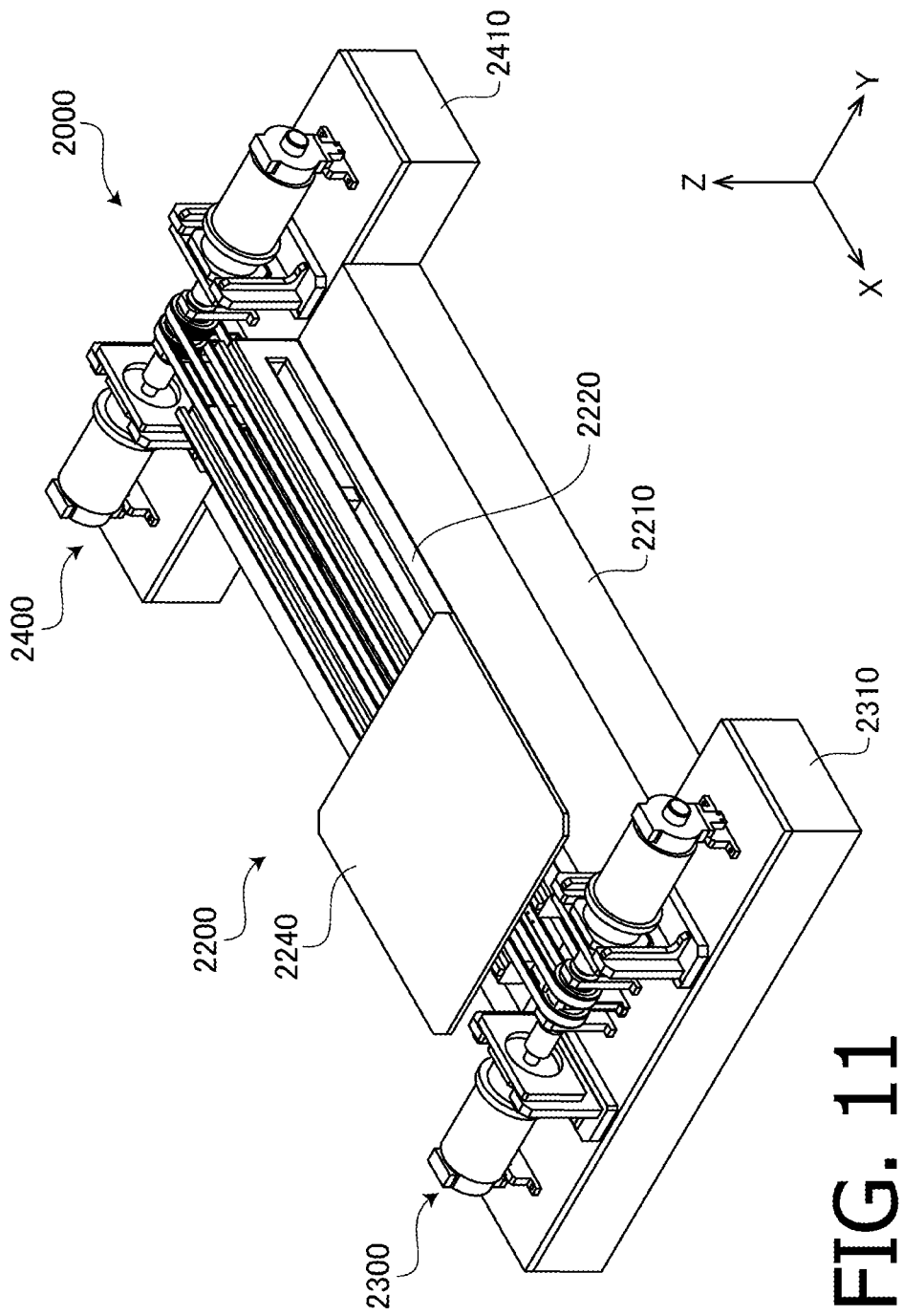
FIG. 11 is a perspective view of a collision simulation test apparatus according to a second embodiment of the present disclosure.

FIG. 10 is an exemplary acceleration waveform when a test was performed with a dummy weight (a rectangular parallelepiped stainless steel block) fixed on the table 1240 as a test piece. In FIG. 10, a broken line represents a target waveform and a solid line represents an actually measured waveform. In this test, in the initial first phase (P1), a test acceleration having a waveform measured during an actual vehicle collision test is applied to the test piece. In the subsequent second phase (P2), a state in which the acceleration is zero (a state in which the speed is constant) is maintained for a predetermined time period (e.g., 0.01 second). In the subsequent third phase (P3), the test piece is decelerated in a substantially constant acceleration such that an absolute value of the acceleration becomes equal to or less than a predetermined value. As shown in FIG. 10, it has been confirmed that an acceleration waveform well matched with the target waveform can be applied to the test piece by using the collision simulation test apparatus 1000 of the present embodiment.

Furthermore, the collision simulation test apparatus 1000 of the present embodiment is completely different from conventional thread test apparatuses in that every motion of the test piece (or the table 1240) during the test is numerically controlled. Since every motion during the test is controlled, it is made possible to easily apply impacts of various acceleration waveforms to the test piece.

In conventional thread test apparatuses, the thread freely travels since motions of the thread after application of an impact cannot be controlled. Therefore, a long traveling track is necessary. In contrast, since the collision simulation test apparatus 1000 of the present embodiment is capable of immediately stopping the thread with an appropriate acceleration (i.e., an acceleration that is gentle enough not to substantially affect a test result) after application of an impact, a traveling track (i.e., the rails 1231) can be made shorter and thus an installation space for the apparatus can be considerably reduced. For example, lengths of the rails 1231 of the present embodiment are just 2 meters.

In conventional thread test apparatuses, it is necessary to perform work for moving the traveled thread back to its initial position after the test. To execute this work automatically, a mechanism for moving the thread back to its initial position needs to be further provided. Also, since the traveling distance of the thread is long, the mechanism for moving the thread back to its initial position becomes large and a certain amount of time is necessary for a process to move the thread back to its initial position. The mechanism for moving the thread back to its initial position may be downsized by incorporating the mechanism for traveling by itself in the thread but, since this increases weight of the thread, there arises a problem that the acceleration during the test decreases. In contrast, since the collision simulation test apparatus 1000 of the present embodiment is capable of automatically returning the table 1240 to its initial position using the mechanism for applying impacts to the table 1240, there is no need to separately provide a dedicated mechanism for returning the table 1240 back to its initial position. Additionally, since the distance the table 1240 travels during the test is short as described above, the table 1240 can be returned to its initial position in a very short time period (e.g., 1-2 seconds).

In pressure accumulating type thread test apparatuses that generate impacts using pressure accumulated in an accumulator or the like, since time is necessary for charging (pressure accumulation), it is necessary to provide certain time intervals between tests. In contrast, since the collision simulation test apparatus 1000 of the present embodiment does not need charging, tests can be performed continuously without time intervals. Accordingly, tests can be performed more efficiently.

In pressure accumulating type thread test apparatuses, ultrahigh hydraulic pressure is used. Therefore, if hydraulic pressure leakage occurs, there is a risk that workers get injured by the spurting high-pressure hydraulic oil. Additionally, since the thread travels for a long distance in an uncontrolled state, there is a risk that workers bump into the traveling thread and get injured. In contrast, since the collision simulation test apparatus 1000 of the present embodiment does not use hydraulic pressure and does not let the thread travel in an uncontrolled state, it is made possible to safely perform tests.

Also, as shown in FIG. 2, the four toothed belts 1120*a-d* are alternately shifted forward and backward to dispose them in a zigzag manner. With this configuration, it is made possible to drive each of the toothed belts 1120 with respective one of the four pairs of drive modules 1320 and 1420 while keeping inter-axial distances L of the four toothed belts 1120 the same.

Second Embodiment

The collision simulation test apparatus 1000 of the first embodiment described above is a high-power type apparatus suitable for testing test pieces being relatively heavy in weight or for tests with a higher acceleration. However, a collision simulation test apparatus 2000 according to the second embodiment of the present disclosure which will be described in the following is a medium-power type apparatus suitable for testing lighter test pieces.

FIG. 11, FIG. 12, FIG. 13 and FIG. 14 are a perspective view, plan view, front view and side view of the collision simulation test apparatus 2000, respectively.

In the collision simulation test apparatus 2000 of the second embodiment, a configuration in which two pairs of servo motors 2320M and 2420M, being a half of the number of pairs of servomotors of the first embodiment, are used to drive two toothed belts 2120*a* and 2120*d* is adopted.

Figure 12:
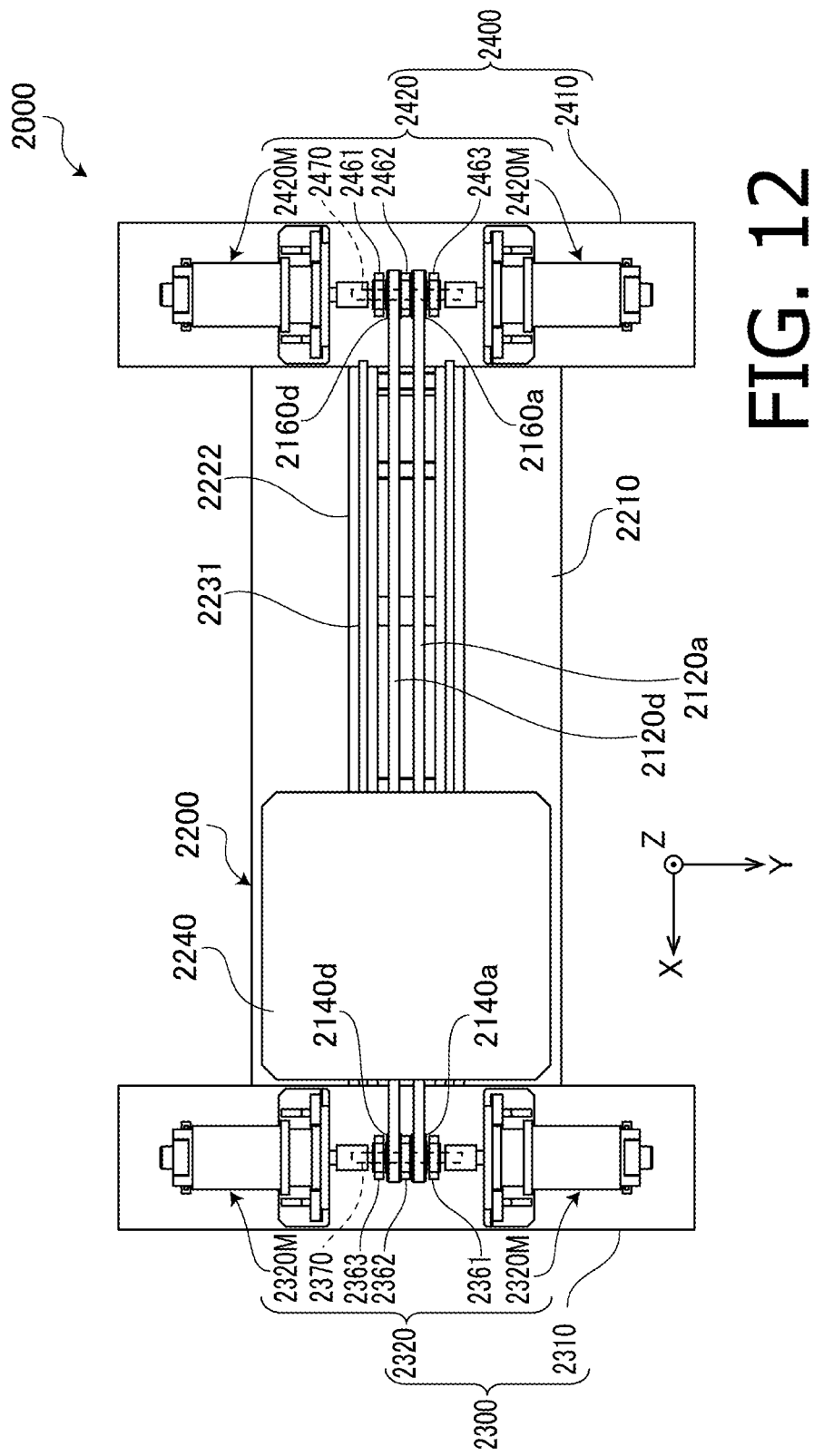
FIG. 12 is a plan view of the collision simulation test apparatus according to the second embodiment of the present disclosure.

Also, the front driving section 1300 [rear driving section 1400] of the first embodiment described above includes four drive modules 1320*a-d* [1420*a-d*] each having one servo motor 1320M [1420M] but, as shown in FIG. 12, a front driving section 2300 [rear driving section 2400] of the present embodiment includes a single drive module 2320 [2420] having two servo motors 2320M [2420M] installed on a base block 2310 [2410]. In other words, in the present embodiment, a drive module 2320 [2420] having a configuration in which two servo motors 2320M [2420M] are coupled together is adopted.

In particular, the drive module 2320 [2420] includes a single shaft 2370 [2470] rotatably supported by three bearings 2361, 2362 and 2363 [2461, 2462 and 2463]. One of the servo motors 2320M [2420M] is connected to one end of the shaft 2370 [2470], and the other of the servo motors 2320M [2420M] is coupled to the other end of the shaft 2370 [2470]. That is, in the present embodiment, the single shaft 2370 of the drive module 2320 [2420] is synchronously driven by the two servo motors 2320M [2420M]. Such servo motor connection structure is realized by a high-precision synchronous control with use of high-speed optical digital communication between the control part 2500 and each of the servo amplifiers 2800. According to this configuration, the shaft 2370 [2470] can be driven with greater power. Furthermore, it is made possible to reduce the number of bearings by the two servo motors 2320M [2420M] sharing the single shaft 2370 [2470] and thus it is made possible to make the apparatus compact.

In the drive module 2320 [2420] of the present embodiment, two toothed belts 2120*a* and 2120*d* are driven by two first pulleys 2140*a* and 2140*d* [second pulleys 2160*a* and 2160*d*] attached to the single shaft 2370 [2470]. Therefore, in the drive module 2320 [2420], a totally synchronous control of the two toothed belts 2120*a* and 2120*d* (hereinafter occasionally collectively referred to as the toothed belt(s) 2120) is realized.

Figure 13:
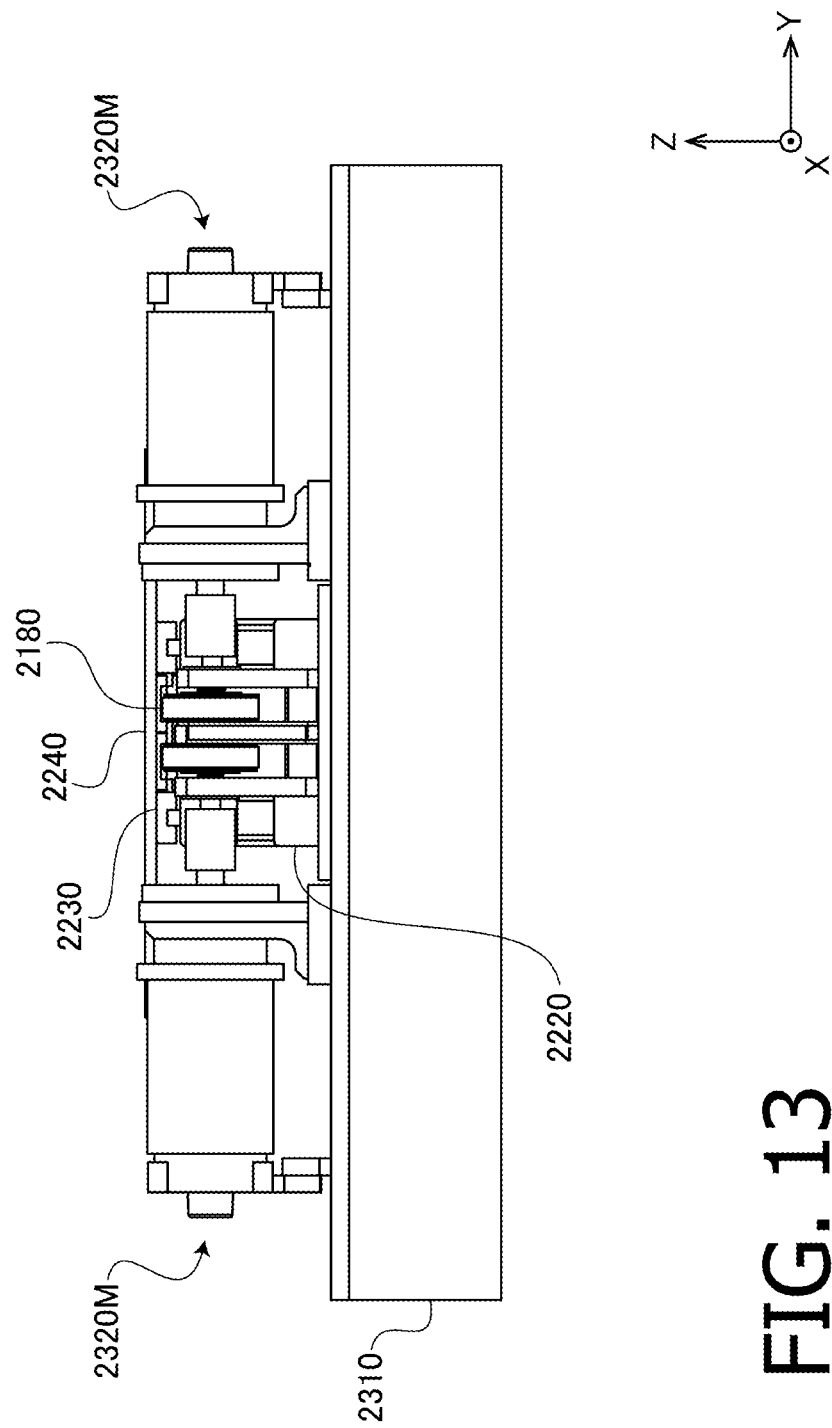
FIG. 13 is a front view of the collision simulation test apparatus according to the second embodiment of the present disclosure.
Figure 14:
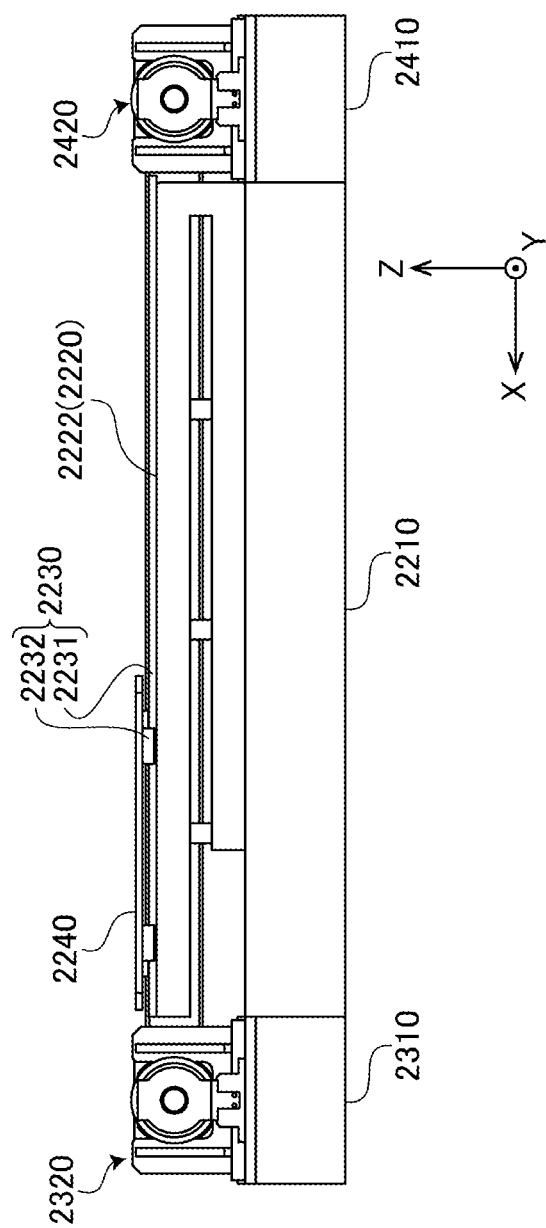
FIG. 14 is a side view of the collision simulation test apparatus according to the second embodiment of the present disclosure.

As with the testing section 1200 of first embodiment, the testing section 2200 of the present embodiment includes a base block 2210, a frame 2220, a pair of linear guides 2230 (rails 2231 and carriages 2232), and a table 2240 supported by the pair of linear guides 2230 to be movable only in the X axis direction (driving direction). However, the testing section 2200 of the present embodiment does not adopt a configuration of the first embodiment in which the inter-axial distance L in each of the belt mechanisms 1100*a-d* is shortened by disposing the drive modules 1320*b* and 1320*c* under the rail support parts 1222 of the frames 1220 (FIG. 4). Therefore, in the present embodiment, as shown in FIGS. 13-14, heights of rail supports parts 2222 of frames 2220 are lowered. As such, heights of belt clamps 2180 (FIG. 13) are lowered. Since inertia of the belt clamps 2180 decreases due to the lowering of the belt clamps 2180, a high acceleration performance can be obtained with low power. Furthermore, since moments of force around the Y axis that act on the belt clamps 2180 (and the toothed belts 2120) during driving decrease due to the lowering of the belt clamps 2180 and bending deformations of the toothed belts 2120 decrease, driving power transmission precision improves.

Third Embodiment

Figure 15:
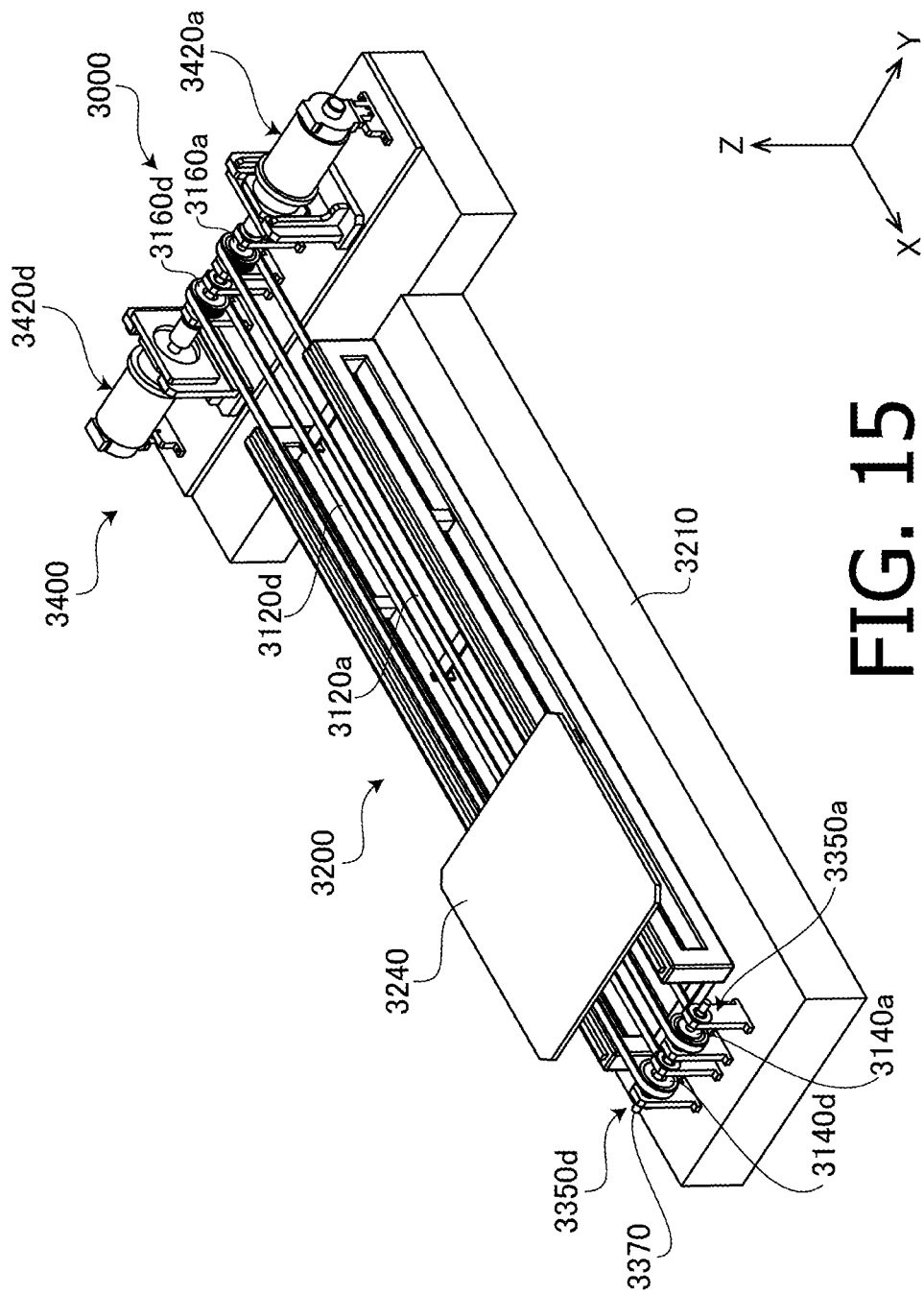
FIG. 15 is a perspective view of a collision simulation test apparatus according to a third embodiment of the present disclosure.

FIG. 15 is a perspective view of a collision simulation test apparatus 3000 according to a third embodiment of the present disclosure. The collision simulation test apparatus 3000 of the present embodiment is a low-power type apparatus suitable for testing further lighter test pieces as compared to the collision simulation test apparatus 2000 of the second embodiment.

In the collision simulation test apparatus 3000 of the third embodiment, a configuration in which two drive modules 3420*a* and 3420*d*, being one fourth of the number of servomotors of the first embodiment, are used to drive two toothed belts 3120*a* and 3120*d* is adopted.

The collision simulation test apparatus 3000 only includes a testing section 3200 and a rear driving section 3400 as mechanical sections and thus does not include a front driving section. In the present embodiment, in place of the front driving section 1300 of the first embodiment (in particular, the pulley support parts 1350 of the drive modules 1320*a* and 1320*d*), a pair of pulley support parts 3350*a* and 3350*d* is provided at a front end portion of the testing section 3200 (a base block 3210).

The pulley support parts 3350*a* and 3350*d* have the same configuration as the pulley support parts 1350 of the first embodiment apart from disposing intervals of bearings and a length of the shaft 3370. A first pulley 3140*a* is attached to the shaft 3370 of the pulley support part 3350*a*, and a first pulley 3140*d* is attached to the shaft 3370 of the pulley support part 3350*d*. The toothed belt 3120*a* is wound around the first pulley 3140*a* of the pulley support part 3350*a* and a second pulley 3160*a* of the rear driving section 3400. The toothed belt 3120*d* is wound around the first pulley 3140*d* of the pulley support part 3350*d* and the second pulley 3160*d* of the rear driving section 3400. No servo motor is connected to the shaft 3370 of the pulley support parts 3350a and 3350d and thus the first pulley 3140a and 3140d function as driven pulleys.

In the belt transmission, power is transmitted by traction force (tensile force) of the belt. In the impact test, it is necessary to apply a high acceleration in a decelerating direction (rearward direction) to the test piece. It is also possible to dispose the driving section forward of the testing section 3200 and to dispose the driven pulley rearward of the testing section 3200 but, in this case, since the impact is applied to the test piece with a traction of a portion of the belt which is connected to a table 3240 after being folded back at the driven pulley positioned rearward, a traction length of the belt becomes long. Accordingly, deterioration in driving precision due to expansion and contraction of the belt increases. Therefore, in terms of the test precision, it is advantageous to dispose the driving section rearward of the testing section 3200 as in the present embodiment.

The above-described first embodiment adopts a configuration in which high power is applied to the toothed belt 1120 by winding the toothed belt 1120 around a pair of drive pulleys (the first pulley 1140 and the second pulley 1160) to combine powers of the two servo motors 1320M and 1420M. One way of applying a further greater power to the toothed belt 1120 is to increase a power of each servo motor. However, if a power of a servo motor is increased by simply enlarging (enlarging diameter) of a rotor, inertia moment of the servo motor increases and it becomes impossible to drive the servo motor with a high acceleration.

In order to increase a power of a servo motor while keeping its high acceleration performance, it is beneficial to make a rotor long and thin. Hereinafter, a low-inertia and high-power servomotor (unit) developed by the inventors of the present disclosure based on such design concept will be described. In the above-described embodiments, servo motors (units) such as those in the fourth, fifth and sixth embodiments which will be described later may be used in place of the servo motors in the above-described embodiments.

Fourth Embodiment

Hereinafter, a collision simulation test apparatus according to a fourth embodiment of the present disclosure will be described. The collision simulation test apparatus of the fourth embodiment differs from the collision simulation test apparatus 1000 of the first embodiment in that the collision simulation test apparatus of the fourth embodiment includes servo motor units 4320M and 4420M which will be described later in place of the servo motors 1320M and 1420M of the first embodiment. It is noted that, since the servo motor units 4320M and 4420M have the same configuration, redundant descriptions regarding the servo motor 4420M will be herein omitted.

Figure 16:
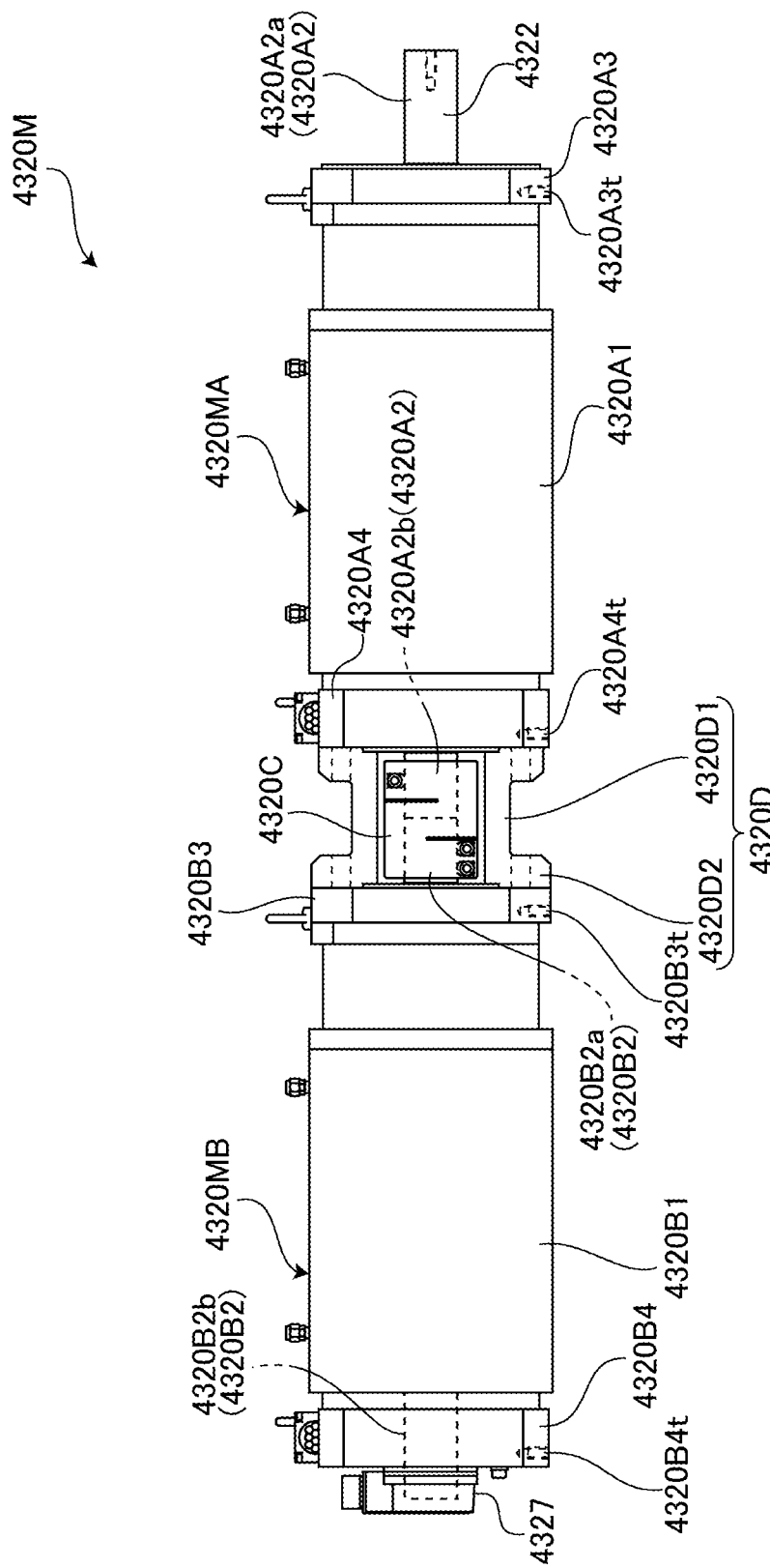
FIG. 16 is a side view of a servo motor unit of a fourth embodiment of the present disclosure.

FIG. 16 is a side view of the servo motor unit 4320M of the fourth embodiment of the present disclosure. The servo motor unit 4320M is formed by coupling two servo motors 4320MA and 4320MB in series.

The servo motor 4320MB have the same configuration as the servo motors 1320M and 1420M of the first embodiment. The servo motor 4320MA is a biaxial servo motor in which both ends of a shaft 4320A2 protrude to the outside to form two connecting shafts (a first shaft 4320A2a and a second shaft 4320A2b). The first shaft 4320A2a of the servo motor 4320MA is the only output shaft 4322 that the servo motor unit 4320M has. It is noted that the servo motor 4320MA have the same configuration as the servo motor 4320MB apart from the servo motor 4320MA having the second shaft 4320A2b and not including a rotary encoder 4327 which will be described later. Accordingly, in the following description regarding the servo motor 4320MB, numerals of corresponding components in the servo motor 4320MA will be indicated within brackets [ ].

In the following description regarding the servo motor unit 4320M, a side on which the output shaft 4322 protrudes (the right side in FIG. 16) will be referred to as a load side, and the opposite side will be referred to as an anti-load side. Each of the biaxial servo motor 4320MA and the servo motor 4320MB is a high-output and super-low inertia servo motor with a rated power of 37 kW which produces torque of a maximum of as high as 350 N·m and of which inertia moment of a rotating part is suppressed to equal to or less than $10^{-2}$ kg·m².

The servo motor 4320MB [4320MA] includes a cylindrical main body 4320B1 [4320A1] (stator), a shaft 4320B2, a first bracket 4320B3 [4320A3] (load side bracket), a second bracket 4320B4 [4320A4] (anti-load side bracket) and a rotary encoder 4327. On lower surfaces of the first bracket 4320B3 [4320A3] and the second bracket 4320B4 [4320A4], respective pairs of screw holes 4320B3t [4320A3t] and 4320B4t [4320A4t] are provided.

One end part 4320B2a of the shaft 4320B2 on the load side penetrates through the first bracket 4320B3, protrudes to the outside of a motor casing and forms an output shaft 4320B2a. On the other hand, the rotary encoder 4327 for detecting rotation displacement of the shaft 4320B2 is attached on an attachment seat of the second bracket 4320B4 (a left side face in FIG. 16). The other end part 4320B2b of the shaft 4320B2 penetrates through the second bracket 4320B4 and is connected to the rotary encoder 4327.

As shown in FIG. 16, the output shaft 4320B2a of the servo motor 4320MB and the second shaft 4320A2b of the biaxial servo motor 4320MA are coupled together by a shaft coupling 4320C. The first bracket 4320B3 of the servo motor 4320MB and the second bracket 4320A4 of the biaxial servo motor 4320MA are coupled together with a predetermined interval therebeween by a coupling flange 4320D.

The coupling flange 4320D has a cylindrical body part 4320D1 and two flange parts 4320D2 extending outward in a radial direction from respective ends of the body part 4320D1 in its axial direction. The flange parts 4320D2 are respectively provided with through holes for fixing bolts, the through holes being at positions corresponding to the screw holes provided to the attachment seats of respective one of the first bracket 4320B3 and the second bracket 4320A4, and are fixed to respective one of the first bracket 4320B3 and the second bracket 4320A4 using bolts.

As described above, in order to increase a power of a motor while keeping its high acceleration performance, it is beneficial to make a rotor long and thin. However, if intervals for supporting a shaft with bearings are made too long, deflection vibration of the shaft warping in arch becomes marked due to insufficient stiffness of the shaft, and performance of the motor rather deteriorates. Therefore, in configurations in which a rotation shaft is supported in a conventional way only at both ends of a motor casing using a pair of bearings, there is a limit on increasing capacity while keeping inertia moment low.

In the servo motor unit 4320M of the present embodiment, a long and thin rotor is realized, without designing a new dedicated rotor, by the simple configuration in which shafts of two servo motors are coupled together with a shaft coupling. Furthermore, the interval for supporting a shaft with bearings is maintained by the simple configuration in which main bodies of two servo motors are coupled together with a coupling flange. Therefore, a rotor can be supported with high rigidity even when elongated and thus becomes possible to operate stably. Accordingly, the servo motor unit 4320M of the present embodiment is capable of generating high torques that fluctuate at high frequencies which could not be generated using conventional servo motors. It is noted that the servo motor unit 4320 itself (i.e., in unloaded condition) is capable of being driven at an angular acceleration of equal to or more than 30000 rad/s$^2$.

Fifth Embodiment

Hereinafter, a collision simulation test apparatus according to a fifth embodiment of the present disclosure will be described. The collision simulation test apparatus of the fifth embodiment differs from the collision simulation test apparatus 1000 of the first embodiment in that the collision simulation test apparatus of the fifth embodiment includes servo motors 5320M and 5420M which will be described later in place of the servo motors 1320M and 1420M of the first embodiment. Since the servo motors 5320M and 5420M have the same configuration, redundant explanation regarding the servo motor 5420M will be herein omitted.

Figure 17:
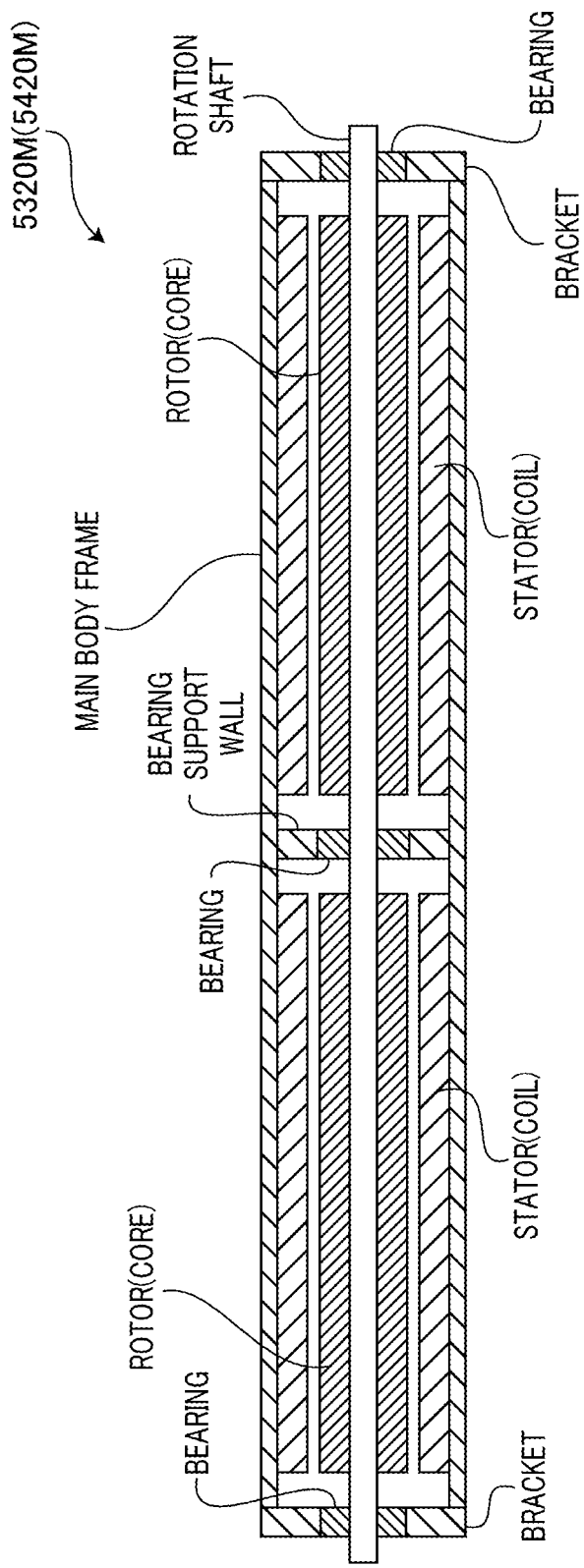
FIG. 17 is a side sectional view of a servo motor of a fifth embodiment of the present disclosure.

FIG. 17 is a lateral sectional view of the servo motor 5320M of the fifth embodiment of the present disclosure. The above-described servo motor unit 4320M of the fourth embodiment adopts the configuration in which the main bodies (stators) of the two servo motors are coupled together with the coupling flange 4320D. However, the servomotor 5320M of the present embodiment does not use the coupling flange 4320D but uses a single main body frame being integrally formed. The main body frame of the present embodiment is longer than the servo motors 4320MA and 4320MB of the fourth embodiment and has substantially the same overall length as the servo motor unit 4320M. The main body frame of the present embodiment is provided with a total of three bearings disposed at constant intervals at both ends and midway in its lengthwise direction. A rotation shaft is rotatably supported by these bearings. At both ends of the cylindrical main body frame in its lengthwise direction, a pair of brackets for supporting the bearings is provided. On an inner periphery of the main body frame at a central part in its lengthwise direction, a bearing support wall for supporting the bearing is provided. Furthermore, on an inner periphery of the main body frame, coils are respectively attached between respective brackets and the bearing support wall to form a main body (stator). On an outer periphery of the rotation shaft, cores are provided at positions opposing to respective coils to form a rotor.

In the present embodiment, since it is possible to design dedicated shaft (rotor) and main body (stator) respectively, it is possible to realize motors having further higher performances by optimizing design of the whole servo motor 5320M.

It is noted that the numbers of bearings and coils are not limited to the configuration shown in FIG. 17. For example, two or more bearings and bearing support walls may be provided midway in the lengthwise direction of the main body frame. It is preferable to provide the bearings at substantially constant intervals in the lengthwise direction of the main body frame. In this case, cores and coils may be provided to respective spaces between adjacent bearings.

Sixth Embodiment

Hereinafter, a collision simulation test apparatus 6000 according to a sixth embodiment of the present disclosure will be described. The collision simulation test apparatus 6000 differs from the collision simulation test apparatus 1000 of the first embodiment in that a front driving section 6300 and a rear driving section 6400 of the collision simulation test apparatus 6000 includes servo motor units 6320M and 6420M which will be described later in place of the servo motors 1320M and 1420M of the first embodiment. It is noted that the servo motor units 6320M and 6420M have the same configuration. Accordingly, in the following description regarding the servo motor 6320M, numerals of corresponding components in the servo motor 6420M will be indicated within brackets [ ].

Figure 18:
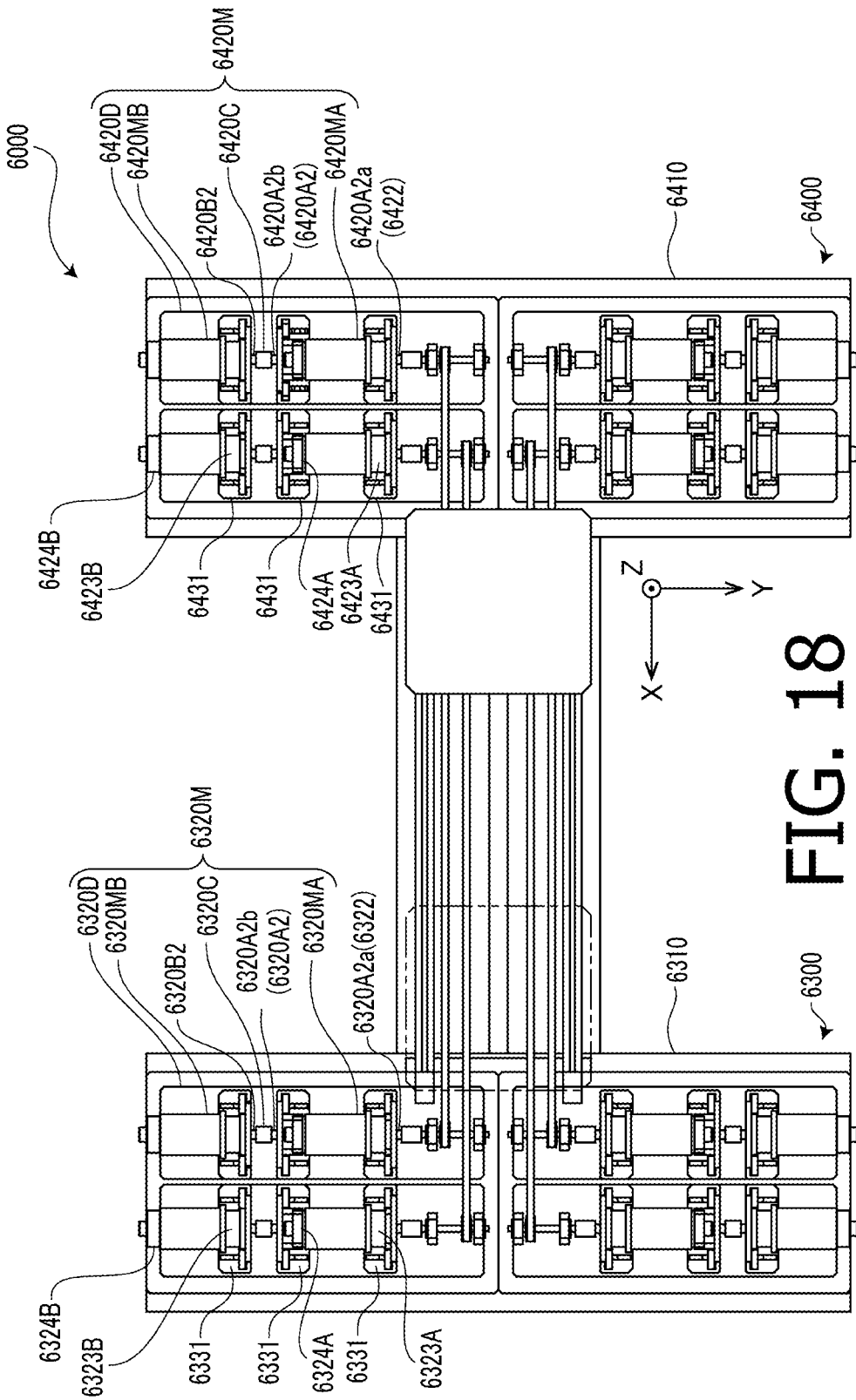
FIG. 18 is a plan view of a collision simulation test apparatus according to a sixth embodiment of the present disclosure.

FIG. 18 is a plan view of the collision simulation test apparatus 6000 according to the sixth embodiment of the present disclosure. The servo motor unit 6320M [6420M] includes two servo motors 6320MA and 6320MB [6420MA and 6420MB] coupled in series. The servo motors 6320MA and 6420MA have the same configuration as the servomotors 1320M and 1420M of the first embodiment.

The servo motor 6320MA [6420MA] is a biaxial servo motor in which both ends of a shaft 6320A2 [6420A2] protrude to the outside to form two shafts (a first shaft 6320A2*a* [6420A2*a*] and a second shaft 6320A2*b* [6420A2*b*]). The servo motor 6320MA [6420MA] has the same configuration as the servomotor 1320M [1420M] of the first embodiment apart from the servo motor 6320MA [6420MA] having the second shaft 6320A2*b* [6420A2*b*] and not including a rotary encoder 1327 (FIG. 3). The first shaft 6320A2*a* [6420A2*a*] of the servo motor 6320MA [6420MA] is the only output shaft 6322 that the servo motor unit 6320M [6420M] has.

With regard to the servo motor 6320MA [6420MA] being a biaxial servo motor, a first bracket 6323A [6423A] and a second bracket 6324A [6424A] are both fixed to a base plate 6320D [6420D] via first motor support parts 6331 having high rigidity. The base plate 6320D [6420D] is fixed to a base block 6310 [6410].

With regard to the servo motor 6320MB [6420MB], a first bracket 6323B [6423B] is fixed to a base plate 6320D [6420D] via a first motor support part 6331 [6431], and a second bracket 6324B [6424B] is fixed to the base plate 6320D [6420D] via a second motor support part (not shown).

That is, in the present embodiment, a main body of the servo motor 6320MA [6420MA] and a main body of the servo motor 6320MB [6420MB] are coupled together via the base plate 6320D [6420D]. In the present embodiment, by the use of the first motor support parts 6331 [6431], having high rigidity, for supporting the second bracket 6324A [6424A] on the anti-load side of the servo motor 6320MA [6420MA] being a biaxial servo motor, it is made possible to couple the main body of the servo motor 6320MA [6420MA] and the main body of the servo motor 6320MB [6420MB] with sufficient rigidity without using the coupling flange 4320D of the fourth embodiment. The elimination of the coupling flange 4320D makes assembly of the servo motor unit 6320M [6420M] easier.

Also, an output shaft 6320B2 [6420B2] of the servo motor 6320MB [6420MB] and the second shaft 6320A2*b* [6420A2*b*] of the servo motor 6320MA [6420MA] are coupled together by a shaft coupling 6320C [6420C].

A total of 16 servo motors 6320MA, 6320MB, 6420MA and 6420MB are connected to a control part via respective separate servo amplifiers and are synchronously controlled by the control part. In the present embodiment, all of the 16 servo motors 6320MA, 6320MB, 6420MA and 6420MB are controlled to drive in accordance with the same acceleration waveform.

Seventh Embodiment

Figure 19:
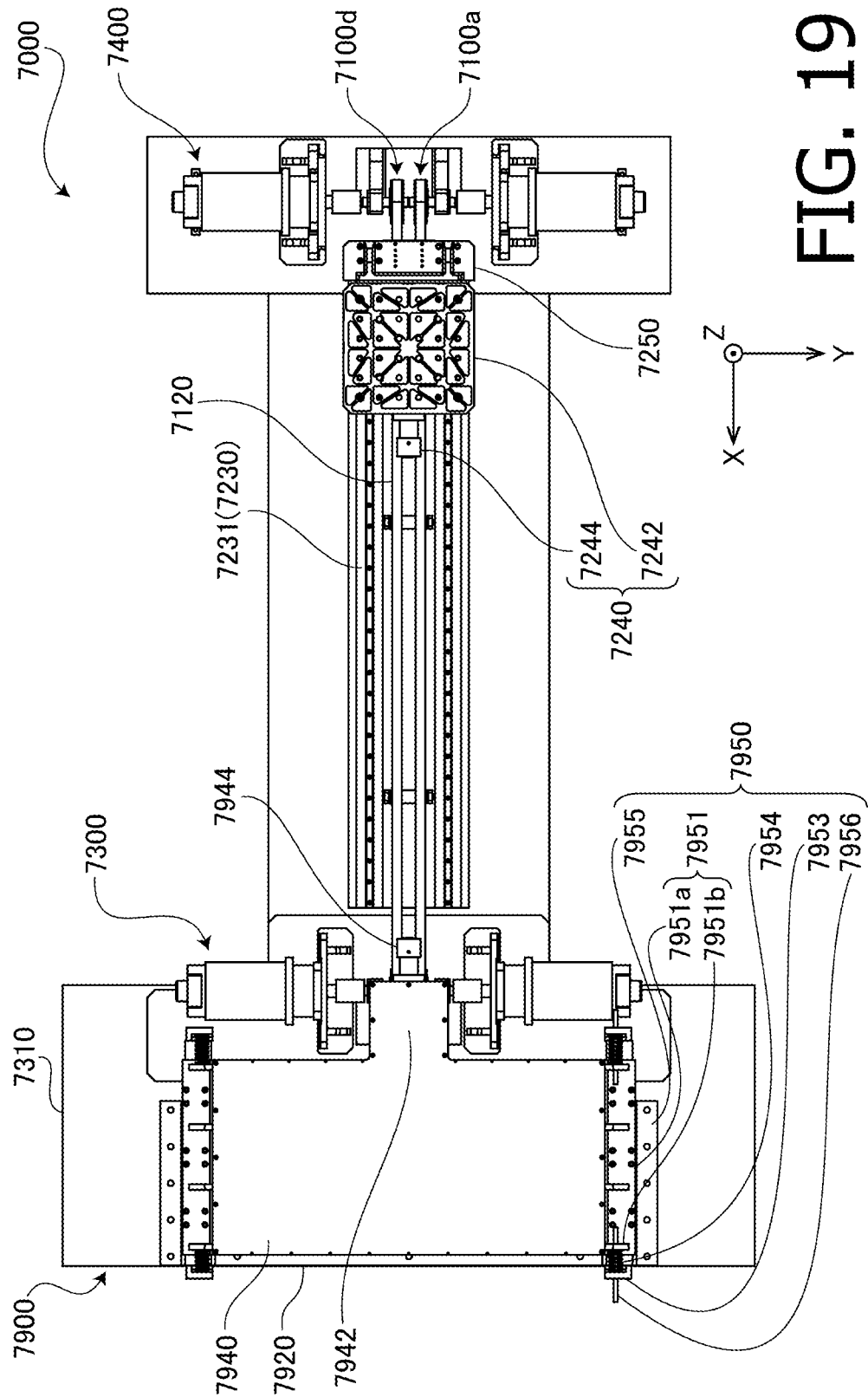
FIG. 19 is a plan view of a collision simulation test apparatus according to a seventh embodiment of the present disclosure.
Figure 20:
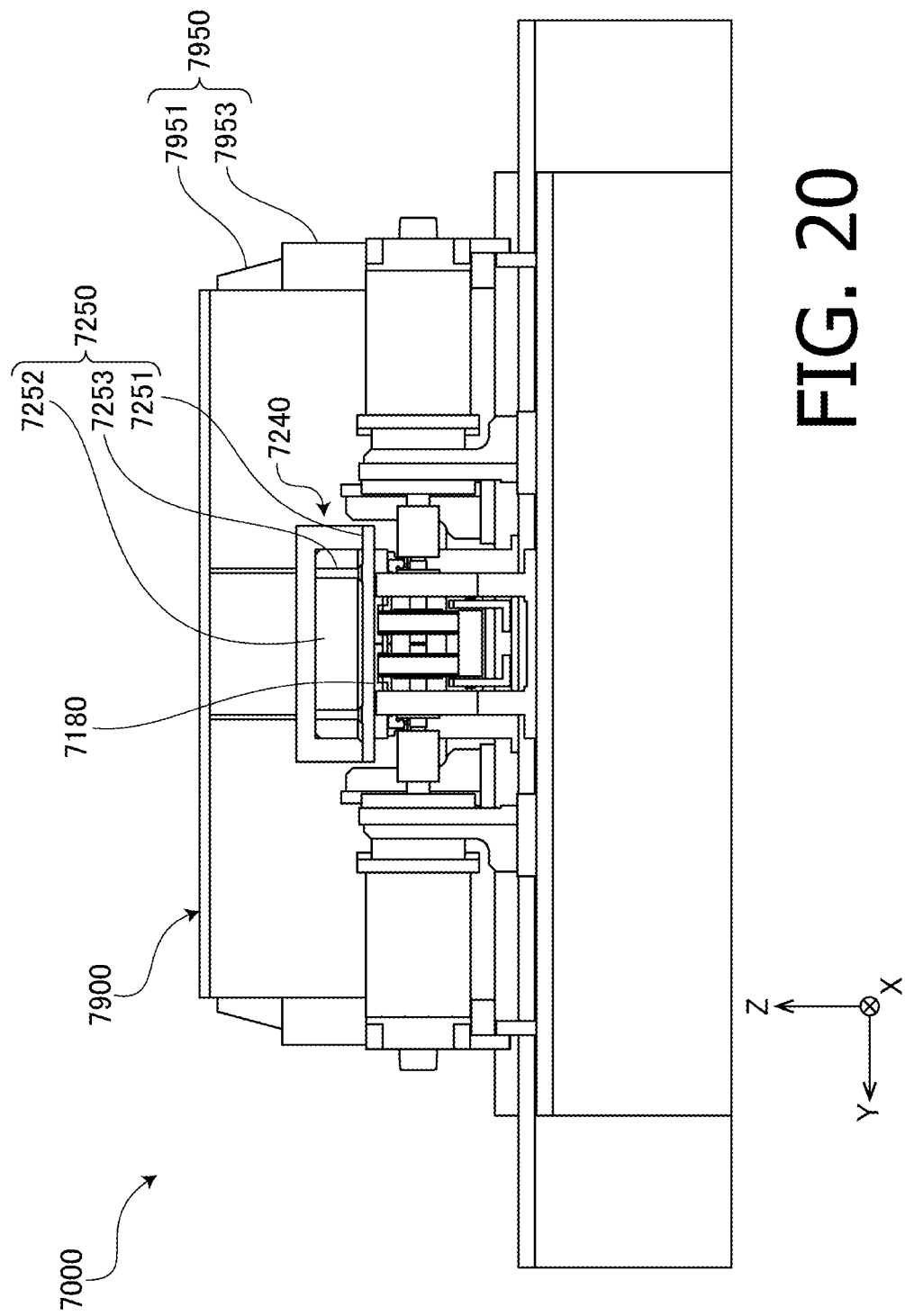
FIG. 20 is a front view of the collision simulation test apparatus according to the seventh embodiment of the present disclosure.
Figure 21:
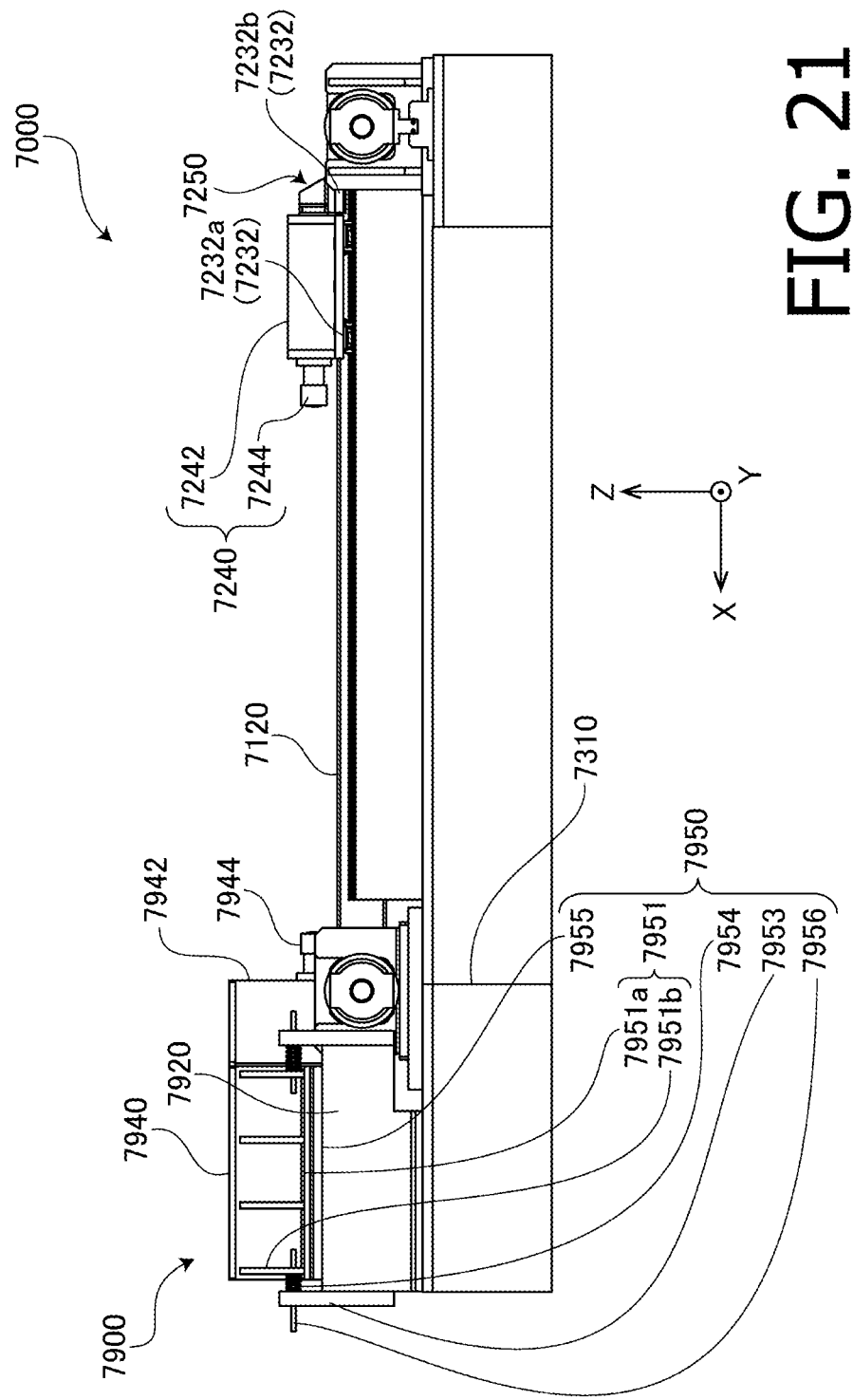
FIG. 21 is a side view of the collision simulation test apparatus according to the seventh embodiment of the present disclosure.
Figure 22:
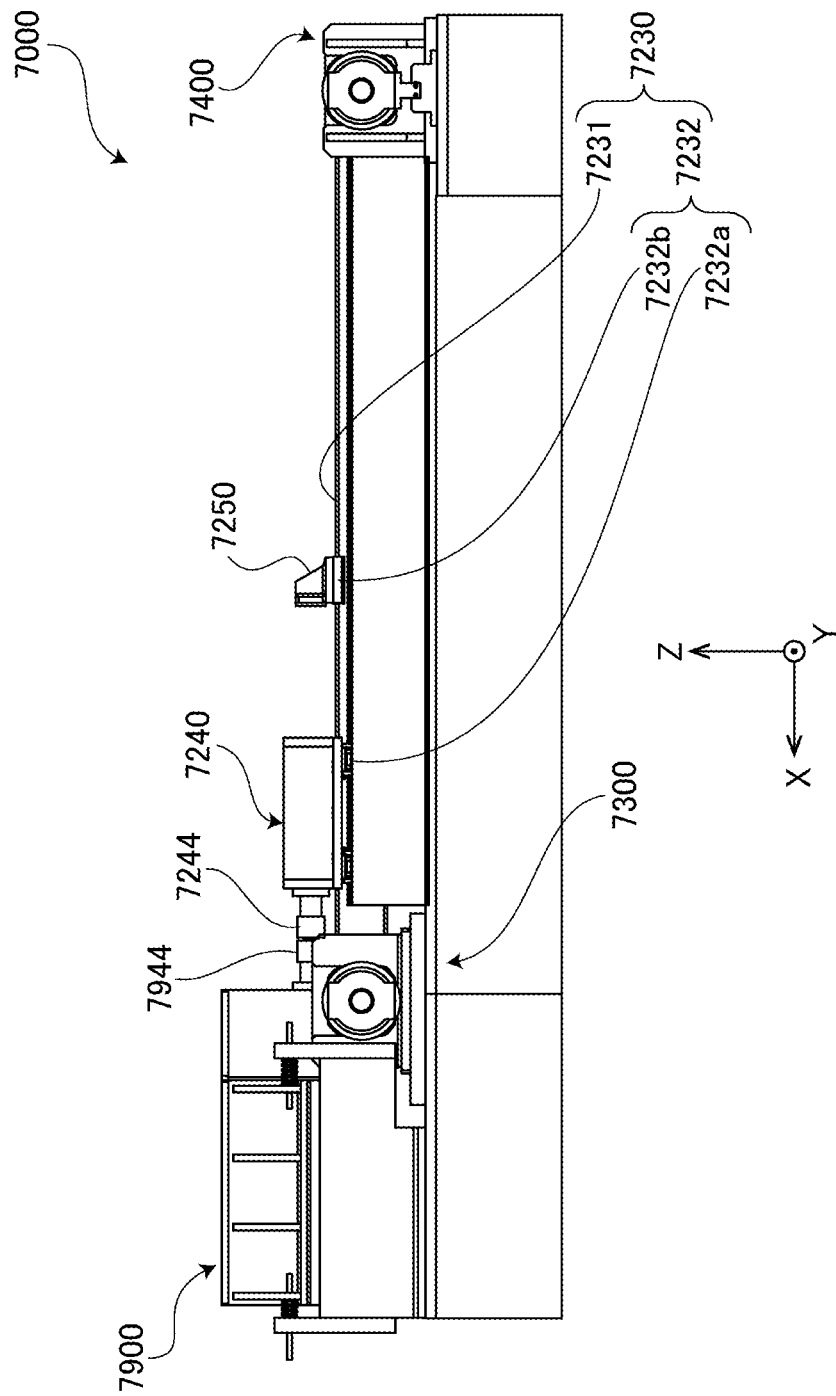
FIG. 22 is a side view of the collision simulation test apparatus according to the seventh embodiment of the present disclosure.

Hereinafter, a collision simulation test apparatus 7000 according to a seventh embodiment of the present disclosure will be described. FIG. 19 and FIG. 20 are a plan view and a front view of the collision simulation test apparatus 7000, respectively. FIG. 21 and FIG. 22 are side views of the collision simulation test apparatus 7000.

The collision simulation test apparatuses of each of the embodiments described above are configured to generate an impact (an acceleration pulse) of a predetermined waveform to be applied to a test piece with the front driving section and the rear driving section and to transmit the generated impact waveform to the table to which the test piece is attached with the belt mechanism. In contrast, the collision simulation test apparatus 7000 of the present embodiment is configured to apply an impact of a predetermined waveform to a test piece attached to a table 7240 by making the table 7240 made to freely travel in a predetermined speed to collide to an impact generating part 7900 which will be described later. That is, the collision simulation test apparatus 7000 of the present embodiment is configured to be capable of performing the traditional collision type impact test.

Similarly to the collision simulation test apparatus 2000 of the second embodiment, the collision simulation test apparatus 7000 of the present embodiment includes a table 7240, a pair of linear guides 7230 for supporting the table 7240 travelably in the X axis direction, a front driving section 7300 and rear driving section 7400 for driving the table 7240, and a pair of belt mechanisms 7100a and 7100d for transmitting powers generated by the front driving section 7300 and rear driving section 7400.

Furthermore, the collision simulation test apparatus 7000 of the present embodiment includes an impact generating part 7900 for applying an impact of a predetermined waveform to the table 7240, and a pusher 7250 for pushing the table 7240 toward the impact generating part 7900.

Each of the linear guides 7230 includes a rail 7231 and three carriages 7232 that are travelable on the rail 7231. The carriages 7232 include two carriages 7232a attached on a lower surface of the table 7240 and one carriage 7232b attached on a lower surface of the pusher 7250. That is, the table 7240 and the pusher 7250 are supported by the pair of linear guides 7230 to be travelable in the X axis direction.

A pair of belt clamps 7180 (FIG. 20) is attached on the lower surface of the pusher 7250 and the pusher 7250 is fixed to a pair of toothed belts 7120 via the belt clamps 7180. That is, the pusher 7250 is configured to be driven by the pair of belt mechanisms 7100a and 7100d. It is noted that the table 7240 of the present embodiment is not coupled to the belt mechanisms 7100a and 7100d and thus is driven via the pusher 7250 coupled to the belt mechanisms 7100a and 7100d.

As shown in FIG. 20, the pusher 7250 has a bottom plate 7251, a pushing plate 7252 standing upright at a forward end portion of an upper surface of the bottom plate 7251, and ribs 7253 for coupling the bottom plate 7251 and the pushing plate 7252 together and enhancing stiffness of the pusher 7250. On a lower surface of the bottom plate 7251, a pair of the carriages 7232b of the linear guides 7230 (FIG. 21) is attached.

The impact generating part 7900 includes a fixed part 7920 fixed on a base block 7310, an impact part 7940 disposed on the fixed part 7920, and a cushioning part 7950 for cushioning impact between the fixed part 7920 and the impact part 7940.

A slide plate (not shown) is attached on a lower surface of the impact part 7940 and thus the impact part 7940 is capable of sliding on the fixed part 7920 with low friction.

The cushioning part 7950 includes a pair of movable frames 7951 attached to the impact part 7940, two pairs of arms 7953 and a pair of guide rails 7955 attached to the fixed part 7920, and four coil springs 7954 and coil retaining bars 7956. It is noted that, although the coil springs 7954 of the present embodiment are compression springs, tension springs may be used. Also, other types of springs such as plate springs or disc springs may be used in place of the coil springs 7954.

The movable frames 7951 are respectively attached on both sides in the left-right direction (Y axis direction) of the impact part 7940. The movable frame 7951 has a bottom plate 7251a to be placed on an upper surface of the fixed part 7920, and four ribs 7951b that couple the bottom plate 7251a and a side face of the impact part 7940 together. The four ribs 7951b are disposed at constant intervals in the X axis direction.

The pair of guide rails 7955 is attached on the upper surface of the fixed part 7920 while orienting its lengthwise direction in the X axis direction and sandwiching the impact part 7940 together with the pair of movable frames 1951 (in particular, the bottom plates 7251a) from both sides in the Y axis direction. A movable direction of the impact part 7940 is limited to the X axis direction by the pair of guide rails 7955.

It is noted that, although, in the present embodiment, the impact part 7940 is configured to be guided in a sliding guide manner by the slide plate and the guide rails 7955, the impact part 7940 may be configured to be guided in a rolling guide manner by using linear guides including rolling bodies in place of the slide plate and the guide rails 7955.

The two pair of arms 7953 extending in the Z axis direction are attached at four corners of the fixed part 7920 while sandwiching the movable frame 7951 from both sides in the X axis direction.

The coil spring 7954 is disposed between each arm 7953 and the movable frame 7951 adjacent to it. A preload adjusted to generate an impact of a predetermined waveform is applied to each coil spring 7954. Furthermore, the movable frame 7951 is configured to be made to immediately return to its initial position by the coil springs 7954 even when displaced by sandwiching the movable frame 7951 with the pair of coil springs 7954 from both sides in the movable direction. A damper disposed in series or in parallel with the coil spring 7954 may be provided to the cushioning part 7950.

To the impact part 7940 of the impact generating part 7900, a protruding part 7942 protruding toward the table 7240 (in the X axis negative direction) is formed at a central portion in the Y axis direction of a portion opposing the table 7240. Furthermore, a collision column 7944 protruding toward the table 7240 is attached at a tip of the protruding part 7942.

The table 7240 includes a main body 7242 and a collision column 7244 protruding from a central portion of a front of the main body 7242.

The collision column 7244 and the collision column 7944 of the present embodiment are rigid bodies integrally formed from hard materials such as steel, but the collision column 7244 and/or the collision column 7944 may be made to be cushioning devices including dampers and/or springs. It is noted that, when making the collision column 7244 and/or the collision column 7944 to be cushioning devices including both the damper and the spring, the damper and the spring may be coupled in series or in parallel.

Hereinafter, behaviors of the collision simulation test apparatus 7000 will be described. Firstly, the table 7240 and the pusher 7250 are disposed at their initial positions shown in FIG. 20. At this stage, a back surface of the table 7240 is in contact with the pushing plate 7252 of the pusher 7250. Then, the pusher 7250 is driven in a predetermined speed toward the impact generating part 7900 by the front driving section 7300 and the rear driving section 7400 via the belt mechanisms 7100*a* and 7100*d*. Since the table 7240 is in contact with the pushing plate 7252 of the pusher 7250, the table 7240 is driven in the predetermined speed together with the pusher 7250. At this stage, the pusher 7250 is gradually accelerated up to the predetermined speed such that no strong impact is applied to the table 7240 and such that the table 7240 does not separate from the pusher 7250 until the table 7240 reaches the predetermined speed. The pusher 7250 decelerates and stops upon reaching the predetermined speed.

As the pusher 7250 decelerates, the table 7240 separates from the pusher 7250 and freely travels on the rails 7231 at the predetermined speed. In due course, as shown in FIG. 22, the collision column 7244 of the table 7240 collides to the collision column 7944 of the impact part 7940, and an impact generated by this collision is applied to a test piece attached to the table 7240. A level and waveform of an impact that can be applied to the test piece can be adjusted by a colliding speed (the predetermined speed) or spring constants of the coil springs 7954. Furthermore, it becomes possible to generate further various impact waveforms by providing dumpers to the cushioning part 7950 and/or by making the collision column 7244 and/or the collision column 7944 to be cushioning devices by providing dampers and/or springs. Additionally, it becomes possible to generate further various impact waveforms by providing, for instance, a plurality of springs and/or dampers having different characteristics to the impact generating part 7900 and altering their combinations and/or connection relationships.

After the impact simulation test, the pusher 7250 is made to return to its initial position by driving the front driving section 7300 and the rear driving section 7400 in the reverse direction. The table 7240 is made to return to its initial position manually. A mechanism for making the table 7240 to automatically return to its initial position may be provided. For example, it becomes possible to make the table 7240 to return to its initial position by providing a coupling mechanism for releasably coupling the pusher 7250 and the table 7240 and by making the pusher 7250 to return to its initial position after coupling the pusher 7250 and the table 7240 together. Also, for example, a belt mechanism for making the table to return may be provided in addition to the belt mechanisms 7100*a* and 7100*d*. In this case, the table 7240 may not be fixed to the toothed belt and may for instance be pushed back to its initial position by a pusher attached to the belt.

The belt clamps 7180 are detachably attached to the pusher 7250 using bolts. Furthermore, a plurality of screw holes are provided on a lower surface of the table 7240 and thus it is made possible to detachably attach four belt clamps 7180 to the table 7240 using bolts. By detaching the belt clamps 7180 from the pusher 7250 and attaching the belt clamps 7180 to the table 7240 to couple the table 7240 to the toothed belts 7120 of the belt mechanisms 7100*a* and 7100*d*, similarly to the collision simulation test apparatus 2000 of the second embodiment, it becomes possible to perform tests that apply impact waveforms generated by the front driving section 7300 and the rear driving section 7400 directly to the table 7240 with the pair of belt mechanisms 7100*a* and 7100*d*.

Eighth Embodiment

Hereinafter, an eighth embodiment of the present disclosure will be described. The present embodiment applies the present disclosure to an impact test apparatus for performing impact tests of products or packaged cargo.

Drop tests and horizontal impact tests are performed to assess strengths of products and appropriateness of package designs. The drop tests include methods using conventionally known free-fall drop test apparatuses and methods using conventionally known impact test apparatuses. The drop tests using the conventionally known free-fall drop test apparatuses are tests in which a test piece is made to freely fall from a predetermined height and is made to collide to a drop surface. The drop tests using the conventionally known impact test apparatuses are tests in which an impact platform onto which a test piece is placed is made to freely fall from a predetermined height and is made to collide to a shock wave generating device to apply an impact to the test piece via the impact platform. The horizontal impact tests are tests in which a sliding vehicle onto which a test piece is placed is made to travel at a predetermined speed and the test piece is made to collide to an impact surface of an impact plate.

The conventionally known free-fall drop test apparatuses and impact test apparatuses are dedicated test apparatuses for the drop tests, and the conventionally known horizontal impact test apparatuses are dedicated test apparatuses for the horizontal impact tests. Therefore, in order to perform the drop tests and the horizontal impact tests, dedicated test apparatuses for respective tests have been necessary.

Furthermore, since conventional drop tests and horizontal impact tests are tests that generate impacts for applying to a test piece by making the test piece (or an impact platform onto which the test piece is placed) to collide to a drop surface or the like, it is not possible to set waveforms and durations (impact pulse application times) of generated impacts with high degrees of freedom. Accordingly, it has not been possible to perform tests in which impacts that may act on packaged cargo during actual transportation are accurately re-created.

According to the present embodiment, there is provided an impact test apparatus that is capable of performing both the drop tests (or vertical impact tests) for applying a vertical impact to a test piece and the horizontal impact tests for applying a horizontal impact to a test piece.

Figure 23:
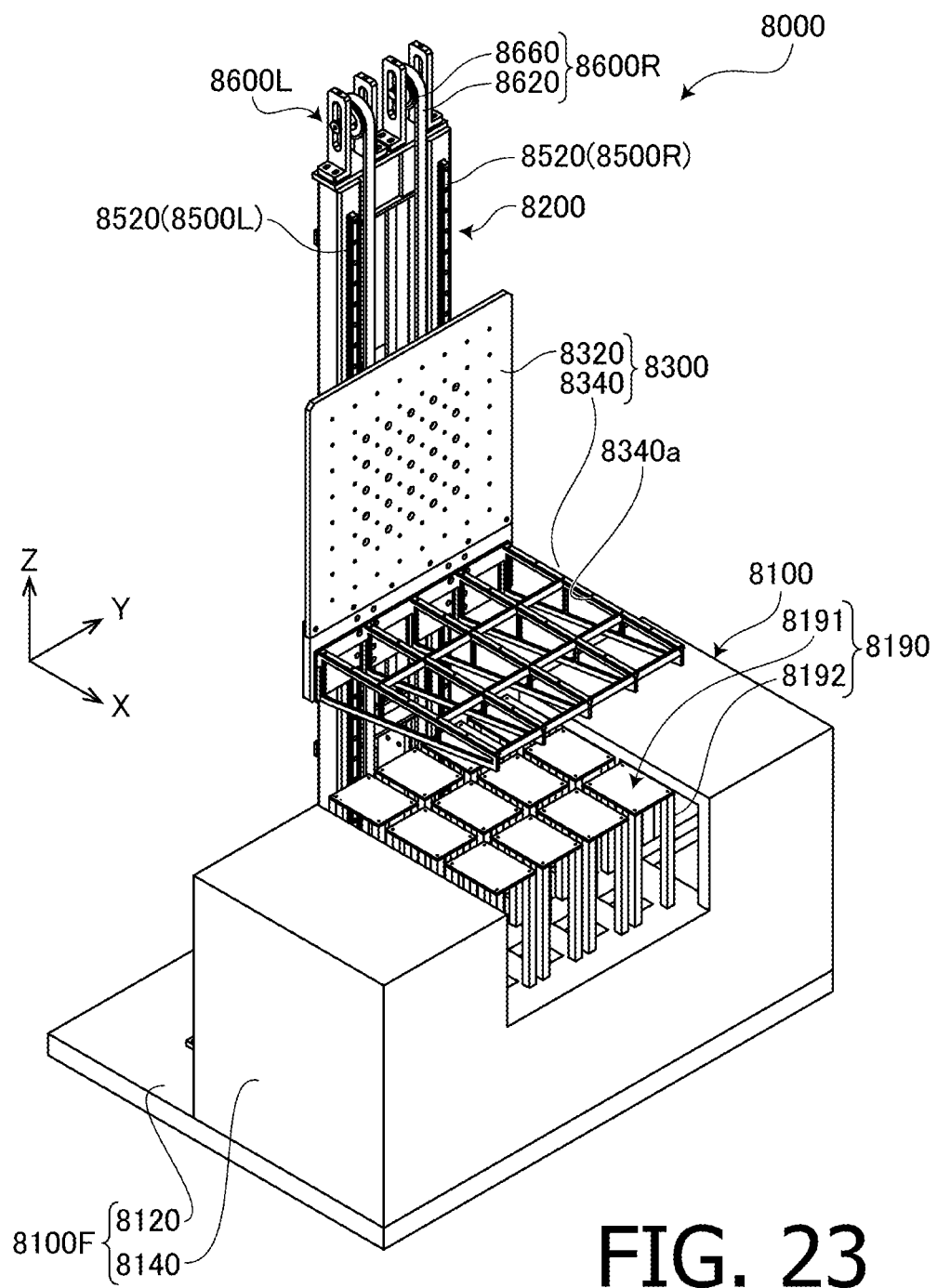
FIG. 23 is a perspective view of an impact test apparatus (drop test) according to an eighth embodiment of the present disclosure.
Figure 24:
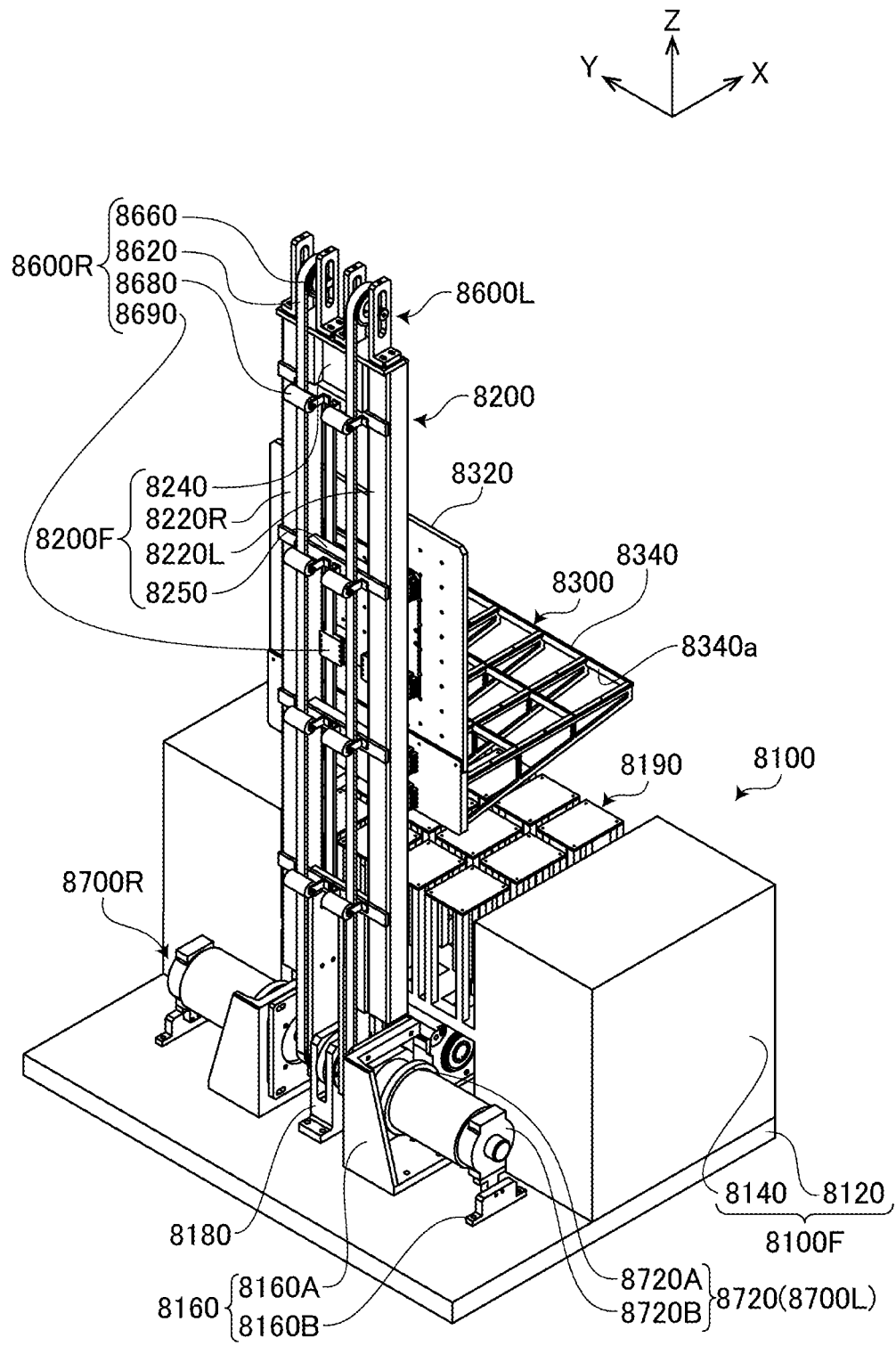
FIG. 24 is a perspective view of the impact test apparatus (drop test) according to the eighth embodiment of the present disclosure.
Figure 25:
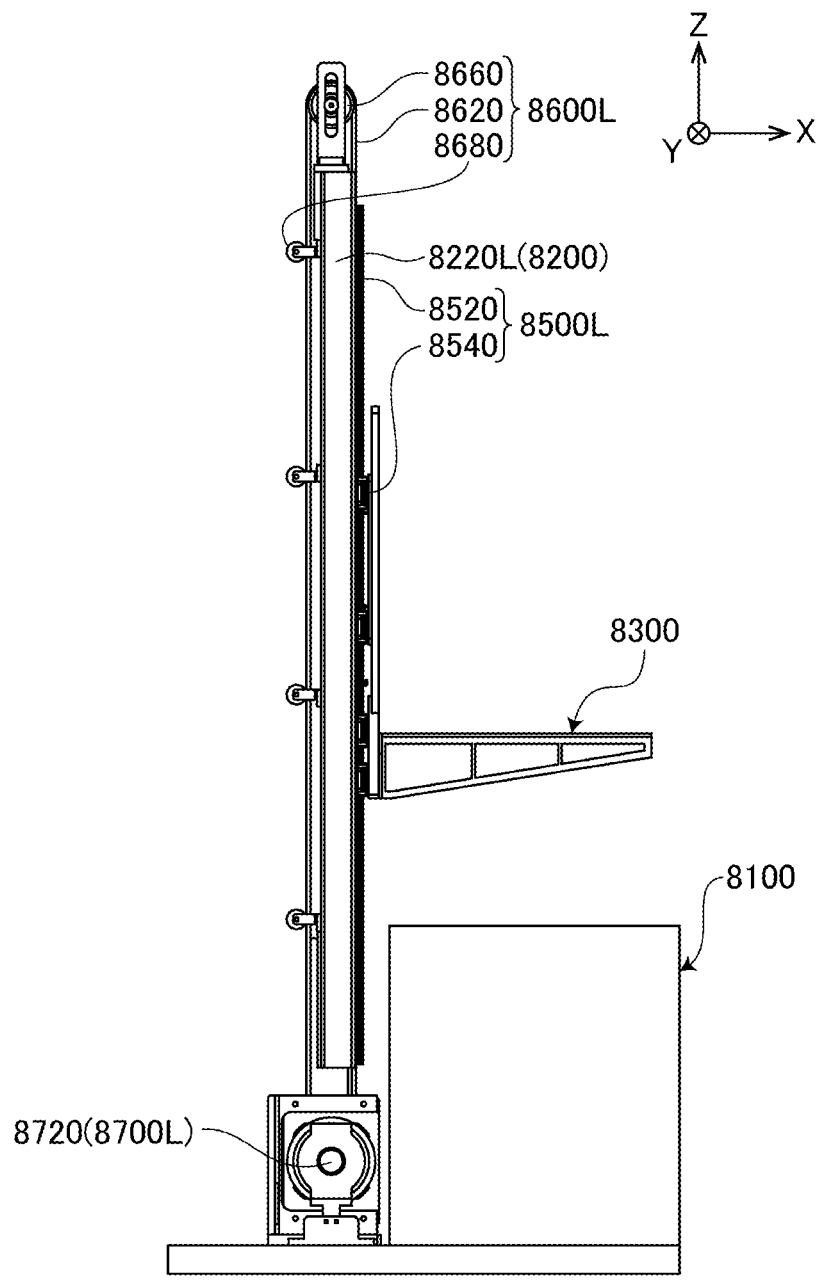
FIG. 25 is a side view of the impact test apparatus (drop test) according to the eighth embodiment of the present disclosure.
Figure 26:
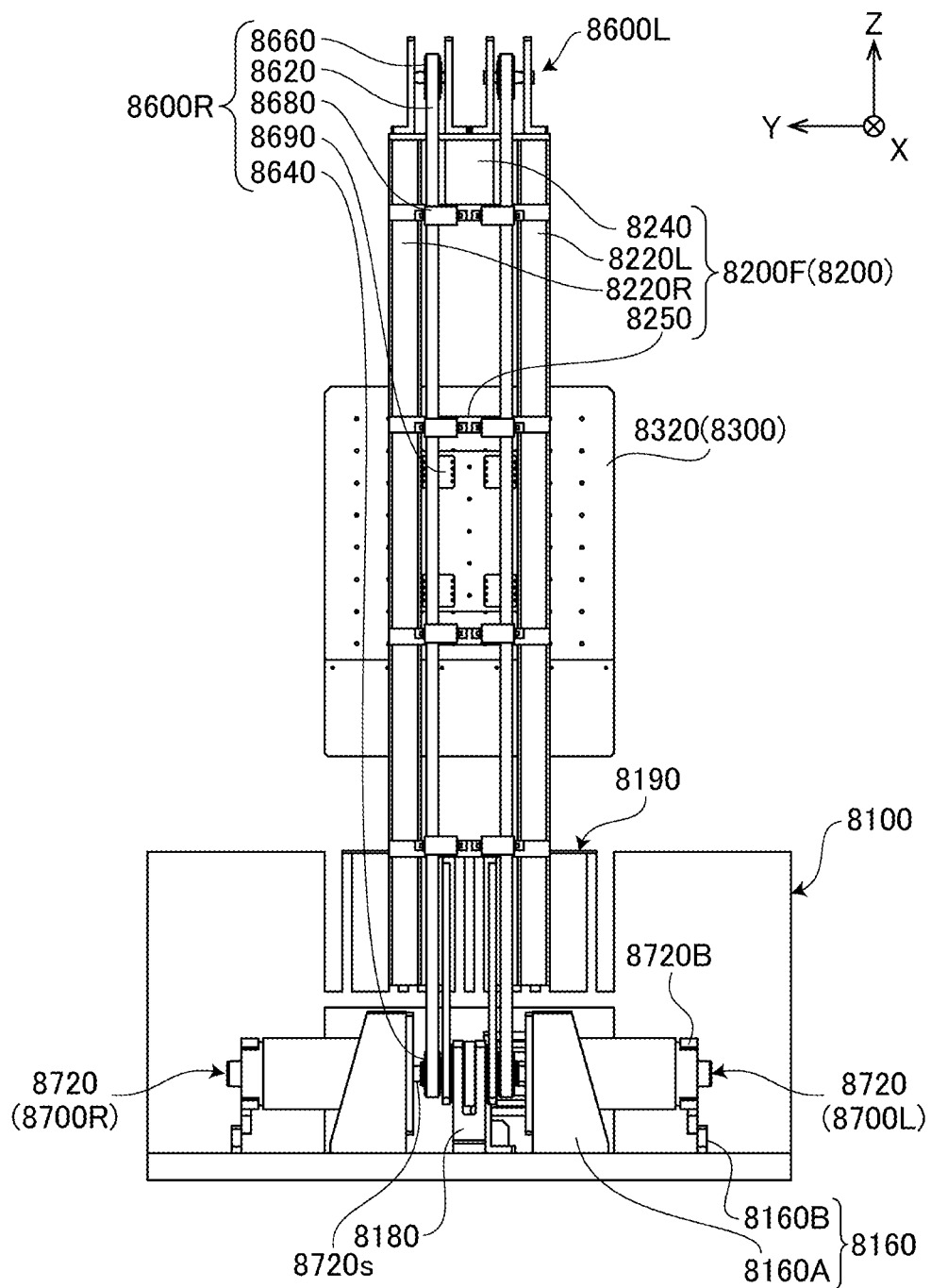
FIG. 26 is a rear view of the impact test apparatus (drop test) according to the eighth embodiment of the present disclosure.

FIG. 23 and FIG. 24 are perspective views showing appearances of an impact test apparatus 8000 according to an embodiment of the present disclosure. FIG. 23 is a diagram showing the impact test apparatus 8000 viewed from the front side, and FIG. 24 is a diagram showing the impact test apparatus 8000 viewed from the back side. FIG. 25 and FIG. 26 are a left side view and a back view of the impact test apparatus 8000, respectively.

In the following description, as shown in FIG. 23 with coordinate axes, in FIG. 23, a direction going from the upper left toward the lower right is defined as X axis direction, a direction going from the lower left toward the upper right is defined as Y axis direction, and a direction going from the bottom toward the top is defined as Z axis direction. The X axis direction and the Y axis direction are horizontal directions perpendicular to each other, and the Z axis direction is a vertical direction. The X axis positive direction will be referred to as front, the X axis negative direction will be referred to as rear, the Y axis positive direction will be referred to as right, and the Y axis negative direction will be referred to as left.

The impact test apparatus 8000 is an apparatus that is capable of performing the following three types of tests to assess appropriateness of package design or the like of a test piece S (FIG. 27) such as a packaged cargo.

(1) drop test
(2) vertical impact test
(3) horizontal impact test

The dropt test is a test in which the test piece S is made to freely fall from a predetermined height in a predetermined attitude and is made to collide to a drop surface. The vertical impact test is a test in which a predetermined impact (acceleration) in the vertical direction is applied to the test piece S, and the horizontal impact test is a test in which a predetermined impact in the horizontal direction is applied to the test piece S.

In the vertical and horizontal impact tests using the impact test apparatus 8000, an impact to be applied to the test piece S is generated not by making the test piece S to collide to an impact plate as in conventional impact tests but by controlling driving of a traveling part 8300 onto which the test piece is to be placed (in particular, by accelerating the traveling part 8300 in accordance with a predetermined acceleration waveform).

Figure 27:
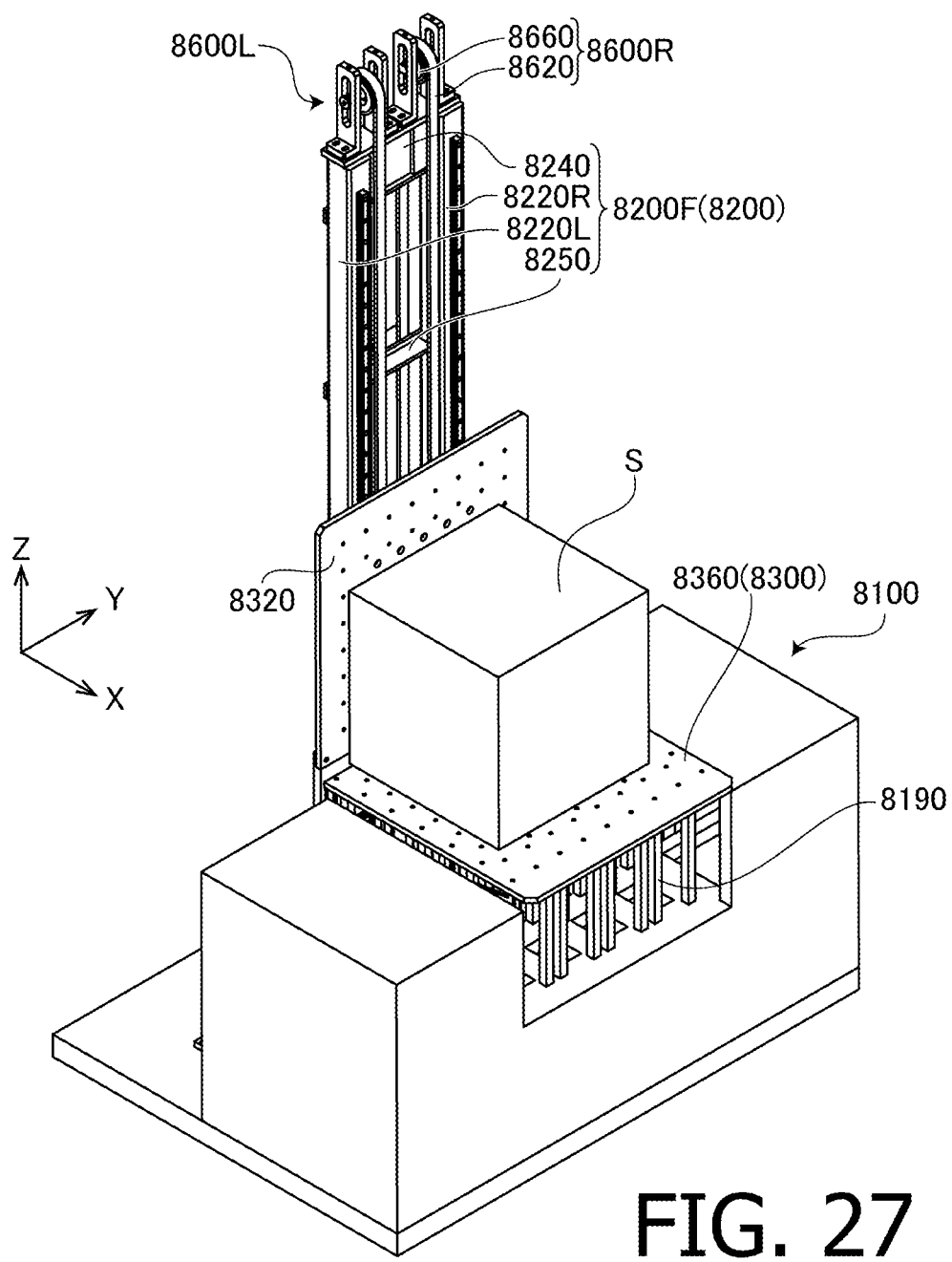
FIG. 27 is a perspective view of the impact test apparatus (vertical impact test) according to the eighth embodiment of the present disclosure.
Figure 28:
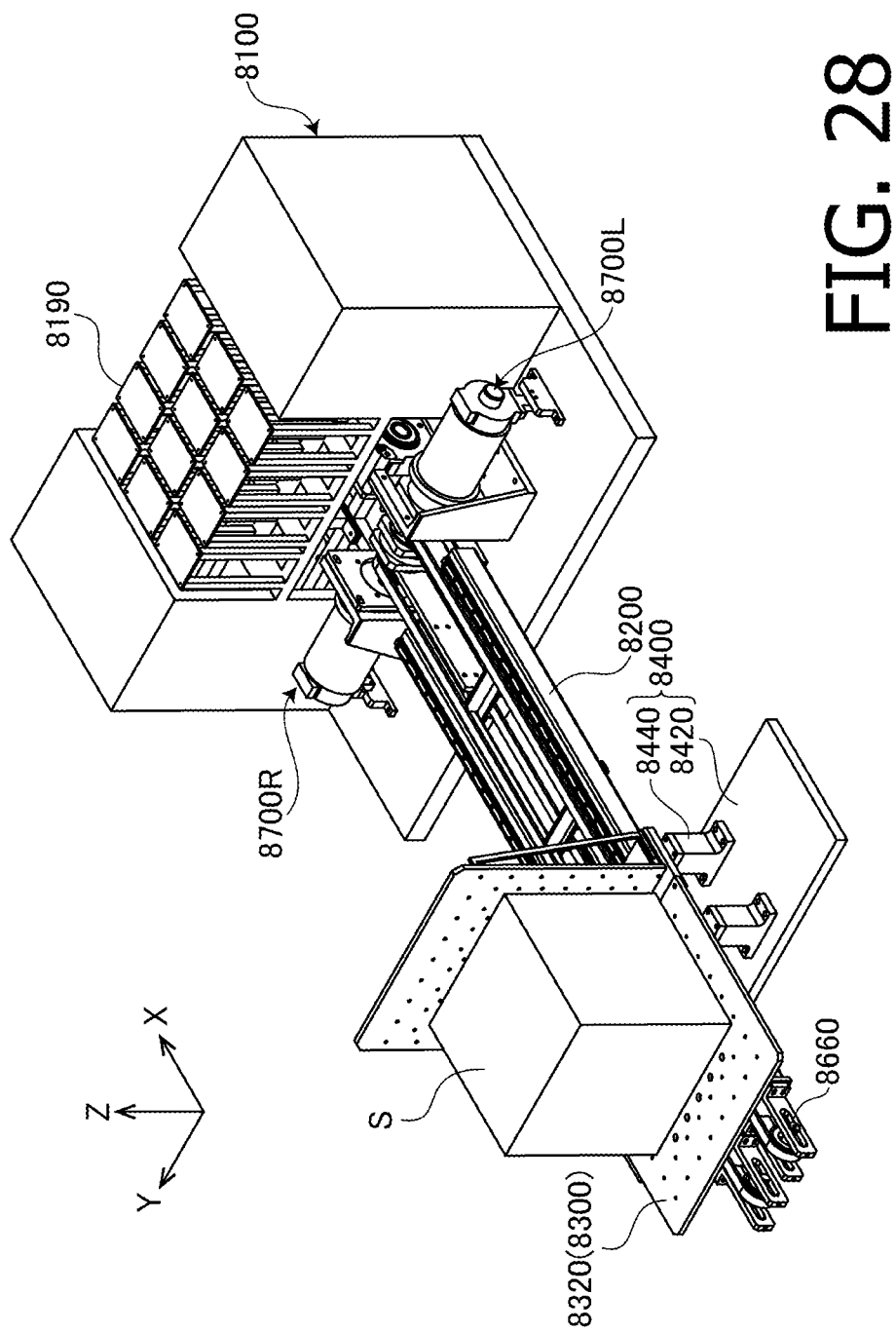
FIG. 28 is a perspective view of the impact test apparatus (horizontal impact test) according to the eighth embodiment of the present disclosure.

FIGS. 23-26 show the impact test apparatus 8000 that is set up for the drop test. FIG. 27 shows the impact test apparatus 8000 during the vertical impact test and FIG. 28 shows the impact test apparatus 8000 during the horizontal impact test. The set ups (arrangement patterns and operation modes) of the impact test apparatus 8000 are changed in accordance with the type of test.

The impact test apparatus 8000 includes a fixed part 8100, a track part 8200, a traveling part 8300 and a support pillar support part 8400 (FIG. 28). The track part 8200 is an elongated structural part and is coupled to the fixed part 8100 to be swingable about a rotation axis (pivot) extending in the Y axis direction between a vertical position (FIGS. 23-27) in which its lengthwise direction is made to stand vertically and a horizontal position (FIG. 28) in which its lengthwise direction is made to lie horizontally. The traveling part 8300 is coupled to a front face of the track part 8200 (a face onto which rails 8520 which will be described later are attached) slidably (i.e., to be travelable linearly) in the lengthwise direction of the track part 8200. When the track part 8200 is positioned at the vertical position, the traveling part 8300 is travelable in the vertical direction, and when the track part 8200 is positioned at the horizontal position, the traveling part 8300 is travelable in the horizontal direction.

In the drop test (FIGS. 23-26) and the vertical impact test (FIG. 27), tests are performed with the track part 8200 being made to stand vertically (at the vertical position), and in the horizontal impact test (FIG. 28), tests are performed with the track part 8200 being made to lie horizontally (at the horizontal position).

With regard to the orientation of the track part 8200, in the drop test set up shown in FIG. 23, a side facing the X axis positive direction (a side on which the traveling part 8300 is attached) will be referred to as a front face, a side facing the X axis negative direction will be referred to as a back face, a side facing the Y axis positive direction will be referred to as a right side face (right side), a side facing the Y axis negative direction will be referred to as a left side face (left side), a side facing the Z axis positive direction will be referred to as a front end side, and a side facing the Z axis negative direction will be referred to as a rear end side.

The impact test apparatus 8000 includes a pair of linear guides 8500R and 8500L (hereinafter occasionally collectively referred to as the linear guide(s) 8500) for slidably coupling the track part 8200 and the traveling part 8300 together, a pair of belt mechanisms 8600R and 8600L (hereinafter occasionally collectively referred to as the belt mechanism(s) 8600) for transmitting driving power to the traveling part 8300, a pair of belt driving parts 8700R and 8700L (hereinafter occasionally collectively referred to as the belt driving parts 8700) for driving respective belt mechanisms 8600R and 8600L, and a pivot driving part 8800 (FIG. 29) for making a frame of the track part 8200 (hereinafter referred to as a "track frame 8200F") to pivot.

The linear guide 8500 is a rolling guide mechanism and includes a rail 8520 attached to the track frame 8200F, four carriages 8540 attached to the travelling part 8300, and not shown rolling bodies (balls or rollers) intervening between the rail 8520 and the carriages 8540. The carriages 8540 are travelable on the rail 8520 via the rolling bodies with low friction.

As a material of the rolling bodies of the linear guide 8500, apart from typical steel materials such as stainless steel, ceramic materials such as silicon nitride, silicon carbide or zirconia may be used. Burning during high-speed driving can be suppressed by using rolling bodies made from ceramics such as silicon nitride.

The fixed part 8100 includes a fixed frame 8100F and a plurality of impact blocks 8190. The Fixed frame 8100F includes a base plate 8120 and a block support frame 8140 for supporting the impact blocks 8190. The block support frame 8140 is fixed on the base plate 8120.

As shown in FIG. 23, the impact block 8190 is a table-like component and includes a horizontally disposed rectangular impact plate 8191 and four legs 8192 extending downward from four respective corners of the impact plate 8191. A lower end of the leg 8192 is integrally fixed to the block support frame 8140 by welding. An upper surface of the impact plate 8191 is a drop surface to which the test piece S collides in the drop test. The impact block 8190 (especially the impact plate 8191 to which the drop surface is formed) is formed of strong materials such as stainless steel.

The impact test apparatus 8000 of the present embodiment includes 12 impact blocks 8190. The 12 impact blocks 8190 are arranged at constant intervals (gaps) in lattice points of 3 rows in the X axis direction and 4 rows in the Y axis direction. The upper surfaces of the impact plates 8191 of the 12 impact blocks 8190 configuring the drop surface are disposed on the same plane.

Figure 29:
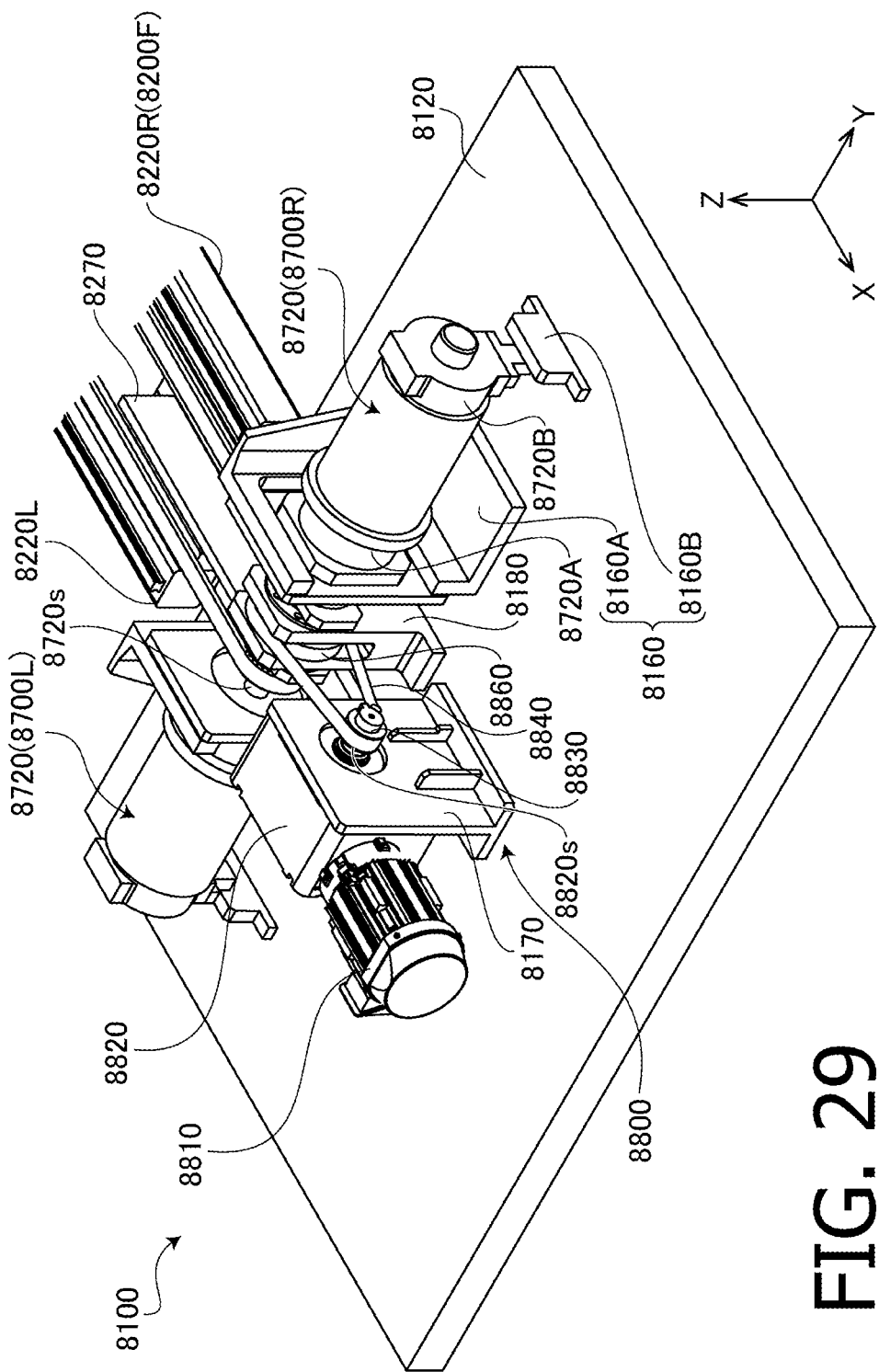
FIG. 29 is a diagram showing structures and positional relationship of a belt driving part and a pivot driving part of the eighth embodiment of the present disclosure.

FIG. 29 is a diagram showing a lower portion of the fixed part 8100. In FIG. 29, the block support frame 8140 and the impact blocks 8190 are omitted for convenience of explanation. At the lower portion of the fixed part 8100, the pair of belt driving parts 8700R and 8700L and the pivot driving part 8800 are disposed. The pivot driving part 8800 is disposed below the impact blocks 8190 (FIG. 23) and is surrounded by the fixed frame 8100F (FIG. 23).

Figure 34:
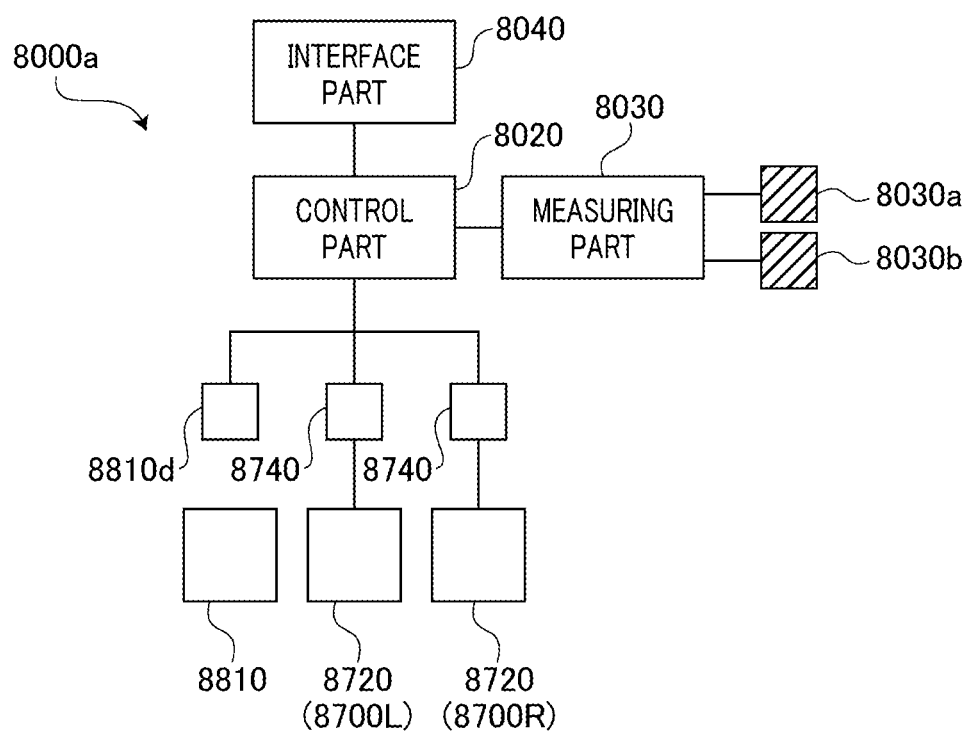
FIG. 34 is a block diagram showing an outline of a control system of the eighth embodiment of the present disclosure.

Each belt driving part 8700 includes a servo motor 8720 and a servo amplifier 8740 (FIG. 34). The belt driving part 8700 may include a reducer for reducing rotation speed of rotary motion output from the servo motor 8720.

The servo motor 8720 is a high-output and super-low inertia servo motor with a rated power of 37 kW which produces torque of a maximum of as high as 350 N·m and of which inertia moment of a rotating part (a rotor and a shaft) is suppressed to equal to or less than $10^{-2}$ kg·m². The capacity of the servo motor 8720 may be increased or decreased in accordance with magnitude of an impact (acceleration) needed. Depending on the magnitude of an impact needed, standard servo motors of which inertia moments are no lower than 0.2 kg·m² can be used.

The pivot driving part 8800 includes a motor 8810, a gear box 8820 for reducing rotation speed of rotary motion output from the motor 8810, a drive pulley 8830 joined to an output shaft 8820s of the gear box 8820, a driven pulley 8860 joined to a shaft part 8280 (FIG. 30) of the track frame 8200F, and a toothed belt 8840 tacked across the drive pulley 8830 and the driven pulley 8860.

The fixed frame 8100F includes a pair of motor support frames 8160 for supporting respective servo motors 8720, a driving part support frame 8170 for supporting the motor 8810 and the gear box 8820 of the pivot driving part 8800, and a bearing part 8180 for pivotally supporting the track frame 8200F. The motor support frames 8160, the driving part support frame 8170 and the bearing part 8180 are fixed to the base plate 8120.

The motor support frames 8160 include a load side bracket support part 8160A for supporting a load side bracket 8720A of the servo motor 8720 and an anti-load side bracket support part 8160B for supporting an anti-load side bracket 8720B. To the load side bracket 8720A, a bearing for rotatably supporting one end side of a shaft 8720s of the servo motor 8720 is attached. To the anti-load side bracket 8720B, a bearing for rotatably supporting the other end side of the shaft 8720s is attached. Since the shaft 8720s of the servo motor 8720 is supported with high rigidity by supporting both the load side bracket 8720A and the anti-load side bracket 8720B of the servo motor 8720 with the motor support frames 8160, wobbling of the shaft 8720s is suppressed and it is made possible to control driving with higher precision.

Figure 30:
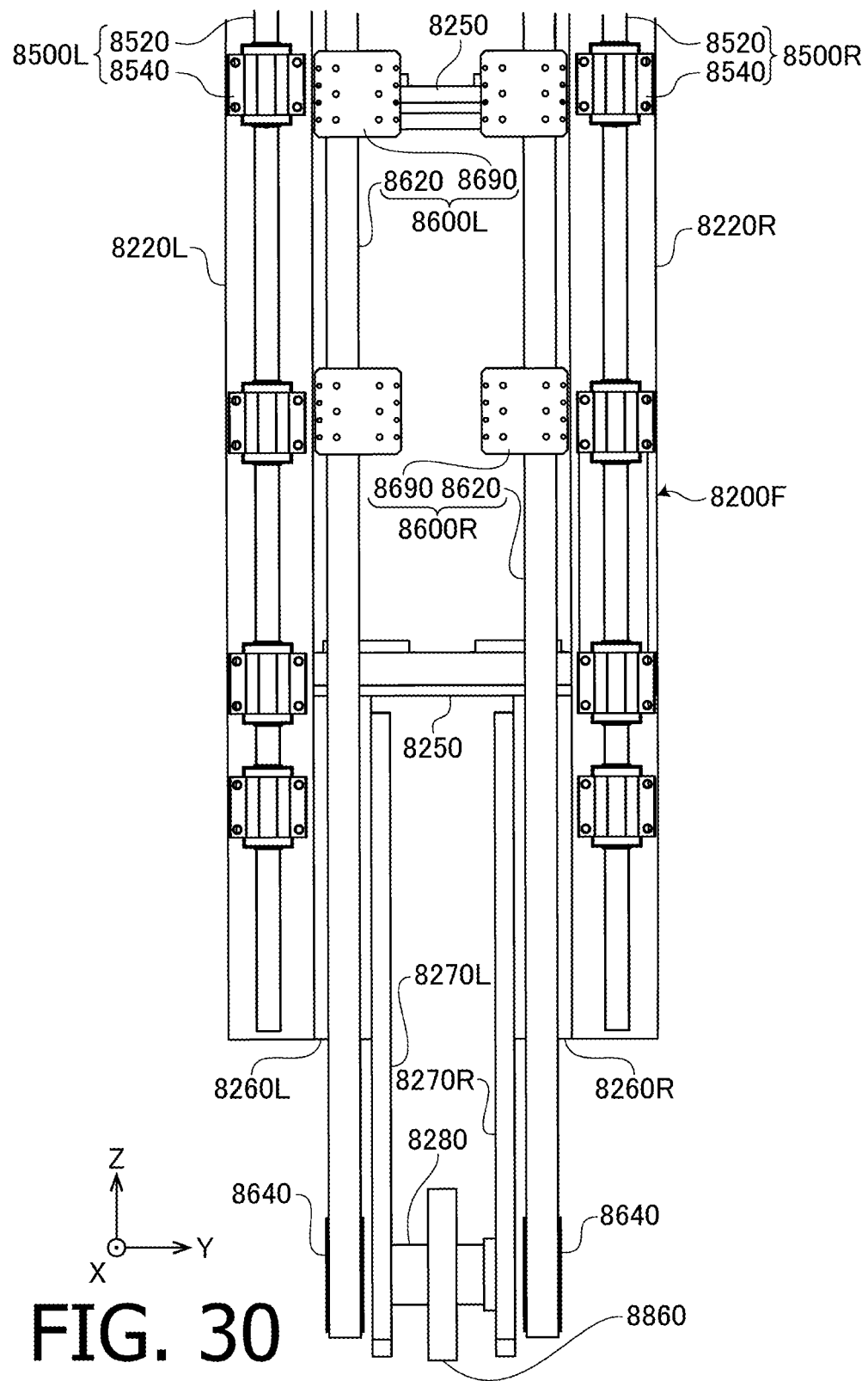
FIG. 30 is an enlarged view of a rear end portion of a track part of the eighth embodiment of the present disclosure.
Figure 31:
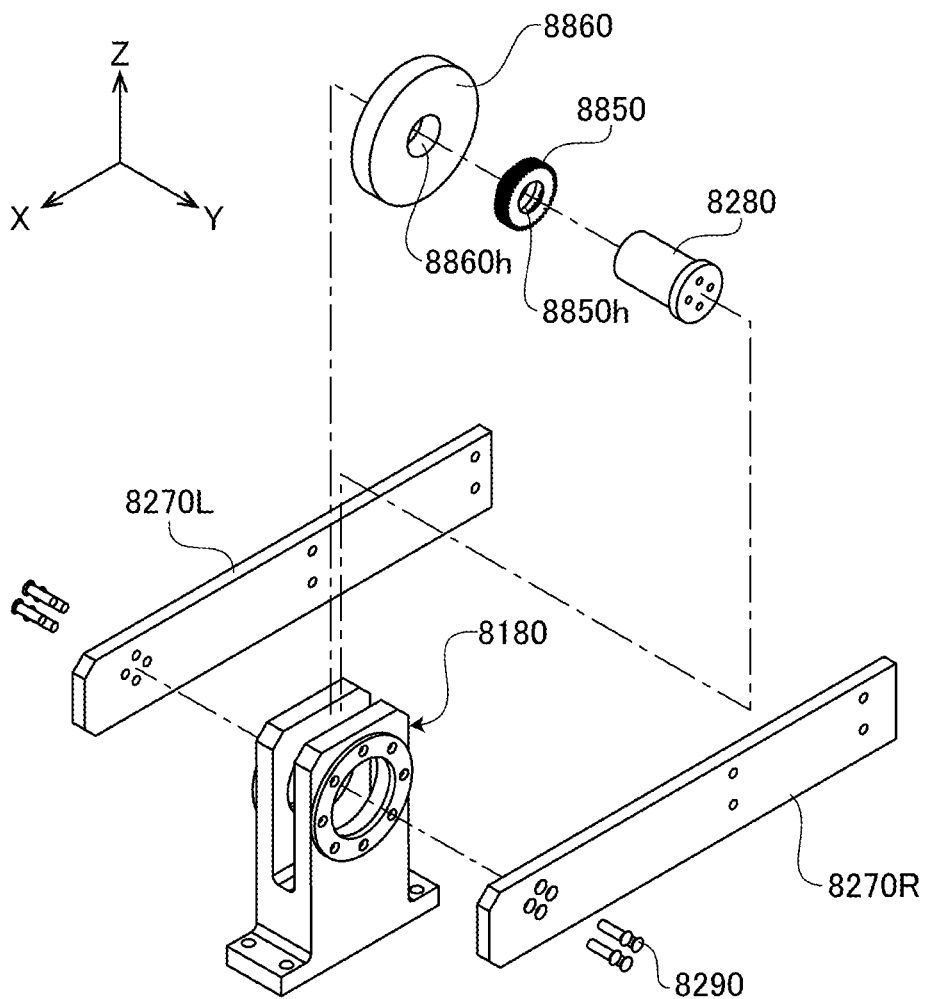
FIG. 31 is an exploded view of the rear end portion of the track part of the eighth embodiment of the present disclosure.
Figure 32:
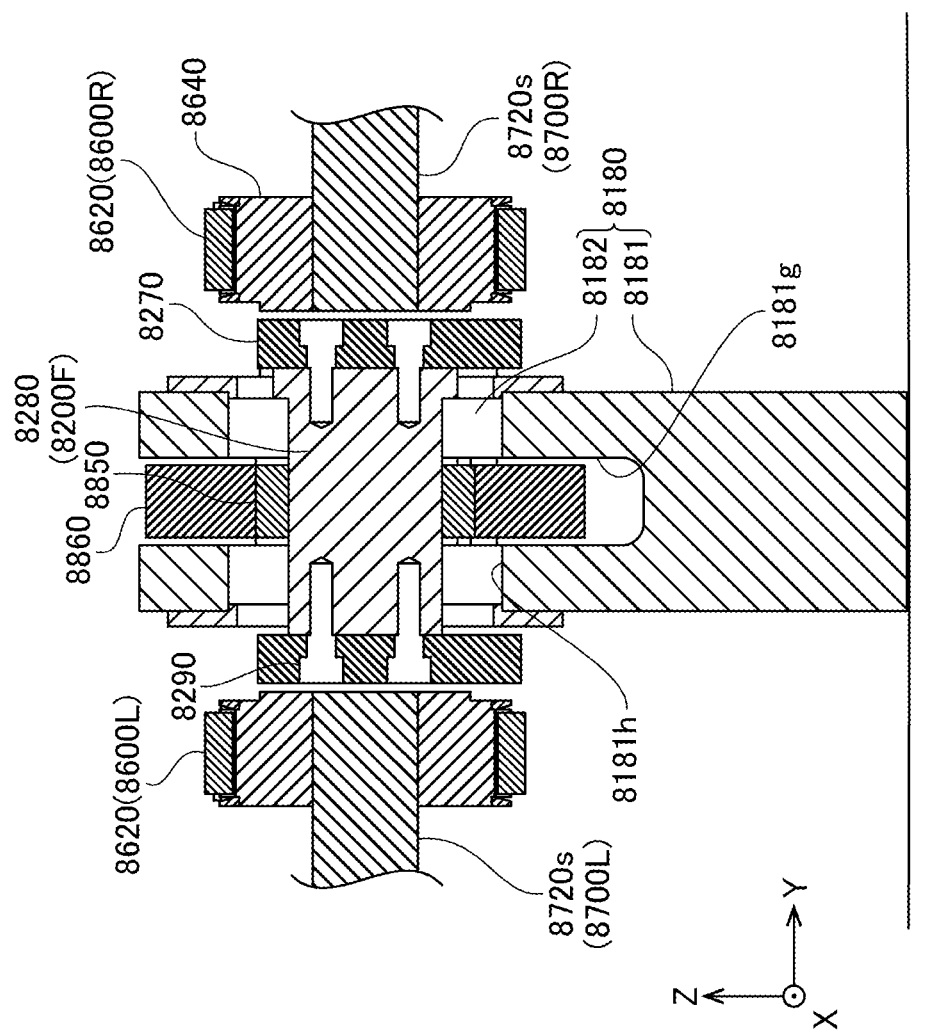
FIG. 32 is a sectional view of a bearing part and around the bearing part of the eighth embodiment of the present disclosure.

FIG. 30 is a front view showing a portion of the track part 8200 at a rear end side, and FIG. 31 is an exploded view of a rear end portion of the track part 8200. FIG. 32 is a sectional view of and around the bearing part 8180. In FIG. 30, only the track part 8200 (the track frame 8200F, the linear guides 8500 and the belt mechanisms 8600) and the driven pulley 8860 of the pivot driving part 8800 are shown for convenience of explanation.

The track frame 8200F has a pair of laterally arranged rail support parts 8220R and 8220L (hereinafter occasionally collectively referred to as the rail support part(s) 8220), a front end coupling part 8240 (FIG. 26) for coupling front end portions of the rail support parts 8220R and 8220L together, three intermediate coupling parts 8250 for coupling intermediate portions of the rail supports parts 8220R and 8220L together, a pair of spacers 8260R and 8260L (hereinafter occasionally collectively referred to as the spacer(s) 8260) attached at rear end portions of respective rail support parts 8220R and 8220L, a pair of drive plates 8270R and 8270L (hereinafter occasionally collectively referred to as the drive plate(s) 8270) attached to respective spacers 8260R and 8260L, and a shaft part 8280 for coupling the drive plates 8270R and 8270L together.

The rail support parts 8220, the spacers 8260 and the drive plates 8270 are elongated members and are arranged in parallel with each other. In particular, the spacer 8260 is sandwiched between the rear end portion of the rail support part 8220 and the front end portion of the drive plate 8270 and integrally couples the rail support part 8220 and the drive plate 8270 together by welding or the like. A width (a dimension in the Y axis direction) of the spacer 8260 is wider than toothed belts 8620 which will be described later.

It is made possible to arrange the drive plates 8270 on an inner side in the Y axis direction with respect to the toothed belts 8620 (and drive pulleys 8640 which will be described later) by the use of the spacers 8260.

The rail support parts 8220R and 8220L are prismatic members and, on their fronts, respective rails 8520 of the linear guides 8500R and 8500L are attached over substantially their entire lengths.

The front end coupling part 8240 and the three intermediate coupling parts 8250 are arranged at constant intervals in a lengthwise direction of the rail support parts 8220R and 8220L and couple the pair of rail support parts 8220R and 8220L in a ladder-like shape.

The shaft part 8280 is a columnar member and both ends are fixed to the rear end portions of the drive plates 8270R and 8270L with bolts 8290 (FIG. 31).

As shown in FIG. 32, the bearing part 8180 includes a base 8181 and a pair of bearings 8182 supported by the base 8181. A groove 8180g extending in the X axis direction is formed to an upper portion of the base 8181. To upper portions of the base 8181 divided into two by the groove 8181g, respective through holes 8181h that penetrate through in the Y axis direction are concentrically formed (i.e., such that they share a center line), and the bearings 8182 are fitted in respective through holes 8181h. The shaft part 8280 of the track frame 8200F is rotatably supported by the base 8180 via the pair of bearings 8182.

As shown in FIG. 31, the driven pulley 8860 is attached to the shaft part 8280 of the track frame 8200F via a pulley attaching member 8850 (coupling joint). The pulley attaching member 8850 is a cylindrical member to be fitted in a hollow part 8860h of the driven pulley 8860, and the shaft part 8280 is to be fitted in a hollow part 8850h of the pulley attaching member 8850. The pulley attaching member 8850 is configured such that its outer diameter increases and its inner diameter decreases as an attached bolt is tightened, thereby integrally coupling the shaft part 8280 and the driven pulley 8860 together.

Furthermore, splines are formed on an outer peripheral surface of the pulley attaching member 8850, and splines that engage with these splines are formed on an inner peripheral surface of the driven pulley 8860. With this configuration, the driven pulley 8860 is firmly joined to the shaft part 8280 of the track frame 8200F via the pulley attaching member 8850 such that power output by the gear box 8820 is surely transmitted to the track frame 8200F. As the shaft part 8280 joined to the driven pulley 8860 is rotationally driven by the pivot driving part 8800, the track frame 8200F pivots about a center line (pivot) of the shaft part 8280.

In the set up for the drop test shown in FIGS. 23-25, the traveling part 8300 includes a vertically standing flat plate-like support plate 8320 (table), and a support frame 8340 extending substantially horizontally from a lower end portion of the support plate 8320. The carriages 8540 (FIG. 25) of the linear guides 8500R and 8500L are attached on a back surface of the support plate 8320. The support plate 8320 is provided with a plurality of screw holes for fixing the test piece S to the traveling part 8300 for the horizontal impact test and the vertical impact test.

As shown in FIG. 27 and FIG. 28, in the set up for the horizontal and vertical impact tests, the traveling part 8300 is provided with a support plate 8360. The support plate 8360 is attached to the support frame 8340. The support plate 8360 is also provided with a plurality of screw holes for fixing the test piece S to the traveling part 8300.

To the support frame 8340, 12 rectangular through holes 8340*a* penetrating through the support frame 8340 are formed at positions corresponding to the impact blocks 8190 when viewed in a traveling direction of the traveling part 8300. The through holes 8340*a* of the support frame 8340 are formed to be larger than upper surfaces of respective impact plates 8191 of the impact blocks 8190 such that the impact plates 8191 can pass through respective through holes 8340*a* as the traveling part 8300 descends during the drop test. In the drop test, since the support frame 8340 descends to a position lower than the impact plates 8191 of the impact blocks 8190, the impact plates 8191 pass through respective through holes 8340*a* of the support frame 8340 and the freely falling test piece S collides to the impact plates 8191 that have passed through the support frame 8340.

As shown in FIG. 26, each of the belt mechanisms 8600 includes a toothed belt 8620 (winding intermediate node), a drive pulley 8640, a driven pulley 8660, four guide rollers 8680 and two belt clamps 8690. The belt mechanisms 8600R and 8600L are driven by respective belt driving parts 8700R and 8700L.

The drive pulleys 8640 of the belt mechanisms 8600R and 8600L are attached to the shafts 8720*s* of the servo motors 8720 of respective belt driving parts 8700R and 8700L. As shown in FIG. 30, the drive pulleys 8640 are arranged concentrically with the shaft part 8280 of the track frame 8200F. The driven pulleys 8660 are attached to a front end of the track frame 8200F (front end coupling part 8240). The toothed belts 8620 are tacked across respective drive pulleys 8640 and driven pulleys 8660 and are mounted to be capable of circulating around the track frame 8200F.

The guide rollers 8680 are attached to a back surface of the track frame 8200F. In particular, the guide rollers 8680 are attached to a rear end portion of the front end coupling part 8240 and to each of the intermediate coupling parts 8250. The toothed belts 8620 are inserted between the track frame 8200F and the guide rollers 8680. Since the toothed belts 8620 are guided with low friction by the guide rollers 8680, the toothed belts 8620 can stably circulate along respective predetermined tracks even when driven in high speed.

The toothed belts 8620 of the present embodiment have the same configuration as the toothed belts 1120 of the first embodiment shown in FIG. 8. That is, the toothed belt 8620 has a body part 8621, a plurality of core wires 8622, a tooth profile 8621*t* formed on an inner peripheral surface of the toothed belt 8620, a tooth cloth 8623 covering a surface of the tooth profile 8621*t*, and a plurality of grooves 8621*g* formed on an outer surface of the toothed belt 8620. In FIG. 8, reference numerals of the components of the toothed belts 8620 used in the description of the present embodiment are indicated with brackets.

Each toothed belt 8620 is fixed to the traveling part 8300 with the belt clamps 8690 (intermediate node fixture) at two positions in its lengthwise direction. Furthermore, each toothed belt 8620 is connected by one of the belt clamps 8690 to have loop-like shape. It is noted that one end of the toothed belt 8620 may be fixed to the traveling part 8300 with one of the belt clamps 8690 and the other end of the toothed belt 8620 may be fixed to the traveling part 8300 with the other of the belt clamps 8690. In this case, an effective length of the toothed belt 8620 can be easily adjusted by shifting a position on at least one end of the toothed belt 8620 in its lengthwise direction to be clamped by the belt clamp 8690.

Figure 33:
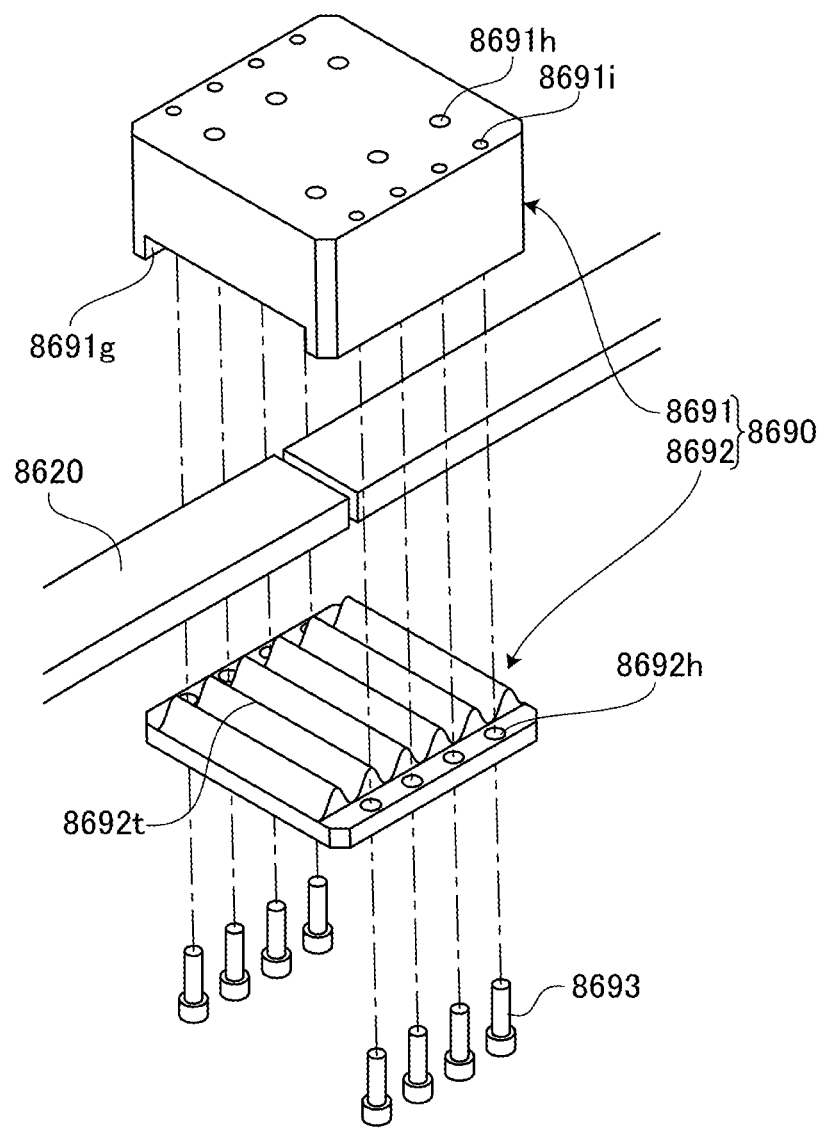
FIG. 33 is an exploded view of a belt clamp of the eighth embodiment of the present disclosure.

FIG. 33 is an exploded view of the belt clamp 8690. The belt clamp 8690 includes an attaching part 8691 to be attached to the traveling part 8300, and a clamp plate 8692 for fixing the toothed belt 8620 by clamping the toothed belt 8620 between the attaching part 8691 and the clamp plate 8692.

At the center in a width direction of the clamp plate 8692, a tooth surface 8692*t* that engages with a tooth surface 8621*t* (FIG. 8) formed on an inner peripheral surface of the toothed belt 8620 is formed. On a lower surface of the attaching part 8691, a groove 8691*g* in which the toothed belt 8620 and the clamp plate 8692 are to be fitted is formed.

The clamp plate 8692 is provided with a plurality of through holes 8692*h* for fixing the clamp plate 8692 to the attaching part 8691 with bolts on both sides of the tooth part 8692*t* in the width direction. The attaching part 8691 is provided with screw holes 8691*i* communicating with respective through holes 8692*h*. The clamp plate 8692 is attached to the attaching part 8691 by fitting bolts 8693 inserted in respective through holes 8692*h* of the clamp plate 8692 to respective screw holes 8691*i* of the attaching part 8691.

When the toothed belt 8620 is fitted in the groove 8691*g* of the attaching part 8691 and the clamp plate 8692 is attached to the attaching part 8691, the toothed belt 8620 is compressed between the attaching part 8691 and the clamp plate 8692 and is thereby fixed to the belt clamp 8690. In this state, since the tooth surface 8621*t* of the toothed belt 8620 is engaged with the tooth surface 8692*t* of the clamp plate 8692, the toothed belt 8620 does not slide with respect to the belt clamp 8690 even if a strong impact in a lengthwise direction (X axis direction) is applied to the toothed belt 8620 and thus the traveling part 8300 to which the toothed belt 8620 is integrally fixed by the belt clamp 8690 can be driven.

The attaching part 8691 is provided with a plurality of through holes 8691*h* for fixing the attaching part 8691 to the traveling part 8300 with bolts. The traveling part 8300 is provided with a plurality of through holes (not shown) corresponding to the through holes 8691*h*. It is made possible to easily attach and detach the attaching part 8691 to and from the traveling part 8300 only by attaching and detaching bolts. For example, it is possible to prepare dedicated traveling parts 8300 for respective types of test pieces and use the impact test apparatus 8000 while exchanging the traveling part 8300 in accordance with a type of a test piece to be tested.

The impact test apparatus 8000 of the present embodiment is configured to be capable of applying a high acceleration of over, for instance, 20 G (196 m/s$^2$) to the test piece. Members having high rigidity needs to be used for power transmission systems in order to accurately transmit the high acceleration. Power transmission systems having high rigidity include, for instance, a ball screw mechanism, a gear transmission mechanism, a chain transmission mechanism and a wire transmission mechanism.

If a gear transmission mechanism or chain transmission mechanism is used, the gear or chain needs to be made to have strength that can withstand the high acceleration. However, improving the strength increases inertia and thus necessitates a motor having higher power. Also, an increase in motor output is accompanied by an increase in inertia moment of the motor itself and thus necessitates a further increase in the power, and thereby causes an increase in size of the motor and a deterioration in energy efficiency. Furthermore, if inertia of the entire apparatus becomes too high, generation and transmission of the high acceleration becomes difficult. A limit of acceleration using a gear transmission mechanism or chain transmission mechanism is about 3G (29 m/s$^2$) and thus it is not possible to drive the apparatus with the acceleration necessary for the impact test (e.g., equal to or greater than 10G (98 m/s$^2$)). Furthermore, a gear mechanism or chain mechanism may burn when it is driven with high circumferential speed necessary for the impact test.

A wire transmission mechanism (a winding transmission mechanism in which a wire and a pulley is used) has relatively low inertia but, since power is transmitted through friction only, sliding occurs between the wire and the pulley when driven with the high acceleration and thus it is not possible to transmit motion accurately.

In typical toothed belts such as a timing belt for automobile, core wires formed by stranding glass fiber or aramid fiber are used. Therefore, when driven with a high acceleration exceeding 10G (98 m/s$^2$), expansion and contraction of the toothed belt increases due to poor stiffness and strength of the core wires and thus it is not possible to transmit motion accurately. Furthermore, in typical toothed belts, since relatively low hardness synthetic rubbers such as nitrile rubber or chloroprene rubber are used as a base material, tooth skipping apt to occur and thus it is not possible to transmit motion accurately.

There are apparatuses which use a servo valve and a hydraulic cylinder as a driving source, but such apparatuses do not have sufficient response speed and thus cannot accurately re-create impact waveforms that fluctuate at high frequencies of over 200 Hz. Also, a hydraulic pressure system requires a large hydraulic pressure supply facility in addition to a hydraulic pressure device and thus requires a large installation site. Furthermore, the hydraulic pressure systems has problems such as high maintenance and management cost of the hydraulic pressure supply facility and environmental pollution by oil leakage.

The inventors of the present disclosure carried out a huge number of simulations, test productions and experiments regarding various types of transmission mechanisms such as the above-mentioned ball screw mechanism, gear transmission mechanism, chain transmission mechanism, wire transmission mechanism and belt transmission mechanism and achieved to develop, as the sole configuration that makes it possible to realize the high acceleration of over 10G (98 m/s$^2$), the drive system of the present embodiment that uses, in combination, the super-low inertia electric servo motor and the special light and high-strength toothed belt being a composite of the carbon core wire and the high-modulus elastomer base.

The support pillar support part 8400 shown in FIG. 28 is a structural part for supporting the front end side of the track frame 8200F from below when the track part 8200 is positioned at the horizontal position in which the track part 8200 is laid horizontally such that too high load does not act on the shaft part 8280.

The support pillar support part 8400 includes a base plate 8420 and four support pillars 8440 standing on the base plate 8420. A cushioning member such as a rubber plate is attached on a top surface of the support pillar 8440. The four support pillars 8440 are arranged such that, when the impact test apparatus 8000 is set up for the horizontal impact test (i.e., when the track part 8200 is positioned at the horizontal position), the rail support part 8220R is placed on two support pillars 8440 on the right side and the rail support part 8220L is place on two support pillars 8440 on the left side.

FIG. 34 is a block diagram showing an outline of a control system 8000a of the impact test apparatus 8000. The control system 8000a includes a control part 8020 for controlling operations of the whole apparatus, a measuring part 8030 for measuring accelerations of the traveling part 8300 and/or the test piece S, and an interface part 8040 for performing input from and output to the outside.

The interface part 8040 includes, for instance, one or more of user interfaces for performing input from and output to a user, network interfaces for connecting to various networks such as a LAN (Local Area Network), and various communication interfaces for connecting to external devices such as USB (Universal Serial Bus) or GPIB (General Purpose Interface Bus). The user interface also includes one or more of various input/output devices such as, for instance, various operation switches, indicators, various display devices such as an LCD (Liquid Crystal Display), various pointing devices such as a mouse or touch pad, a touch screen, a video camera, a printer, a scanner, a buzzer, a speaker, a microphone and a memory card reader/writer.

The measuring part 8030 includes an acceleration sensor 8030a attached to the traveling part 8300, and generates measurement data by subjecting signals from the acceleration sensor 8030a to amplification and digital conversion and sends the measurement data to the control part 8020. The measuring part 8030 may be provided with an additional acceleration sensor 8030b for attaching to the test piece S and may measure impacts that act on the test piece S during the test.

Two servo motors 8720 are connected to the control part 8020 via respective servo amplifiers 8740. The control part 8020 and each servo amplifier 8740 are communicably connected with an optical fiber and thus it is made possible to execute high speed feedback control between the control part 8020 and each servo amplifier 8740. With this configuration, it is made possible to synchronously control a plurality of servomotors with high precision (with high resolution and high accuracy along the time axis). Also, the motor 8810 of the pivot driving part 8800 is connected to the control part via a driver 8810d.

The control part 8020 synchronously controls driving of the servomotors 8720 of the belt driving parts 8700R and 8700L based on control conditions such as acceleration waveforms input through the interface part 8040 and/or measurement data input through the measuring part 8030. It is noted that, in the present embodiment, the two servo motors 8720 are driven in the same phase (To be exact, the servo motor 8720 of the belt driving part 8700L on the left side is driven in opposite phase (in opposite rotating direction) with respect to the servo motor 8720 of the belt driving part 8700R on the right side).

As described above, three types of tests, namely, the drop test, the vertical impact test and the horizontal impact test, can be performed using the impact test apparatus 8000. Hereinafter, contents and procedures of each test will be described.

[Drop Test]

The drop test is a test in which the test piece S is made to freely fall from a predetermined height onto the impact blocks 8190. As described above, the drop test is performed with the track part 8200 being made to stand vertically and with the support plate 8360 (FIG. 27) of the traveling part 8300 being removed.

In the drop test, firstly, the belt driving parts 8700R and 8700L are driven to move the traveling part 8300 to a preparing position, and the test piece S is placed on the support frame 8340 at the preparing position. The preparing position is set to a position where the impact plates 8191 of the impact blocks 8190 do not come above an upper surface of the support frame 8340. Additionally, an attitude holding member (not shown) for holding the test piece S at a predetermined attitude may be provided to the traveling part 8300 and the test piece S may be placed on the attitude holding member at the predetermined attitude.

Then, the belt driving parts 8700R and 8700L are driven to lift the test piece S along with the traveling part 8300 to a dropping position at a predetermined height from the upper surfaces of the impact blocks 8190 (the drop surface). After being held at the dropping position for a predetermined time period, the traveling part 8300 descends up to the lowest position with an acceleration greater than the gravitational acceleration. At this time, the test piece S leaves the support frame 8340 and freely falls with the gravitational acceleration. It is noted that the lowest position is set to a position where the support frame 8340 comes below the impact plates 8191 of the impact blocks 8190. Therefore, the impact plates 8191 passes through the through holes 8340a of the support frame 8340 as the traveling part 8300 gets to its lowest position, and thus the test piece S collides to the impact plates 8191.

It is noted that, in the drop test (free-fall test), it is sufficient to keep the test piece S left from the support frame 8340 until the test piece S collides to the impact blocks 8190. Therefore, it is not necessary to make the traveling part 8300 descend with an acceleration greater than the gravitational acceleration at all times.

A holding mechanism for releasably fixing and holding the test piece S to the traveling part 8300 may be provided. In this case, the test piece S is accelerated up to a predetermined speed along with the traveling part 8300 with, for instance, an acceleration equal to or greater than the gravitational acceleration, and the holding mechanism is released just before collision with the impact blocks to make only the test piece S to collide to the impact blocks 8190. With this configuration, it becomes possible to make the test piece S collide to the impact blocks 8190 at dropping speeds that cannot be reached by the free-fall. Also, if the traveling part 8300 is made to descend with the gravitational acceleration when releasing holding of the test piece S by the holding mechanism, since no force other than gravity acts on the test piece, it is possible to make the test piece S fall while keeping its attitude.

[Vertical Impact Test]

The vertical impact test is a test in which an impact is applied to the test piece S fixed to the traveling part 8300 by accelerating the traveling part 8300 in the vertical direction with a preset acceleration. The above-described drop test applies an impact to the test piece S by making the test piece S to fall onto the impact blocks 8190. However, in the vertical impact test, an impact is applied to the test piece S by accelerating the traveling part 8300 in the vertical direction with the belt driving parts 8700R and 8700L. Therefore, tests of various conditions such as, for instance, tests of conditions stricter than the drop test (tests that apply strong impacts), tests of conditions milder than the drop test (tests that apply weak impacts), tests that apply impacts having long impact pulse application times, tests that repeatedly (intermittently) apply impacts and tests that apply impact waveforms that cannot be re-created by the collision to the impact blocks 8190 can be performed with the vertical impact test.

As shown in FIG. 27, in the set up for the vertical impact test, the support plate 8360 is attached on the upper surface of the support frame 8340. The test piece S is fixed to the traveling part 8300 in a state where it is placed on the support plate 8360. In the vertical impact test, the traveling part 8300 do not move below the impact plates 8191 of the impact blocks 8190. Therefore, in the vertical impact test, the support plate 8360 and the test piece S do not collide to the impact blocks 8190.

In the vertical impact test, firstly, the belt driving parts 8700R and 8700L are driven to make the traveling part 8300 to descend to the preparing position, and the test piece S is attached to the traveling part 8300. In particular, the test piece S is placed on the support plate 8360 and is fixed to at least one of the support plates 8360 and 8320. Additionally, an attitude holding member (not shown) for holding the test piece S at a predetermined attitude may be provided to the traveling part 8300 and the test piece S may be held at the predetermined attitude by the attitude holding member.

Then, the belt driving parts 8700R and 8700L are driven to lift the test piece S to a starting position along with the traveling part 8300. The starting position is set in accordance with a test condition such that a moving range of the traveling part 8300 necessary for the test is secured. For example, the stating position is set at an intermediate position of a movable range of the traveling part 8300. After being held at the starting position for a predetermined time period, the belt driving parts 8700R and 8700L are driven based on a preset impact waveform and a predetermined impact is applied to the traveling part 8300 and the test piece S. After the test, the traveling part 8300 is made to descend to the preparing position and the test piece S is detached from the traveling part 8300.

[Horizontal Impact Test]

The horizontal impact test is a test in which an impact is applied to the test piece S fixed to the traveling part 8300 by accelerating the traveling part 8300 in the horizontal direction with a preset acceleration. The horizontal impact test is performed by laying the track part 8200 to the horizontal position and driving the traveling part 8300 in the horizontal direction with the belt driving parts 8700R and 8700L.

In the horizontal impact test, firstly, the belt driving parts 8700R and 8700L are driven to make the traveling part 8300 to move to the preparing position, and the test piece S is attached to the traveling part 8300. In particular, the test piece S is placed on the support plate 8320 and is fixed to at least one of the support plates 8320 and 8360. Additionally, an attitude holding member (not shown) for holding the test piece S at a predetermined attitude may be provided to the traveling part 8300 and the test piece S may be attached to the traveling part 8300 in a state where the test piece S is supported in the predetermined attitude by the attitude holding member.

Then, the belt driving parts 8700R and 8700L are driven to move the test piece S to a starting position along with the traveling part 8300. After holding the test piece S at the starting position for a predetermined time period, the belt driving parts 8700R and 8700L are driven based on a preset impact waveform and a predetermined impact is applied to the traveling part 8300 and the test piece S.

In the set up for the horizontal impact test, since the test piece S can be mounted on the traveling part 8300 regardless of the position of the traveling part 8300, it is not always necessary to set the preparing position and to move the traveling part 8300 to the preparing position when mounting the test piece S. Also, the preparing position for the horizontal impact test may be set to a position different from that in the drop test or the vertical impact test. For example, the preparing position and the starting position for the horizontal impact test may be set to the same position to eliminate the step for moving the traveling part 8300 from the preparing position to the starting position after mounting the test piece S.

An impact to be applied to the test piece S in the horizontal or vertical impact test is defined by, for instance, a type of its waveform (sine wave, sine half wave, saw-tooth wave, triangular wave and trapezoidal wave), its duration and its maximum acceleration.

Furthermore, in the horizontal or vertical impact test using the impact test apparatus 8000, impacts of waveforms set by a user (user-set waveforms) can be applied to the test piece S. The user-set waveforms include, for instance, impact waveforms measured in the drop tests or the collision tests, impact waveforms predicted by computer simulations of collisions, or other arbitrarily synthesized waveforms (e.g., waveforms generated using function generators or the like).

An impact to be applied to the test piece S in the horizontal or vertical impact test is generally expressed by acceleration but may be set and controlled using a waveform (or time function) of displacement, velocity or jerk.

It is assessed whether package designs or the like are appropriate based on existence or non-existence of deformations and damages on the test piece S occurred due to each of the tests. It is also possible to attach sensors such as acceleration pick up sensors to the test piece S (e.g., to a packaged product) and perform the tests, and assess package designs or the like based on measured impacts that have acted on the test piece S during the tests.

The test piece S is not limited to packaged cargo. A product itself may be the test piece S and strength of the product may be assessed using the impact test apparatus 8000.

The impact test apparatus 8000 of the present embodiment described above is capable of performing the horizontal impact test in addition to the drop test and the vertical impact test only by making the track part 8200 to pivot and by attaching and detaching the support plate 8360. Conventionally, it was necessary to prepare a dedicated test apparatus for each test. However, by using the impact test apparatus 8000 of the present embodiment, it becomes possible to perform three types of tests with one apparatus. Therefore, costs for introduction, maintenance and management of test facilities can be significantly reduced. Furthermore, space necessary for installation of test facilities can be considerably reduced.

In the impact test apparatus 8000 of the present embodiment, the belt mechanisms 8600 are adopted for driving the traveling part 8300, and the configuration in which the shaft part 8280 being the center of pivot of the track part 8200 and the drive pulleys 8640 for driving the belt mechanisms 8600 are concentrically arranged (i.e., arranged such that they rotate about a common rotation axis) is adopted. With this configuration, even if the track part 8200 is made to pivot about the shaft part 8280 and inclination of the track part 8200 is changed, it is made possible to drive the belt mechanisms 8600 with the belt driving parts 8700 without switching of the belt driving parts 8700 (e.g., switching between the belt driving parts 8700 for the drop/vertical impact test and the belt driving parts 8700 for the horizontal impact test) or displacements of the belt driving parts 8700 (e.g., fixing the belt driving parts 8700 to the track part 8200 and moving the track part 8200 together with the belt driving parts 8700). Furthermore, there is no need to disconnect the belt mechanisms 8600 from the belt driving parts 8700 while making the track part 8200 to pivot.

That is, needs for providing dedicated belt driving parts 8700 for each arrangement (the vertical position and the horizontal position) of the track part 8200 and providing mechanisms for disconnecting or switching the connection between the belt mechanisms 8600 and the belt driving parts 8700 are eliminated by adopting the configuration in which the shaft part 8280 (the pivot of the track part 8200) and the drive pulleys 8640 are concentrically arranged, and thus it is made possible to perform three types of tests with a simple apparatus configuration. Furthermore, since there is no need to make the belt driving part 8700 to pivot together with the track part 8200 (i.e., to incorporate the belt driving parts 8700 to the track part 8200), weight of the track part 8200 does not increase and thus it is made possible to make the track part 8200 pivot with a relatively small-capacity and small-sized pivot driving part 8800.

The configuration in which the shaft part and the drive pulleys are concentrically arranged can be applied not only to the belt transmission mechanism but also to other types of winding transmission mechanisms such as the chain transmission mechanism and the wire transmission mechanism. Furthermore, the configuration in which the shaft part and the drive pulleys are concentrically arranged can also be applied to the gear transmission mechanism by replacing the drive pulleys with driving gears.

However, as described above, with the chain transmission mechanism or the gear transmission mechanism, since inertia of the power transmission mechanism increases, it is difficult to transmit strong impacts to the movable part in the horizontal impact test and the vertical impact test. Furthermore, with the wire transmission mechanism or the belt transmission mechanism with a flat belt, since skidding occurs in the winding intermediate node, it is difficult to accurately transfer strong impacts. If a typical toothed belt is used, since expansion and contraction of the toothed belt increases due to poor stiffness and strength of the core wires and since tooth skipping apt to occur due to poor hardness of the base material, it is difficult to accurately transfer strong impacts.

In the impact test apparatus 8000 of the present embodiment, it is made possible to accurately transmit strong impacts by adopting the light (low inertia) and high-strength toothed belt 8620 in which light, high-strength and high-modulus carbon core wires are used as the core wires 8622 and the high-strength and high-hardness elastomer such as high-strength polyurethane or H—NBR is used as the base material of the body part 8621.

The foregoing are descriptions of illustrative embodiments of the present disclosure. Embodiments of the present disclosure are not limited to the above-described embodiments, and various modifications are possible within a range of the described technical ideas. For example, appropriate combinations of configurations of embodiments and the like explicitly illustrated in this specification and/or configurations that are obvious to a person with ordinary skills in the art from the description of this specification are also included in the embodiments of this application.

In the above described embodiments, the shaft of the servo motor is directly coupled to the shaft of the pulley support part. However, the shafts of the servo motor and the pulley support part may be coupled via a reducer. By the use of the reducer, tests for heavier (high inertia) test pieces become possible. Furthermore, since it becomes possible to use servo motors having smaller capacities, reduction in size, weight and cost of the apparatus becomes possible.

In the above-described embodiments, an acceleration to be applied to the table or the traveling part is controlled (i.e., an impact is expressed using an acceleration). However, the present disclosure is not limited to this configuration. For example, motion of the table or the like may be controlled using velocity or jerk.

In the above-described embodiments, an acceleration of the table or the traveling part is controlled. However, the present disclosure is not limited to this configuration. For example, an acceleration sensor may be mounted to a predetermined portion of the test piece (e.g., on a sheet attached to the table or a dummy placed on the sheet) and an acceleration (impact) of the predetermined portion of the test piece may be set to be a target to be controlled.

In the above-described embodiments, a linear guide consisting of a rail and a substantially rectangular parallelepiped carriage is used as a linear motion guiding mechanism. However, the present disclosure is not limited to this configuration. For example, a rolling guide mechanism which uses rolling bodies such as a ball spline or a linear bush may be used in place of or in addition to the linear guide.

In the above-described embodiments, balls are used as rolling bodies of the linear motion guiding mechanism (linear guide). However, the present disclosure is not limited to this configuration. For example, rollers may be used as the rolling bodies.

In the above-described embodiments, silicon nitride is used as a material of the rolling bodies of the linear motion guiding mechanism (linear guide). However, the present disclosure is not limited to this configuration. For example, other types of ceramic materials such as silicon carbide or zirconia may be used, and stainless steel may also be used.

In the above-described embodiments, the table or the traveling part is supported by a pair of linear guides to be movable only in the driving direction. However, the present disclosure is not limited to this configuration. For example, the table or the like may be configured to be supported by three or more linear guides. Rigidity of the support for the table or the like improves by increasing the number of linear guides. The number of linear guides used is determined in accordance with weight of the test piece or required test precision.

In the above-described embodiments, two or four toothed belts are used. However, the present disclosure is not limited to this configuration. For example, one, three, or five or more toothed belts may be used in accordance with a weight of the test piece or magnitude of an acceleration for the tests.

In the above-described embodiments, the toothed belt is an endless belt. However, the present disclosure is not limited to this configuration. Since the toothed belt is fixed to the table or the traveling part at two positions being apart from each other in the lengthwise direction (driving direction) with the belt clamps, an open-ended belt may also be used.

In the above-described embodiments, two belt clamps for fixing one toothed belt are formed separately. However, these may be integrally formed.

In the above-described embodiments, the table or traveling part and the table attaching part of the belt clamp are formed separately. However, these may be integrally formed. For example, the toothed belt can be directly fixed to the table or the like by providing, on the lower surface of the table or the like, a groove for fitting the toothed belt and screw holes for fixing the clamp plate with bolts.

In the above-described embodiments, AC servo motors are used as the driving sources. However, other types of actuators may be used provided it is possible to control motions of the actuators. For example, DC servo motors, stepping motors, inverter motors and the like may be used. Hydraulic pressure motors and air pressure motors may also be used.

In the above-described embodiments, the frame attaching part, the rail support part and the coupling part are prismatic structural members. However, the present disclosure is not limited to this configuration. The attaching part may have other shapes provided it has a flat surface on its lower face for installing it on the base block. The rail support part may have other shapes provided it has a flat surface on its upper face for attaching the rail. The coupling part may have other shapes provided it couples the attaching part and the rail support part together with sufficient strength.

In the above-described eighth embodiment, the shaft part 8280 is arranged horizontally. However, the present disclosure is not limited to this configuration. The shaft part 8280 may be arranged obliquely against the horizontal plane, and may be arranged vertically.

In the above-described eighth embodiment, the winding transmission mechanism is used to the pivot driving part 8800. However, the present disclosure is not limited to this configuration. For example, a driven gear may be coupled to the shaft part 8280 in place of the driven pulley 8860, and power may be transmitted from the motor 8810 to the driven gear via a gear mechanism. Also, in the above-described embodiment, the toothed belt is used as the winding intermediate node of the winding transmission mechanism, but other types of winding intermediate nodes such as a flat belt, chain or wire may be used. Furthermore, the shaft part 8280 may be directly coupled to a shaft of a motor.

What is claimed is:

1. A test apparatus comprising:
   a table to which a test piece is to be attached and configured to be movable in a predetermined direction;
   a drive module configured to generate power for driving the table, the drive module including an electric motor;
   a toothed belt configured to transmit the power to the table; and
   a controller configured to control the drive module, wherein:
   a ratio of maximum torque to inertia moment of the electric motor is equal to or more than 1000,
   the controller is configured to control the drive module to generate an impact to be applied to the test piece, and
   the test apparatus is configured to be capable of generating the impact of an acceleration exceeding 20G with the drive module and transmitting the impact to the table with the toothed belt.

2. The test apparatus according to claim 1, wherein:
   a rated power of the electric motor is equal to or more than 7 kW, and
   the inertia moment of the electric motor is equal to or less than 0.02 kg·m².

3. The test apparatus according to claim 2,
   wherein the inertia moment of the electric motor is equal to or less than 0.01 kg·m².

4. The test apparatus according to claim 1,
   wherein the electric motor includes:
   a motor shaft;
   a first bearing configured to rotatably support the motor shaft near one end of the shaft;
   a second bearing configured to rotatably support the motor shaft near the other end of the shaft;
   a first bracket configured to support the first bearing;
   a second bracket configured to support the second bearing; and a cylindrical stator through which the motor shaft penetrates, wherein the test apparatus further comprises:
- a first motor support part configured to fix the first bracket to a base of the test apparatus; and
- a second motor support part configured to fix the second bracket to the base.

5. The test apparatus according to claim 1, comprising a pair of toothed pulleys around which the toothed belt is wound, wherein at least one of the pair of toothed pulleys is a drive pulley configured to be driven by the drive module.

6. The test apparatus according to claim 5, wherein the drive module includes:
- a shaft configured to be driven by the electric motor; and
- a bearing configured to rotatably support the shaft, wherein the drive pulley is attached to the shaft.

7. The test apparatus according to claim 6, wherein:

the drive module includes a pair of the electric motors, and both ends of the shaft are respectively connected to the pair of electric motors.

8. The test apparatus according to claim 6, comprising a plurality of the toothed belts arranged in parallel with respect to each other, wherein the impact is transmitted to the table by the plurality of toothed belts, wherein the drive module includes two said pulleys configured to respectively drive two of the plurality of toothed belts, and wherein the two drive pulleys are attached to one said shaft.

9. The test apparatus according to claim 5, comprising a plurality of the toothed belts arranged in parallel with respect to each other, wherein the impact is transmitted to the table by the plurality of toothed belts.

10. The test apparatus according to claim 9, wherein effective lengths of the plurality of toothed belts are the same.

11. The test apparatus according to claim 9, comprising a plurality of the drive modules configured to drive the plurality of toothed belts, respectively, wherein at least two of the plurality of drive modules are arranged in an axial direction of the drive pulley.

12. The test apparatus according to claim 9, comprising a plurality of the drive modules configured to drive the plurality of toothed belts, respectively, wherein at least two of the plurality of drive modules are arranged in the predetermined direction.

13. The test apparatus according to claim 5, comprising a plurality of the drive modules, wherein both of the pair of toothed pulleys are the drive pulleys, and wherein the plurality of drive modules includes:
- a first drive module configured to drive one of the pair of toothed pulleys; and
- a second drive module configured to drive the other of the pair of toothed pulleys.

14. The test apparatus according to claim 1, comprising a linear guide configured to support the table to be movable in the predetermined direction, wherein the linear guide includes:
- a rail extending in the predetermined direction; and
- a carriage configured to be travelable on the rail via rolling bodies, and wherein the carriage is fixed to the table.

15. The test apparatus according to claim 1, wherein the controller is configured to control the drive module such that the impact of a magnitude similar to that at the time of collision of a vehicle is applied to the table.

16. The test apparatus according to claim 1, wherein the toothed belt includes carbon core wires.

17. The test apparatus according to claim 1, wherein the toothed belt includes a body part formed of elastomer, wherein the elastomer includes high-strength polyurethane or hydrogenated acrylonitrile butadiene rubber.

* * * * *